United States Patent [19]

Black

[11] Patent Number: 5,182,958

[45] Date of Patent: Feb. 2, 1993

[54] NON-LINEAR PROPULSION AND ENERGY CONVERSION SYSTEM

[76] Inventor: James W. Black, 312 St. George Street, Toronto, Ontario, Canada, M5R 2P5

[21] Appl. No.: 693,615

[22] Filed: Apr. 30, 1991

Related U.S. Application Data

[63] Continuation-in-part of Ser. No. 611,483, Nov. 8, 1990, which is a continuation of Ser. No. 417,048, Nov. 4, 1989, abandoned.

[51] Int. Cl.$^5$ .................. F16H 33/20; B62D 57/00; B63H 19/00
[52] U.S. Cl. ........................ 74/84 R; 180/7.1; 310/20; 440/113
[58] Field of Search ............... 74/84 R, 84 S; 310/15, 310/20; 180/7.1; 244/62, 172; 440/113

[56] References Cited

U.S. PATENT DOCUMENTS

| | | | |
|---|---|---|---|
| 1,511,960 | 10/1924 | Goldschmidt | 180/8.1 |
| 1,731,303 | 10/1929 | Gardner, Jr. | 180/8.1 X |
| 1,743,978 | 1/1930 | Quisling | 440/13 |
| 2,350,248 | 5/1944 | Nowlin | 74/61 |
| 2,636,340 | 4/1953 | Llamozas | 60/7 |
| 3,266,233 | 8/1966 | Farrall | 60/7 |
| 3,404,854 | 10/1968 | Di Bella | 244/62 |
| 3,492,881 | 2/1970 | Vanden Auweele | 74/84 S |

(List continued on next page.)

FOREIGN PATENT DOCUMENTS

| | | |
|---|---|---|
| 267091 | 7/1987 | Australia . |
| 2061914 | 6/1972 | Fed. Rep. of Germany . |
| 2846516 | 5/1980 | Fed. Rep. of Germany . |
| 1340196 | 4/1902 | France . |
| 1347123 | 4/1902 | France . |
| 401615 | 11/1945 | France .................. 180/7.1 |
| 933483 | 4/1948 | France . |

(List continued on next page.)

OTHER PUBLICATIONS

Product Engineering, Mar. 14, 1966, p. 63.

Primary Examiner—Allan D. Herrmann
Attorney, Agent, or Firm—Jacobson, Price, Holman & Stern

[57] ABSTRACT

A non-linear propulsion and energy conversion system, in one embodiment, includes an impulse drive having a frame with inner and outer pairs of driving members movable relative to the frame. Guides in the form of rails are provided for supporting the driving members so that they move along a path confined by the rails when kinetic energy is provided thereto. Solenoid switches are located at each end of the frame and are operable to cause the outer driving members to move linearly along the rails in opposite directions towards each other. At least one of the inner members has a pair of rotatable discs mounted thereon which rotate upon interaction with one of the outer members. The other inner member interacts with the other outer member in a manner so that it transmutes a greater portion of the translational kinetic energy and linear momentum applied thereto by the outer member into linear motion. Thus, the other inner member moves linearly along the path at a greater linear velocity, translational kinetic energy and linear momentum than the one inner member. Brakes are provided in the frame for decelerating and stopping both of the inner members relative to the frame. This process yields a resultant net impulse to the center of mass of the combined system in the direction of movement of the inner member with the greater linear momentum. The resultant net impulse accelerates the combined center of mass of the frame from a state of complete rest to a state of resultant, continuing, uniform motion. A plurality of the above-mentioned drives can be secured to the chassis of a vehicle to allow the vehicle to be accelerated or decelerated as desired. In another embodiment, the system can be used to absorb energy and momentum by converting a portion of the relative linear momentum of an object into angular momentum of at least one disc mounted on an object which is either stationary and integral to a structure, or able to move and then be decelerated and stopped by brakes in the framework of the structure.

51 Claims, 46 Drawing Sheets

U.S. PATENT DOCUMENTS

| | | | |
|---|---|---|---|
| 3,530,617 | 9/1970 | Halvorson et al. | 74/84 S X |
| 3,537,669 | 11/1970 | Modesti | 244/23 |
| 3,584,515 | 6/1971 | Matyas | 74/84 S X |
| 3,683,707 | 8/1972 | Cook | 74/84 S |
| 3,750,484 | 8/1973 | Benjamin | 74/84 S |
| 3,756,086 | 9/1973 | McAlister et al. | 74/84 S |
| 3,807,244 | 4/1974 | Estrade | 74/84 S |
| 3,810,394 | 5/1974 | Novak | 74/84 S X |
| 3,979,961 | 9/1976 | Schnur | 74/61 |
| 4,071,086 | 1/1978 | Bennett | 180/7.1 X |
| 4,238,968 | 12/1980 | Cook | 74/84 R |
| 4,242,918 | 1/1981 | Srogi | 74/84 S |
| 4,577,520 | 3/1986 | Colla | 74/84 R |
| 4,712,439 | 12/1987 | North | 74/84 R |
| 4,801,111 | 1/1989 | Rogers et al. | 180/7.1 X |

FOREIGN PATENT DOCUMENTS

| | | | |
|---|---|---|---|
| 967839 | 11/1950 | France | |
| 1063784 | 5/1954 | France | |
| 1143489 | 10/1957 | France | |
| 1377261 | 12/1961 | France | |
| 1458088 | 11/1966 | France | |
| 559565 | 9/1983 | France | |
| 573912 | 3/1958 | Italy | |
| 62-166166 | 7/1987 | Japan | 180/7.1 |
| 162334 | 4/1921 | United Kingdom | |
| 770555 | 3/1957 | United Kingdom | |

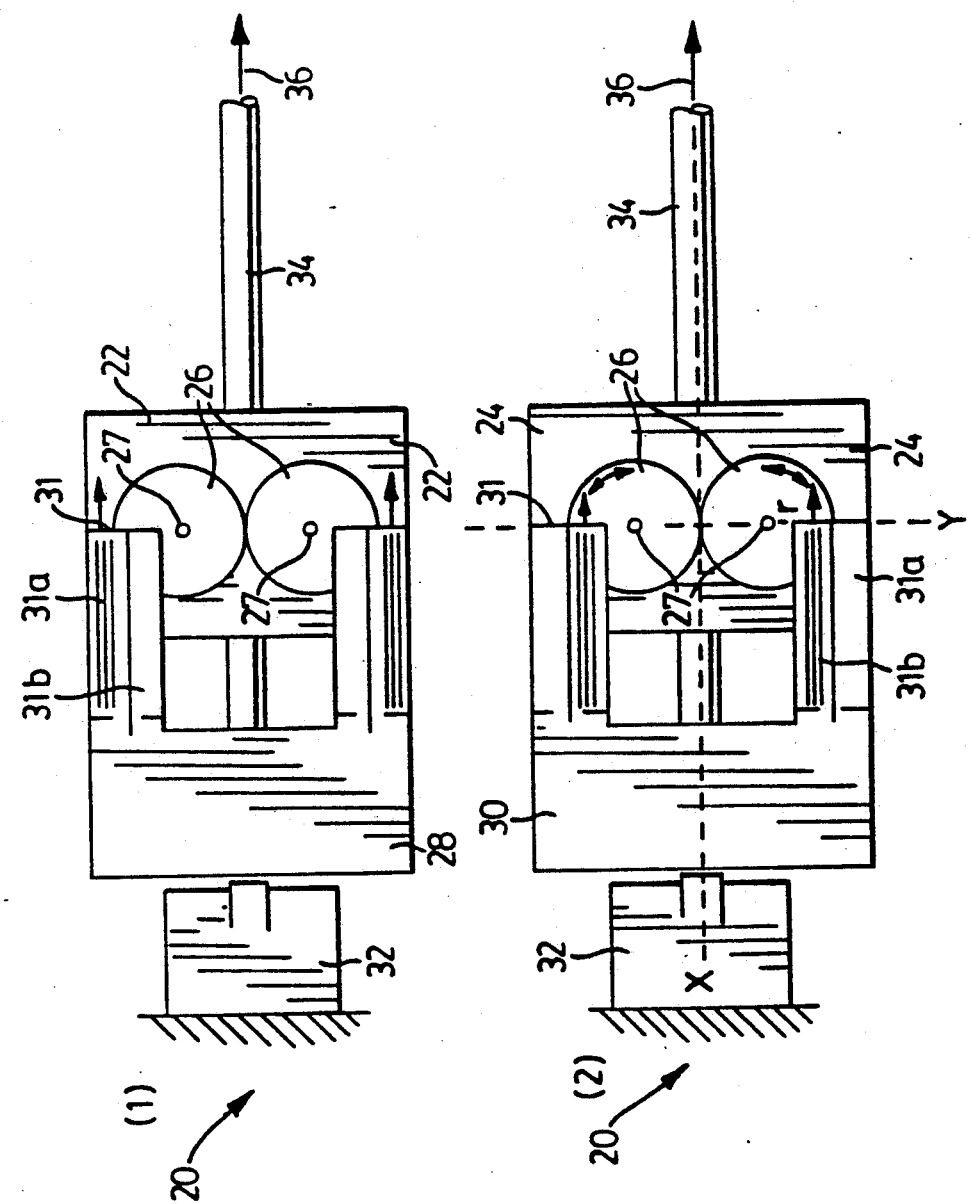

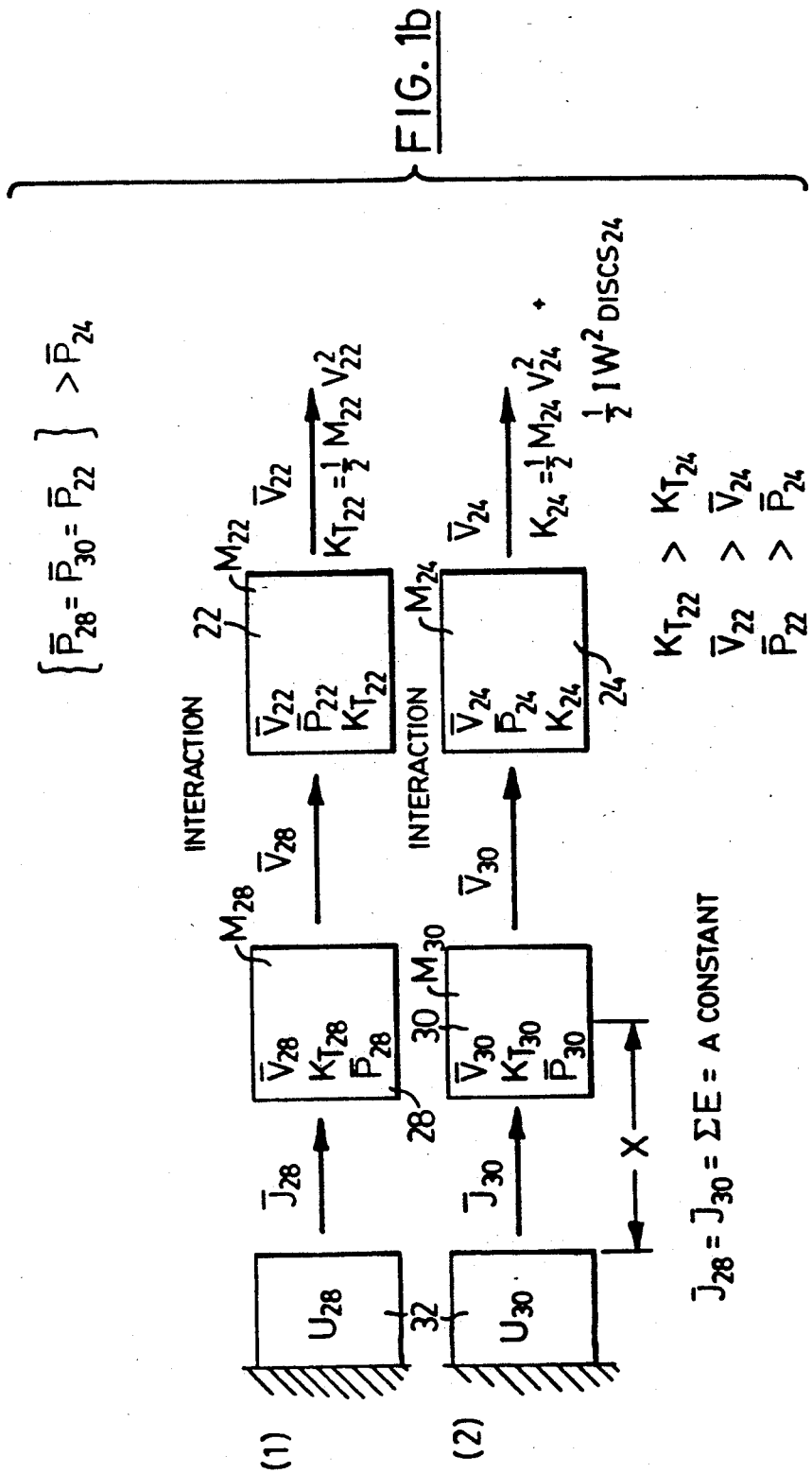

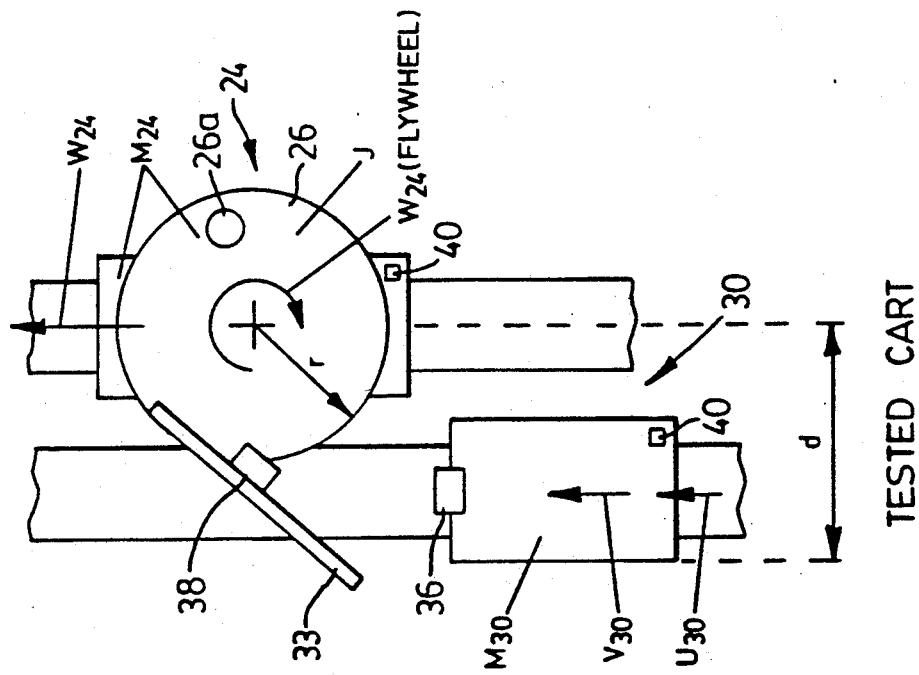
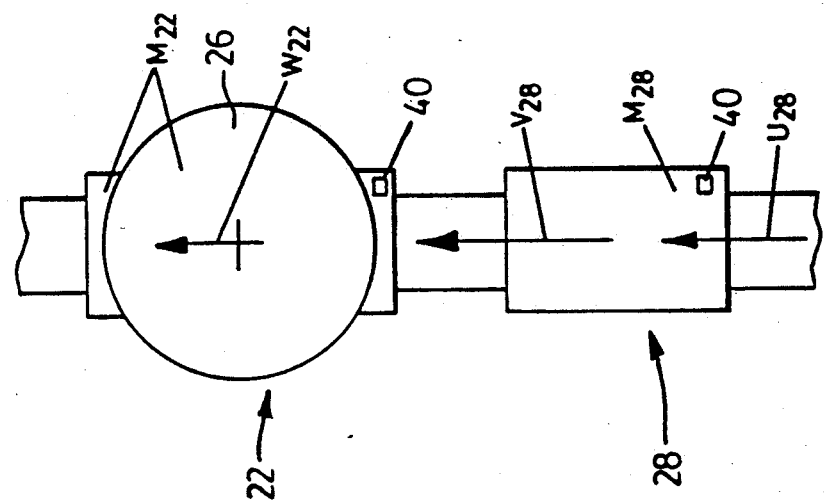
FIG. 2a

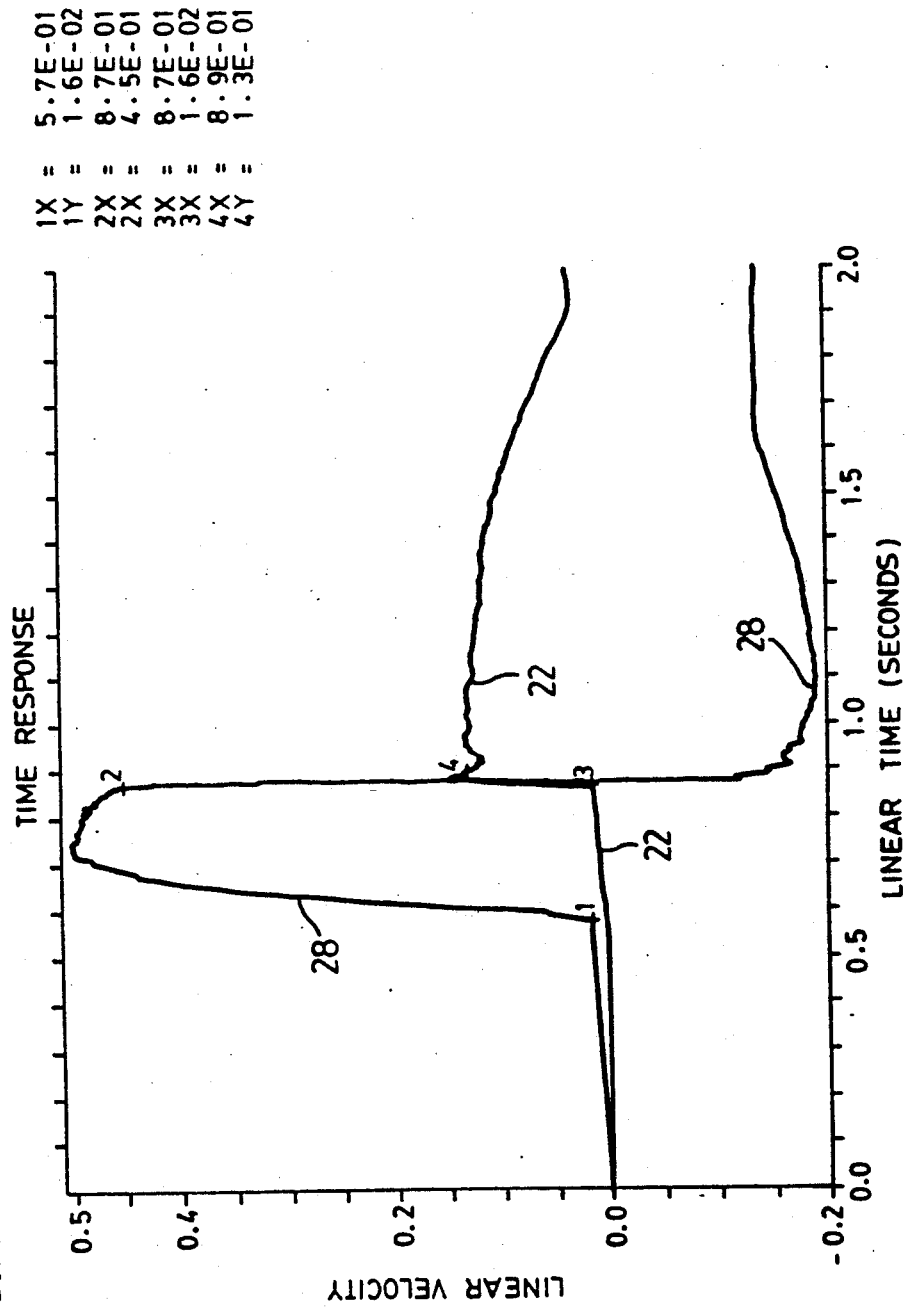

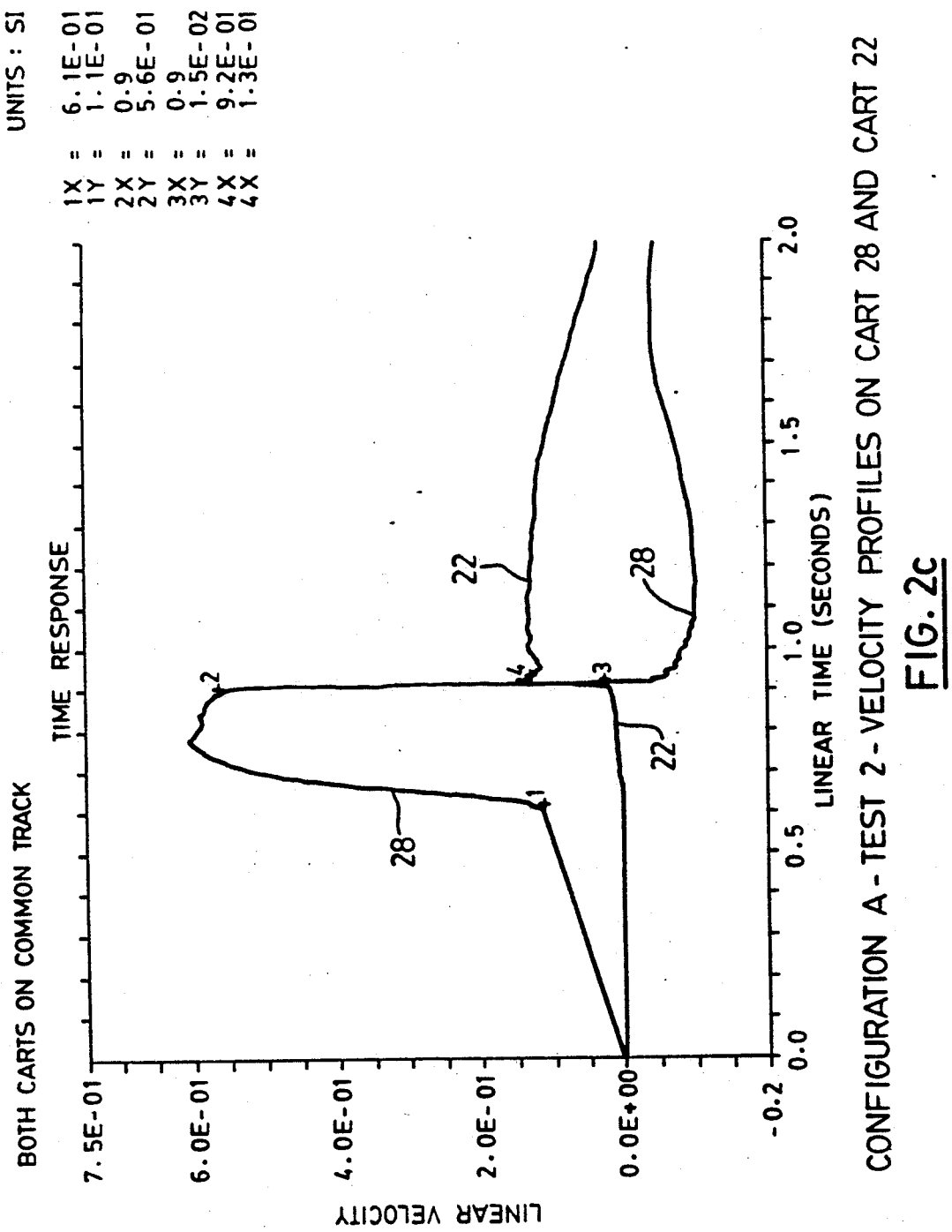

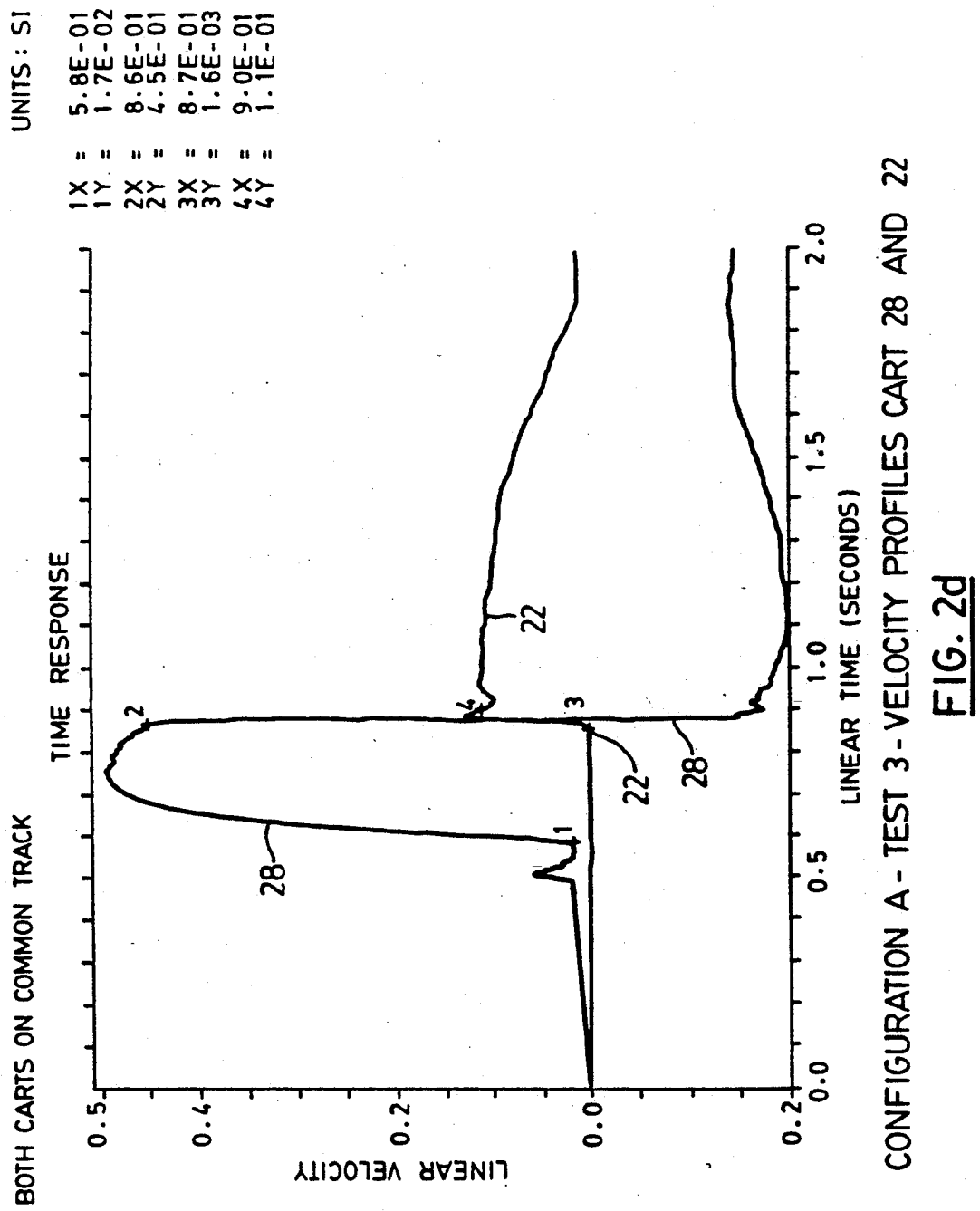

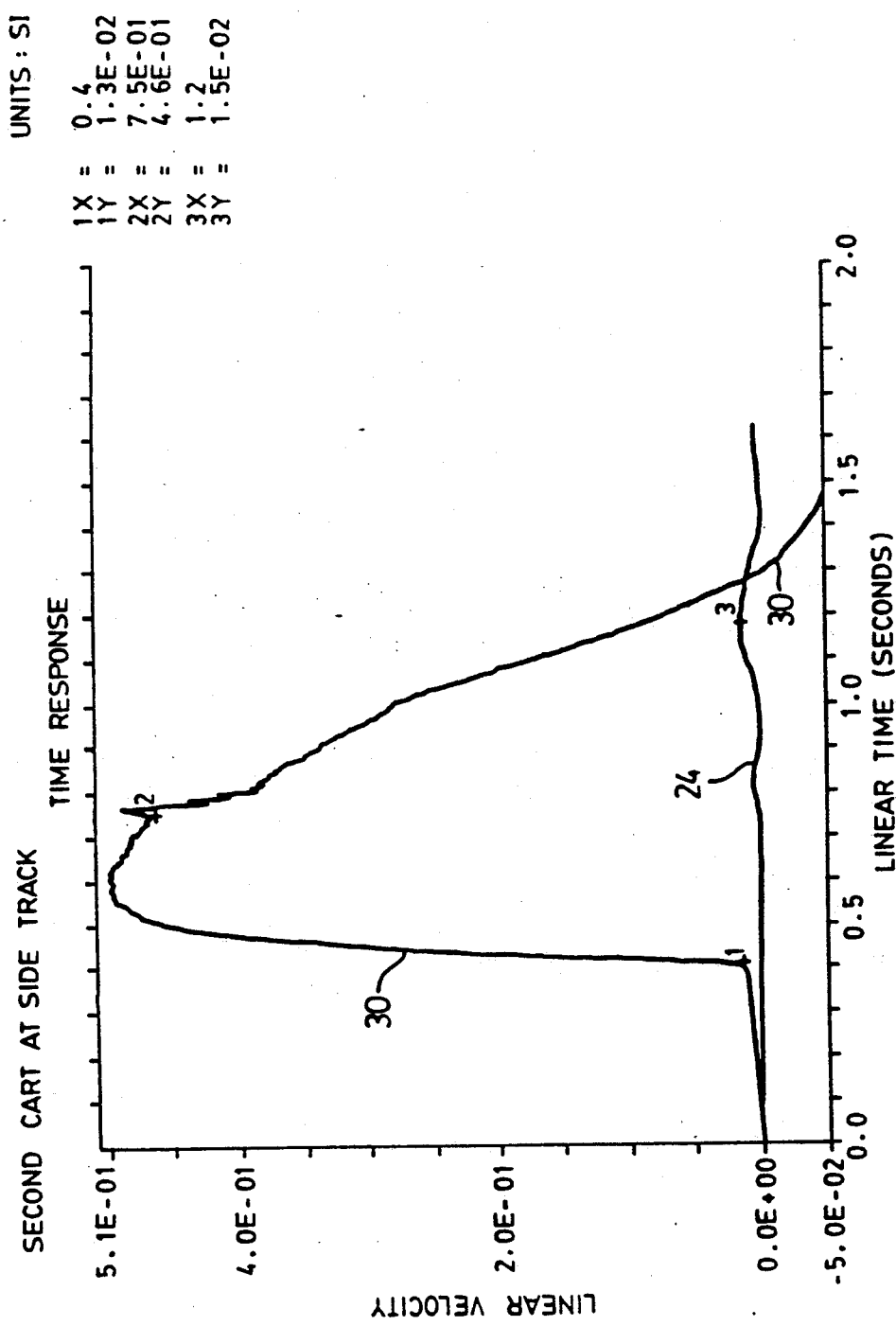

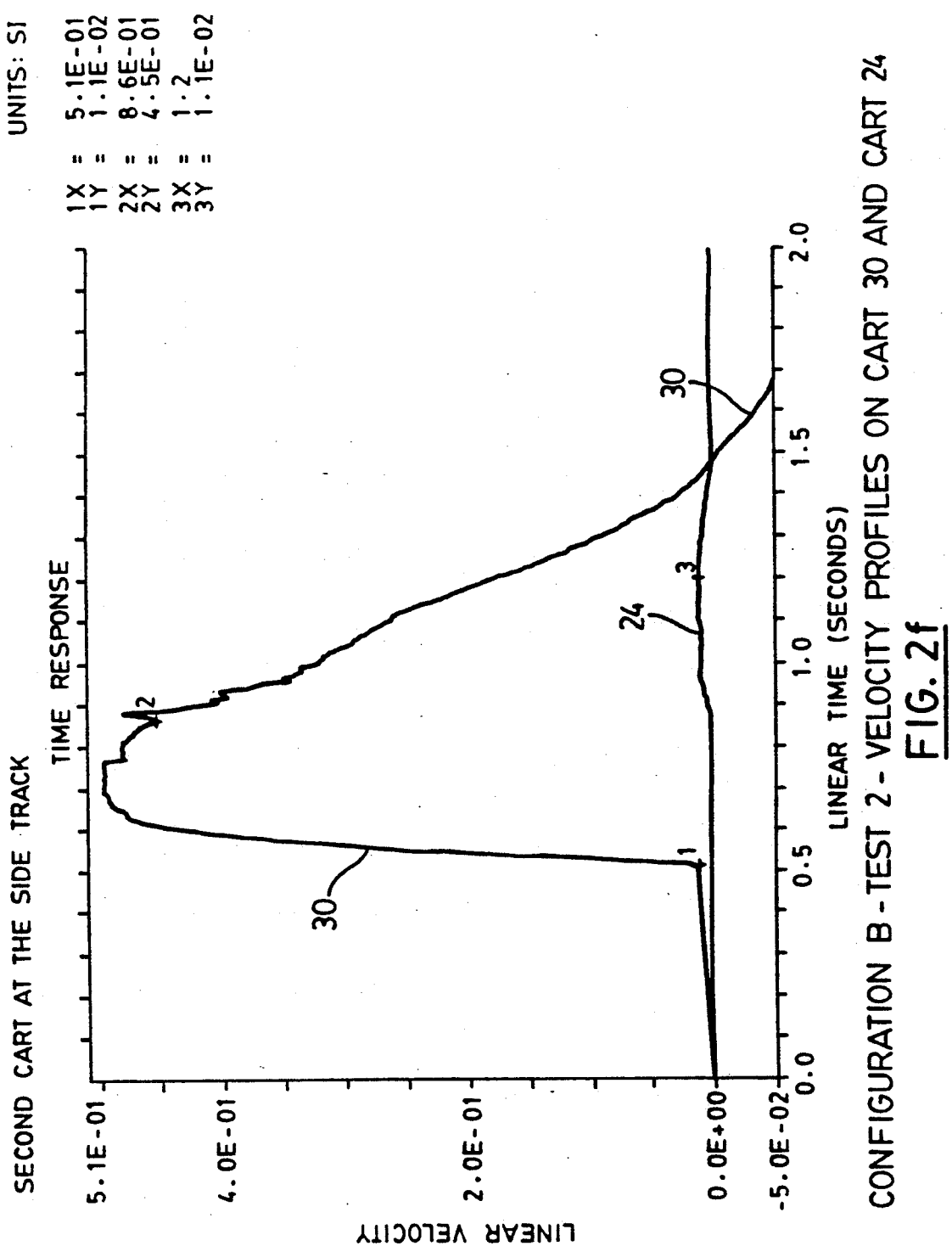

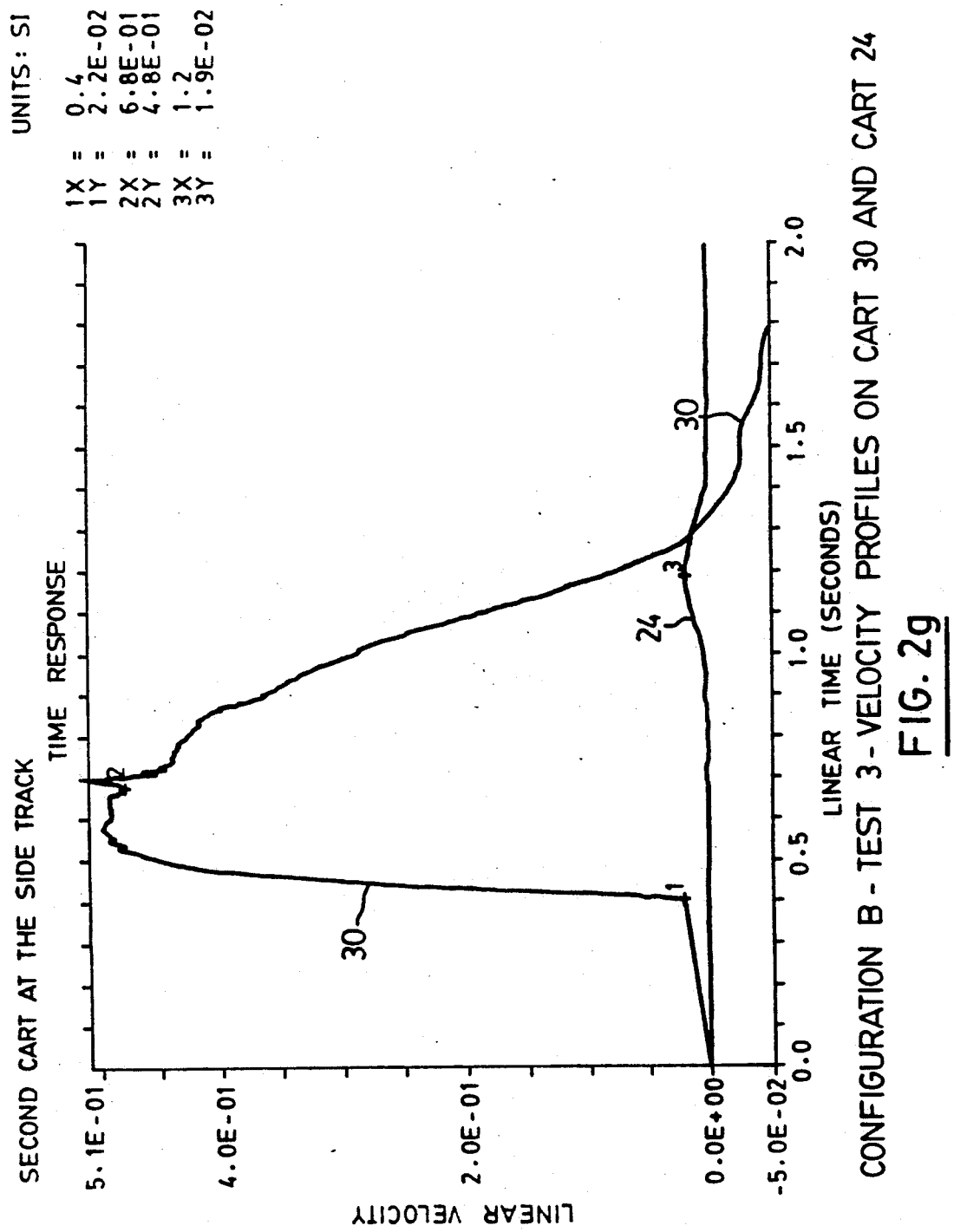

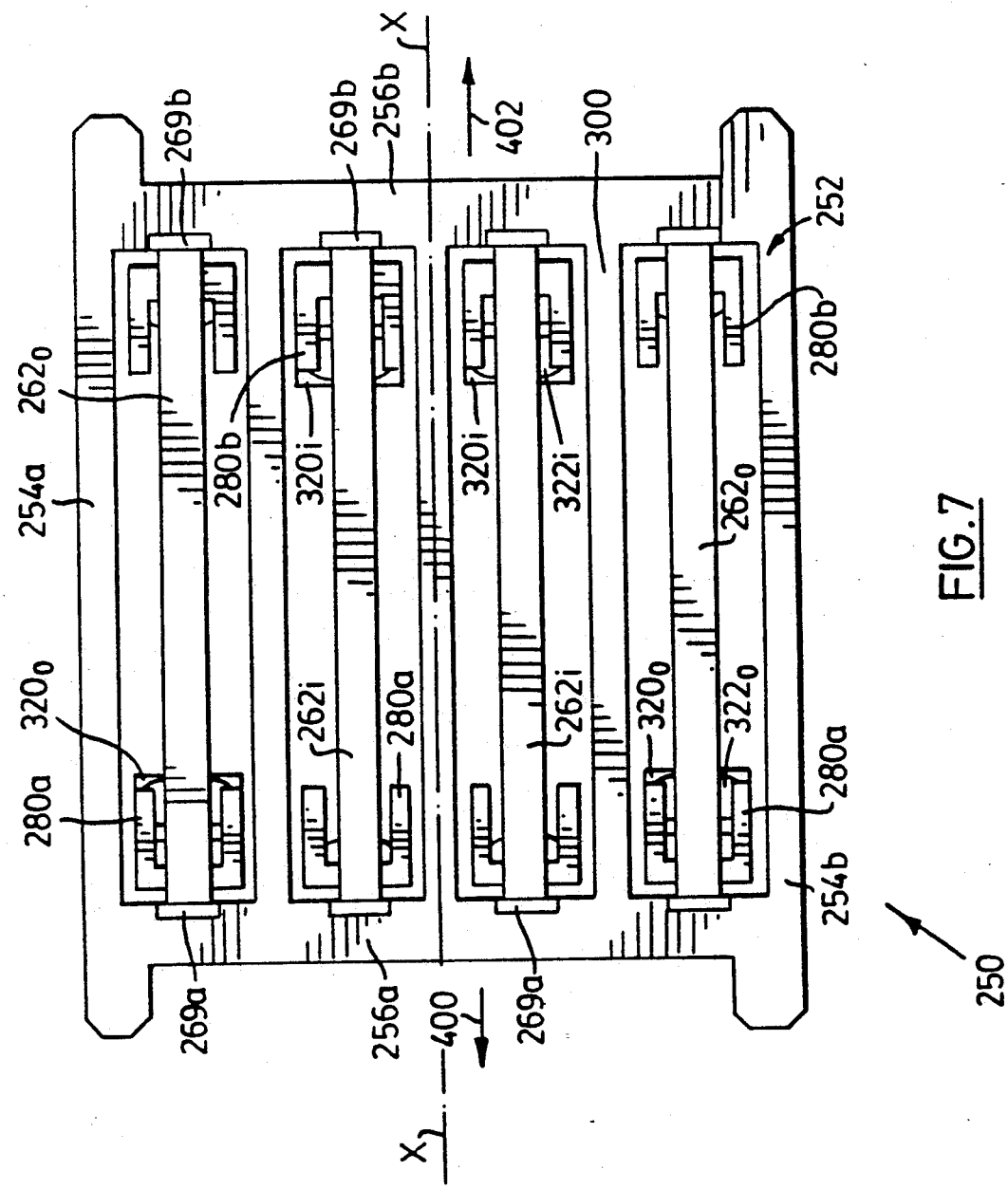

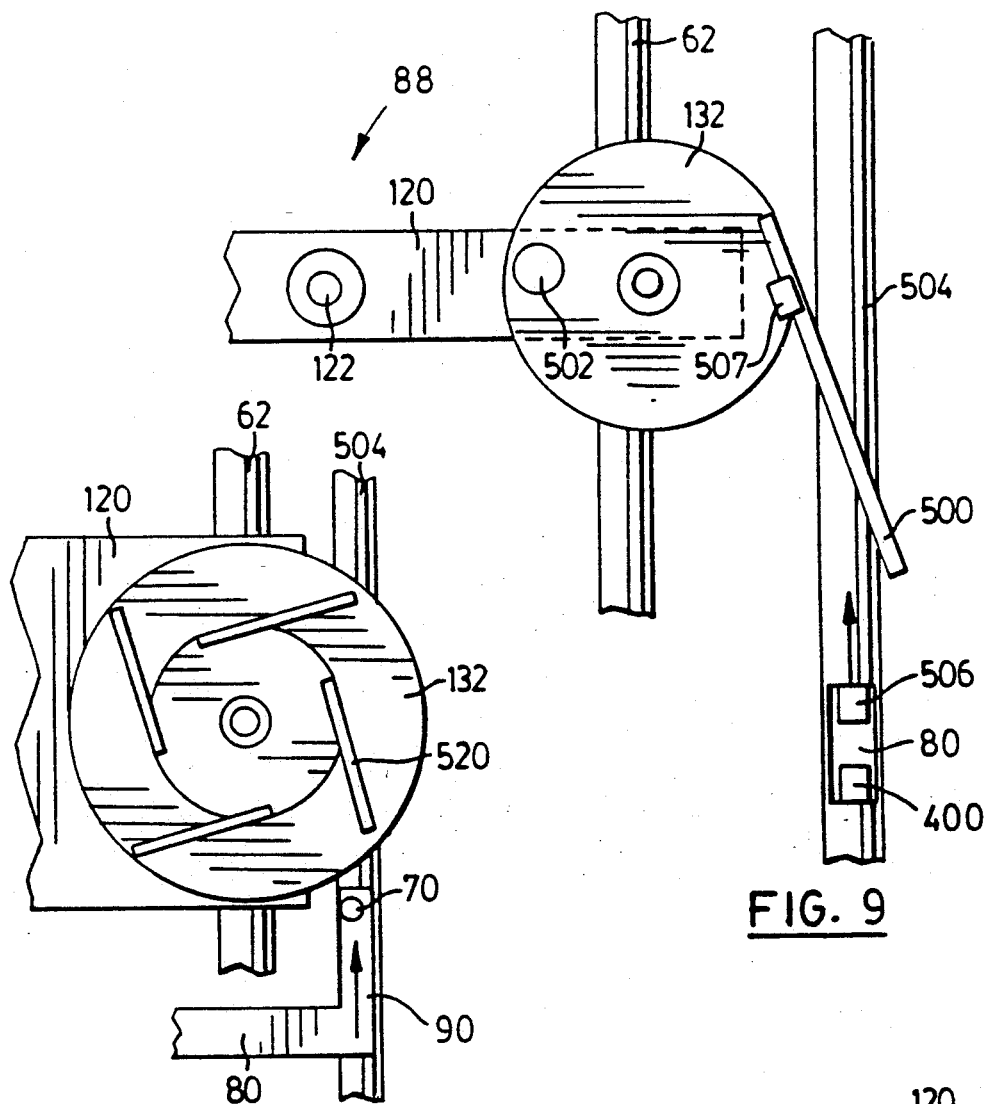
FIG. 9
FIG. 10
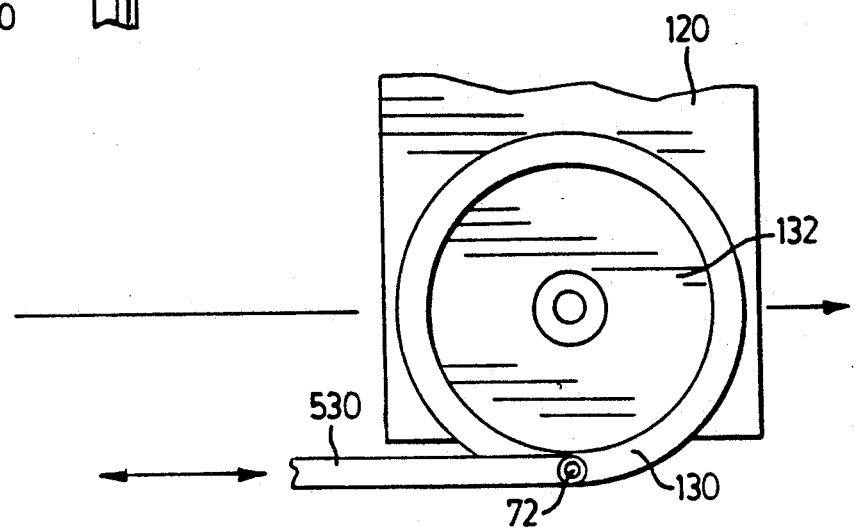
FIG. 11

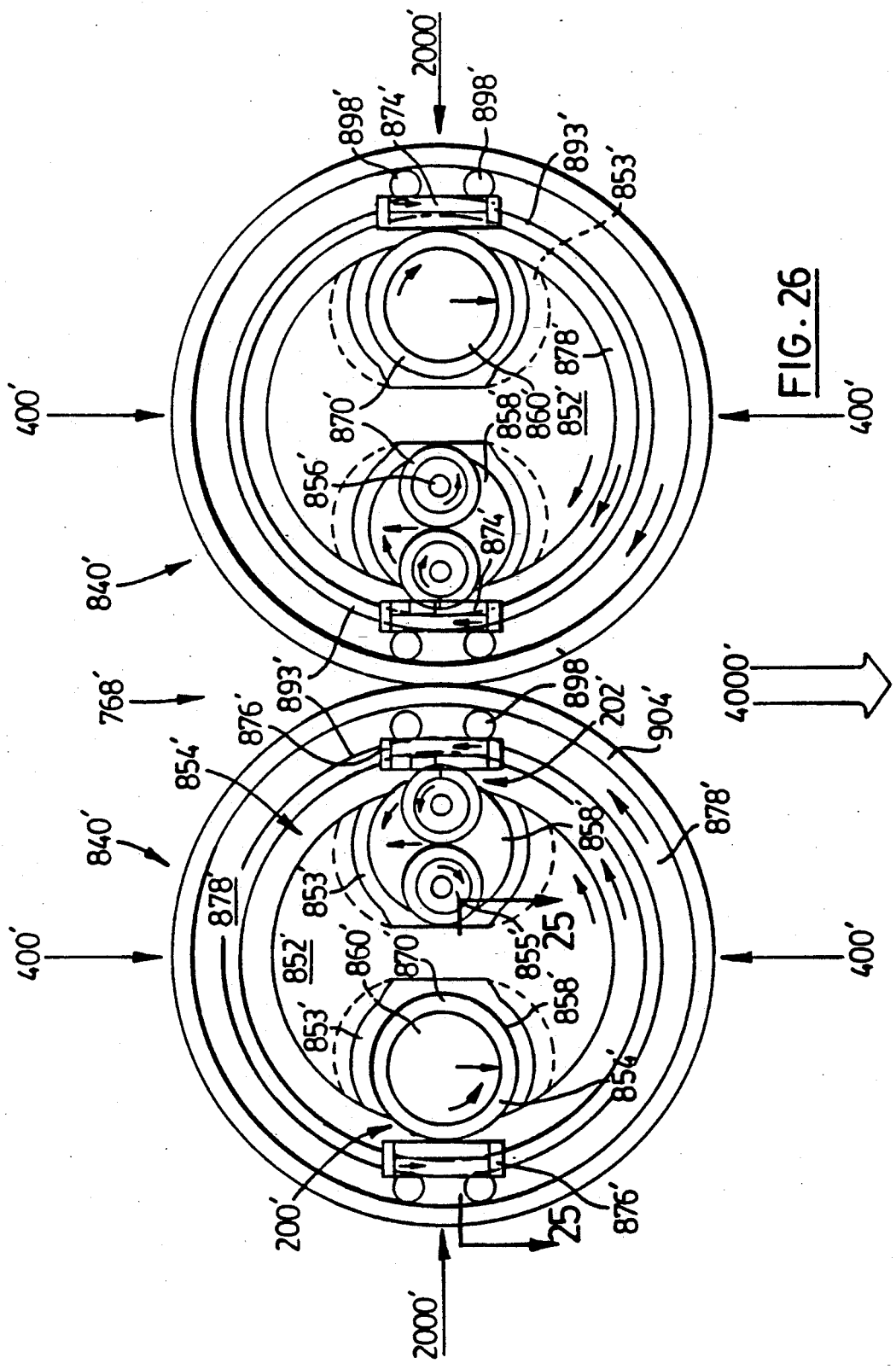

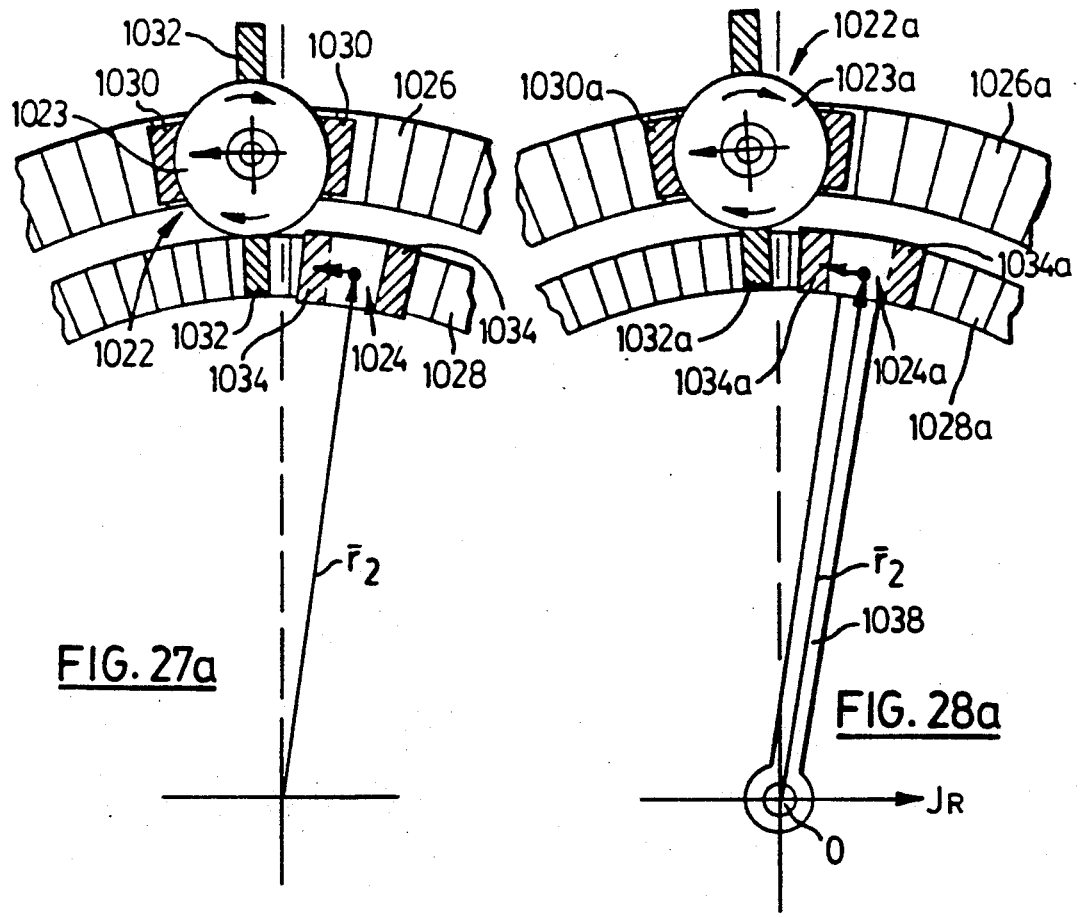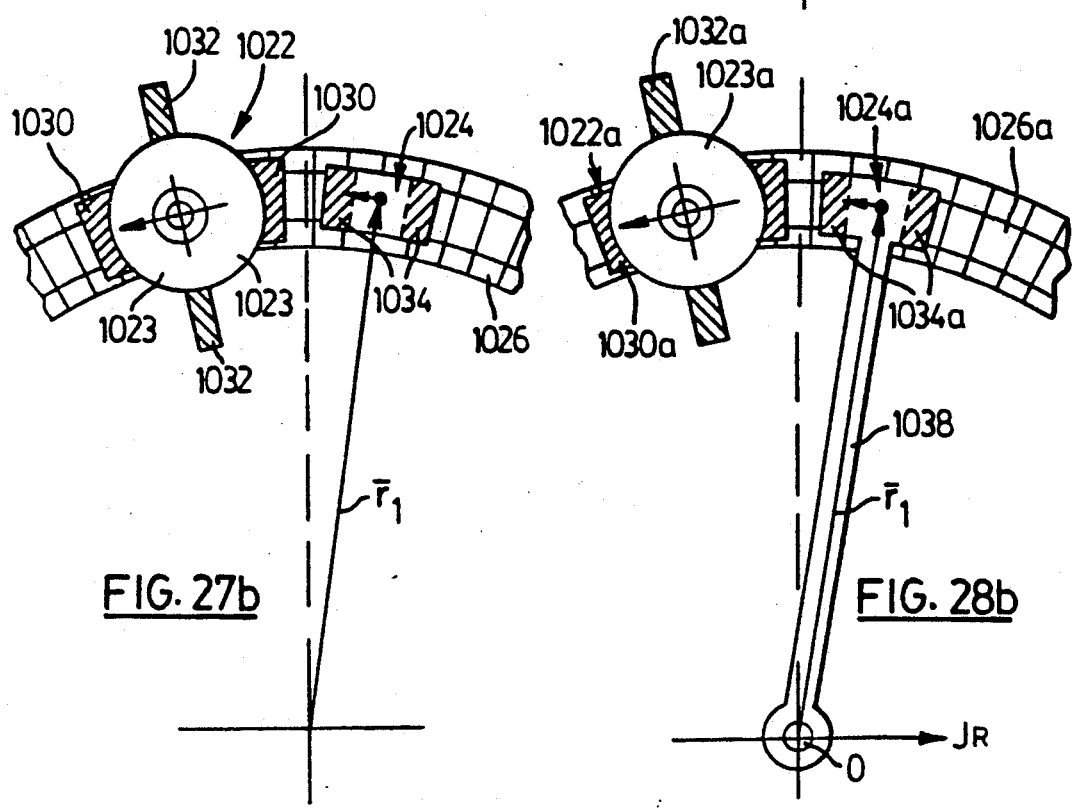
FIG. 27a  FIG. 28a
FIG. 27b  FIG. 28b $\bar{J}_{NET(i)} = \bar{J}_{NET(ii)}$ PER EACH SET OF INTERACTIONS $\Sigma \bar{J}_{CM,NET}$ ( $\Sigma$ RESULTANT $\Delta S$)
$= \Sigma \bar{F}_{INT,NET} \Delta t = \Sigma M \bar{a}_{CM}$
$= \Delta \bar{P}_{CM}$, SYSTEM VEHICLE PER
$\Sigma$ INTERACTIONS, $\Sigma$ SETS OF INTERACTIONS $\Sigma \bar{J}_{NET,CM}$ $$\Sigma J_1 = \Sigma J_2 = \Sigma J_1' = \Sigma J_2' \quad \text{FOR:} \quad \Delta t_1 = \Delta t_2 = \Delta t_1' = \Delta t_2', \ \&$$

$$\Sigma F_1, \text{APPLIED} = \Sigma \bar{F}_{2A} = \Sigma \bar{F}_{1A}' = \Sigma F_{2A}', \ \&$$

$$\Sigma \bar{f}_{2cm}', \text{NET} = \Sigma \bar{F}_{2A}' - \Sigma \bar{f}_{2cm}', \text{(DUE TO ROTATION)}$$

$\Sigma \bar{L}_{RESULTANT\ II} = \bar{\ell}_{m1\ (WHEEL)\ RES} + \bar{\ell}_{M2\ (\bar{r} \times \bar{p}_{cm})\ RES} + \Sigma |\bar{\ell}_{(WHEELS,M2)\ RES}|.$ $|\bar{\ell}_{M2(\bar{r} \times \bar{p}_{cm})\ RES\ I}| - |\bar{\ell}_{M2(\bar{r} \times \bar{p}_{cm})\ RES\ II}| = |\bar{\ell}_{VEHICLE\ (r \times P_{cm}),\ NET}|.$

NON-LINEAR PROPULSION AND ENERGY CONVERSION SYSTEM

RELATED APPLICATIONS

The present application is a continuation-in-part of pending U.S. patent application Ser. No. 611,483 filed on Nov. 8, 1990, which is a continuation of U.S. application Ser. No. 417,048 filed on Nov. 4, 1989, now abandoned.

FIELD OF THE INVENTION

The present invention relates to a non-linear propulsion and energy conversion system.

BACKGROUND OF THE INVENTION

Propulsion and energy conversion systems are well known in the art. Developments to these types of systems are continually being sought to improve performance, reduce costs, contribute to the environment, and to reduce the effect of reaction forces on the system.

Many proposals for impulse type propulsion systems have been considered. In particular, U.S. Pat. No. 3,492,881 to Auweele shows a prime mover comprising a pair of masses. One of the masses is in the form of a framework including a pair of rails which support a carriage. A flywheel and a motor are disposed on the carriage with the motor rotating the flywheel. The carriage is also secured to the framework by connecting means including a rod and a crank. The rod-and-crank mechanism is secured to the shaft of the flywheel. When the motor rotates the flywheel, the rod-and-crank mechanism reciprocates the carriage along the rails of the framework. A spring extends between the rod and the framework and converts energy between potential and kinetic forms during reciprocation of the carriage. When the carriage is moved in a rearward direction, the spring is compressed, thereby converting part of the kinetic energy of the carriage into potential energy. Conversely, when the carriage is moving in the forward direction, the potential energy stored in the compressed spring is converted into kinetic energy resulting in increased movement of the carriage in the forward direction. Thus, the carriage encounters different resistances as it is reciprocated, thereby generating thrust in the direction of the forward movement of the carriage.

U.S. Pat. No. 4,712,439 to North describes an apparatus for producing a propulsive force which includes a pair of balanced flywheels mounted on shafts. The shafts are rotatable to cause the flywheels to rotate angularly. A slot is provided in each flywheel and a mass is slidable along each slot. However, the masses are restrained to rotate eccentrically of the flywheel by stationary cam surfaces. The centrifugal forces applied to the masses during their rotation results in an upward force being generated along the line joining the center of the cam and the shaft of the flywheel.

U.S. Pat. No. 4,242,918 to Srogi discloses a system for propelling a vehicle by converting rotational forces developed by an oscillator into a directional thrust. The system includes a shuttle assembly movably mounted to a frame assembly via rails. The oscillator comprises three, intermeshing, spur gears with each spur gear having an eccentrically positioned weight on it. The spur gears are rotated via a motor and drive shaft to produce alternating horizontal right and left opposed pulses on the shuttle as the gears rotate. The opposed pulses are rectified via a ratchet mechanism to produce a pulse in a predetermined direction.

U.S. Pat. No. 3,530,617 to Halvorson et al discloses a vibration driven vehicle having a motor mounted on a spring. The spring, when caused to vibrate due to the rotation of the motor, maintains only the centrifugal component of the forces applied to the spring which move the vehicle forward. The spring is designed to eliminate the component of the forces which opposes the movement of the vehicle thereby producing a horizontal force in a predetermined direction.

U.S. Pat. No. 3,266,233 to Farrall discloses a propulsion device which uses the reaction force generated by the motion of an inertial member including a base having an upright located at one end thereof. Another upright extends from the other end of the base and supports a motor. The inertial member is supported on the base between the uprights and is urged towards one of the uprights by a plurality of heavy springs in compression. The inertial member abuts against shock absorbers supported on the corners of the other upright. When the motor is energized, a cam moves the inertial member towards the one upright to compress the springs. As the face of the cam passes over the surface of the inertial member, energy which is stored in the springs urges the inertial member towards the cam. As the inertial member is released from the cam, the inertial member becomes a free body without any interference by the cam. The springs then react between the inertial member and the upright. If the weight of the inertial member is equal to that of the uprights, the base and the operating mechanism, the reaction at both ends of the spring will be equal and will tend to move the inertial member to the right and the upright to the left, thereby imparting motion to the entire device to the left. Continual impulses are applied to the upright and the device is propelled in this manner as long as the motor is driven.

U.S. Pat. No. 3,404,854 to Di Bella shows an apparatus for propelling a device in a predetermined direction including a mass which follows a closed, three-dimensional, curved path when propelled by a drive. The motion of the mass generates a force in the predetermined direction which can be used to propel the device.

Improved, non-linear, impulse-type propulsion systems are desired and it is therefore an object of the present invention to provide a novel propulsion and energy conversion system, an impulse drive and a vehicle incorporating an impulse drive.

SUMMARY OF THE INVENTION

According to one aspect of the present invention there is provided an impulse drive having a frame and an impulse generating means mounted thereon, said impulse generating means comprising:

drive means to cause relative motion between the frame and at least a portion of the impulse generating means;

means associated with the portion of said impulse generating means to impart rotation of at least one rotatable member carried by said impulse generating means and thereby convert a portion of the kinetic energy and momentum thereof to rotational kinetic energy and angular momentum; and braking means to reduce motion of the portion of said impulse generating means relative to the frame whereby the difference in kinetic energy and momentum attributable to the rotation of the rotatable member provides a net impulse to the frame in a predetermined direction.

Preferably, the impulse-generating means includes at least two interacting driving members which are substantially equal in mass, or of particular ratios, one mass with respect to the other mass, to be described herein. It is also preferred that the one of the driving members transmutes a portion of the linear kinetic energy and linear momentum into rotational motion and angular momentum of the at least one rotatable mass. Preferably, the at least one rotatable mass is in the form of a pair of dynamically balanced flywheels.

In another aspect of the present invention, there is provided an impulse drive having a frame and an impulse generating means mounted thereon, said impulse generating means comprising:

first and second pairs of driving members with each pair being located on opposite sides of the centre of mass of said frame;

drive means to cause linear motion between the frame and the driving members so that one driving member of each pair moves within said frame in opposite directions towards the other driving member of each pair, said one and other driving members interacting to cause motion of said other driving members within said frame in opposite directions;

means associated with one of the one driving members of a pair to impart rotation of at least one rotatable member carried by the other driving member of that pair and thereby convert a portion of the linear kinetic energy and linear momentum to rotational kinetic energy and angular momentum; and braking means to arrest motion of the other driving members of each pair relative to the frame whereby the difference in the linear kinetic energy and the linear momentum attributable to the rotation of the at least one rotatable member provides a net impulse to the frame in a predetermined direction.

In still yet another aspect of the present invention there is provided a method of absorbing energy in a rigid structure having at least one member movable relative to said structure in a manner having a linear component which is transferred to said structure comprising the steps of:

providing on stationary member on said structure at least one rotatable member; and positioning said rotatable member in a manner to interact with said one member when said one member is moving whereby said one member imparts rotation of said rotatable member upon movement of said one member thereby to convert a portion of the linear kinetic energy and linear movement of said one member to rotational kinetic energy and angular momentum of said rotatable member.

In still yet another aspect of the present invention there is provided a vehicle having a chassis with an impulse drive secured thereto, said impulse drive comprising:

a frame mounted to said chassis;

impulse generating means on said frame and having at least a portion thereof movable relative to said frame;

drive means to cause relative linear motion between the frame and the portion of said impulse generating means;

means associated with the portion of said impulse generating means to impart rotation of at least one rotatable member carried by said impulse generating means and thereby convert a portion of the kinetic energy and momentum thereof to rotational kinetic energy and angular momentum; and braking means to reduce motion of the portion of said impulse generating means relative to the frame whereby the difference in kinetic energy and momentum attributable to the rotation of the rotatable member provides a net impulse to the frame in a predetermined direction.

Preferably, the impulse generating means includes one impulse generator located at and symmetrically around the center of mass of the vehicle, or at least two impulse generators positioned symmetrically on opposite sides of the center of mass of the vehicle, with the impulse generators being operable to apply an impulse to the chassis of the vehicle. It is also preferred that the impulse generators are rotatably mounted on the frame to permit the direction of the impulse applied to the chassis to be changed. Preferably, the impulse generators are mounted to the frame via gimbals so that rotation of the impulse generators, to alter the direction of the impulse applied to the chassis, causes no net rotation or torque on the chassis.

In still yet another aspect of the present invention there is provided a vehicle comprising:

a chassis;

at least one impulse generator means mounted on said chassis and operable to provide a net impulse to the chassis in a predetermined direction; and mounting means acting between said chassis and said at least one impulse generator to permit said impulse generator to be rotated with respect to the said chassis to permit the direction of impulses applied to the vehicle to be varied while preventing a net torque on or rotation of the vehicle to occur.

The present invention provides advantages in that repetitive, net, unidirectional quantities of translational kinetic energy and linear momentum in the form of net impulses can be applied to the frame and combined system without requiring the expulsion of exhaust from the system. By reciprocating the motion of the driving members within the frame, an internal momentum or impulse drive is achieved, as the change in linear momentum of a body or system as a whole acted upon by an impulsive force is equal to the impulse, as in accordance with the impulse-momentum theorem. In addition, the present invention can be used to counteract oscillations and impulses applied to a system.

BRIEF DESCRIPTION OF THE DRAWINGS

Embodiments of the present invention will now be described by way of example only with reference to the accompanying drawings in which:

FIG. 1a is a block diagram of a pair of systems, each including moving masses;

FIG. 1b is another block diagram of the pair of systems shown in FIG. 1a;

FIG. 2a is a plan view of a pair of systems including moving masses similar to the systems shown in FIG. 1a;

FIGS. 2b to 2g are graphs of experimental results illustrating resultant linear velocities and linear momenta of the masses in the systems shown in FIG. 2a before, during and after interaction between the masses;

FIG. 7 is a top plan view of another embodiment of an impulse drive;

FIGS. 9 to 11 show different embodiments of a portion of the impulse drive illustrated in the figures.

FIG. 26 is an enlarged top plan view of a portion of the impulse drive shown in FIGS. 17, 24, and 25;

FIGS. 27a and 27b show plan views of interactions between a pair of masses which move curvilinearly, with similar interactions and resultants to those illustrated in FIGS. 1a, 1b, and 2a, and to those illustrated graphically in FIGS. 2h to 2s;

FIGS. 28a and 28b show plan views of interactions between a pair of masses movable along a track similarly to those masses in FIGS. 27a and 27b;

DESCRIPTION OF THE PREFERRED EMBODIMENTS

Figure 2H:
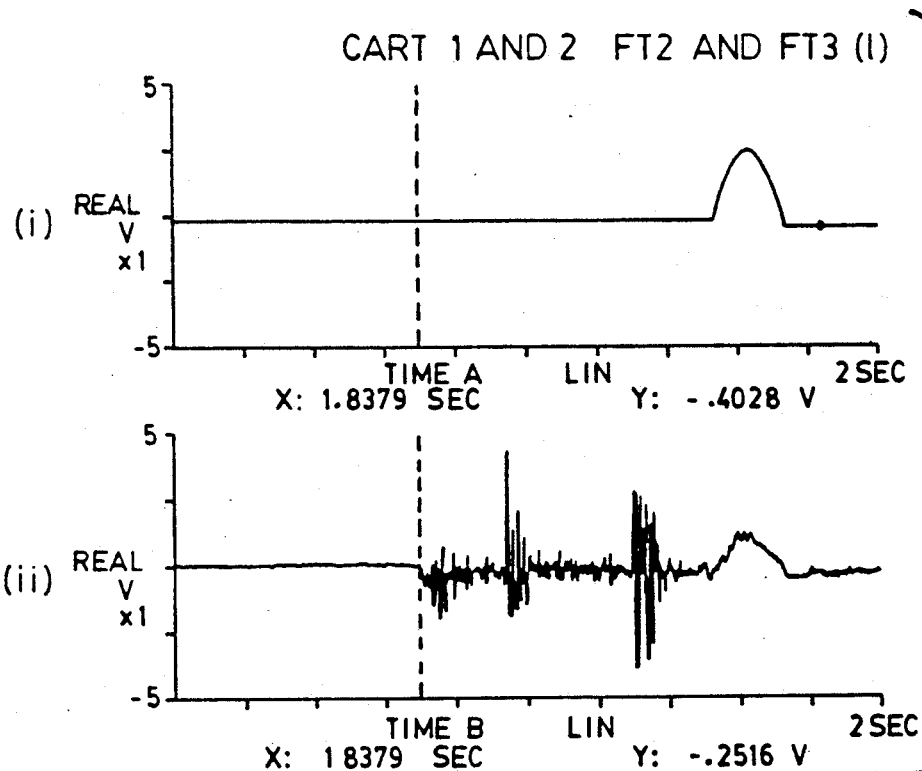
FIGS. 2h to 2s are graphs of additional experimental results illustrating impulses applied by masses similar to those shown in FIG. 2a, and without the arm 33, to the end of a third flat base cart, mounted on a level structure and supporting the masses, and the resultant to linear momentum curves derived therefrom.

For over three hundred years, Sir Isaac Newton's Third Law of Motion, "To every action there is always an opposed equal reaction; or, the mutual actions of two bodies upon each other are always equal and directed to contrary parts.", has been interpreted as all-encompassing. However, in chapter two, "Axioms, or Laws of Motion" in the 1729 translation of Sir Isaac Newton's "Philosophiae Naturalis Principia Mathematica" by Andrew Motte, revised in 1946 by Florian Cajori, Newton discusses the Third Law of Motion. In Corollary III, he discusses conservation of the quantity of motion or linear momentum relative to an origin O of an inertial reference frame, in "linear" reflections between two bodies. This he elaborated on in the Scholium with regard to pendulum experiments to verify the Third Law of Motion which were presented before the Royal Society in England. Yet, he clearly noted at the end of Corollary III that "From such kind of reflections sometimes arise also the circular motions of bodies about their own centers. But these are cases which I do not consider in what follows; and it would be too tedious to demonstrate every particular case that relates to this subject.".

According to the present invention, well-defined experiments with precise measurements have been conducted to determine the resultant effects of the circular motions to the quantity of relative linear motion or relative linear momentum, in interactions and reflections between two bodies. These experiments, electronically measured, clearly demonstrate that a portion of the linear momentum or the center of mass angular momentum of one body or mass can be resolved and absorbed by the circular motion or angular momentum of a wheel or ring system mounted on and integral to a second body or mass. By the results of these experiments, Sir Isaac Newton's second law of motion, which is applicable in pure linear actions and interactions, can be understood and revised to include, additionally, internally derived forces or impulses. That is, $F_{CM,NET} = Ma_{CM}$ wherein $F_{CM,NET}$ is the resultant force applied at the center of mass (CM), whether externally or internally derived.

Furthermore, the following is applicable. In a system involving a circularity or non-linearity, a resultant action or event can occur which has no reaction, or which has a proportionately diminished linear reaction. In addition, the relative linear motion and relative linear momentum of one body, acting upon another, can be reduced and resolved, proportionately to the resultant circular, non-linear motion, or angular momentum, of another body or system so that the total, resultant quantity of relative linear motion or relative linear momentum of the combined center of mass of the system can be internally, within the system, increased or decreased in any given direction.

In the following and throughout the specification, the terms linear acceleration, linear velocity, linear or translational kinetic energy, and linear momentum refer to the motion being considered as occurring along a line which extends radially outwards from an observer, at an origin O of an inertial reference frame, or to relative linear motion with respect to a point or position as otherwise designated and described. Referring now to FIGS. 1a and 1b, a system is shown and generally indicated by reference numeral 20. For clarity, the system 20 is being described to provide a simple example of the operation of the present invention. The system 20 includes a pair of spaced bodies 22,24, the bodies 22,24 being of equal mass $m_{22}$ and $m_{24}$ respectively (i.e. $m_{22}=m_{24}$). Each of the bodies 22,24 has a pair of vertical shafts 27 extending upwardly from its upper surface which support horizontally oriented, intermeshing discs 26. The two discs 26 provided on each of the bodies 22,24 are positioned so that the bodies are symmetrical about the x, y and z planes. On one of the bodies 22, the discs 26 are locked and prohibited from rotating about the shafts 27, while on the other body 24, the discs 26 are free to rotate about the shafts 27.

Another pair of bodies 28,30 is provided, with each body 28,30 being associated with one of the bodies 22,24. Similarly, the bodies 28,30 are of equal mass $m_{28}$, $m_{30}$ respectively (i.e. $m_{28}=m_{30}$). Furthermore, the total mass of bodies 28,30 are chosen to be equal to approximately one quarter to one third of the total mass of bodies 22,24. Each body 28,30 includes a pair of arms 31, with each arm including two sections 31a,31b respectively. The bodies 28,30 communicate with a drive 32 which is operable to apply an impulse J and impart identical, equal, finite quantities of linear kinetic energy U to each body 28,30. The bodies 22,24,28 and 30 are movable along a guide 34 so that the linear kinetic energy U, applied to the bodies 28,30 by the drives 32, can be used to move the bodies in the system 20.

In operation, when the drives 32 impart equal, finite quantities of linear kinetic energy U to each of the bodies 28,30 respectively, each body 28,30 accelerates along the guide 34 in the direction of arrow 36, with a resultant linear velocity $v_{28}$, $v_{30}$ respectively, a resultant linear momentum $P_{28}$, $P_{30}$ respectively, and having a translational kinetic energy $K_{T28}$, $K_{T30}$ respectively (see FIG. 1b). The linear velocities, the linear momenta, and the translational kinetic energies of the bodies 28,30 are proportional to the magnitude of the equal impulses J, and linear kinetic energy U, applied to the bodies 28,30 by the drives 32. Assuming that the bodies 28,30 move without friction along the guides 34, since the bodies 28,30 are equal in mass and receive equal, finite quantities of energy, the translational velocities $v_{28}$, $v_{30}$ of the bodies 28,30, in response to the applied impulses J, are identical. Furthermore, the bodies 28,30 have equal, finite quantities of translational kinetic energy, i.e. $K_{28}=K_{30}=K_{T28}=K_{T30}=\frac{1}{2}m_{28}v^2_{28}=\frac{1}{2}m_{30}v^2_{30}$, and equal linear momenta, i.e. $P_{28}=m_{28}v_{28}=P_{30}=m_{30}v_{30}$.

When the body 28 interacts with body 22, the sections 31a of the arms 31 interact electromagnetically with the body 22. The translational kinetic energy $K_{T28}$ and linear momentum $P_{28}$ of the body 28 is transferred to the body 22, so that the body 22 begins moving along the guide 34 in the direction of arrow 36. During and as a result of this interaction, body 28 decelerates and comes to rest along the guide 34 after having travelled a distance $d_{28}$ from its initial starting position along the guide 34, at which time the interaction is electronically disengaged. Assuming that body 28 transfers substantially all of its finite quantity of linear momentum $P_{28}$ to the body 22 during the interaction, and assuming that momentum is conserved, the body 22 now translates and moves linearly along the guide 34 in the direction of arrow 36 with a velocity of $v_{22}=m_{28}v_{28}/m_{22}$.

After the interaction between the bodies 28 and 22, the body 22 will have a translational kinetic energy $K_{T22}=\frac{1}{2}m_{22}v^2_{22}$ and linear momentum $P_{22}=m_{22}v_{22}$. The body 22 will also have a total energy $E_{22}$ which is equal to $K_{T22}+Q_{22}$ and to $\frac{1}{2}m_{22}v^2_{22}+Q_{22}$. Furthermore, the body 22 will have a linear momentum $P_{22}=m_{22}v_{22}$ equal to the linear momentum $P_{28}$ of body 28. In the above, $Q_{22}$ designates other forms of energy loss in the interaction between bodies 28 and 22 due to heat, friction, mechanical inefficiencies, etc., which can be and are minimized. The quantity of $Q_{22}$ also represents temporarily stored, spring energy of the compressed, electromagnetic fields, which, upon electrical disengagement of the interaction, is subsequently converted to stored, electrical energy in the batteries used to power and energize the drives 32 and electromagnetic components on the arms 31 and discs 26.

Simultaneously, when body 30 interacts with body 24, the sections 31b of arms 31 interact electromagnetically with the body 24 and with the discs 26 at radii r. In this instance, the discs 26 are caused to accelerate rotationally, or to decelerate rotationally if the discs 26 are pre-spinning. Thus, some of the finite quantity of translational kinetic energy $K_{30}=K_{T30}=\frac{1}{2}m_{30}v^2_{30}$, and linear momentum $P_{30}=m_{30}v_{30}$ of body 30 is transmuted and transferred into a finite portion of rotational kinetic energy $K_{R24}=\frac{1}{2}Iw^2_{DISCS(24)}$, and angular momentum $L_{26}=I_{26}w_{26}$ of the discs 26, either to increase or decrease their spin. Also, some of the translational kinetic energy $K_{T30}$ and linear momentum $P_{30}$ is transferred into linear acceleration of the body 24, a finite portion of resultant translational kinetic energy $K_{T24}=\frac{1}{2}m_{24}v^2_{24}$, and a lesser quantity of resultant linear momentum $P_{24}$. This results in the body 24 obtaining a linear velocity $v_{24}$ which is less than the linear velocity $v_{22}$ of body 22. Thus, the total energy $E_{24}$ of body 24 can be designated by $K_{R24}+K_{T24}+Q_{24}=\frac{1}{2}Iw^2_{DISCS(24)}+\frac{1}{2}m_{24}v^2_{24}+Q_{24}$, wherein $Q_{24}$ represents other forms of energy loss in the interaction between bodies 24 and 30 due to heat, friction, mechanical inefficiencies, etc. Similarly, the quantity $Q_{24}$ also represents temporarily stored, spring energy of the compressed, electromagnetic fields, which upon electrical disengagement of the interaction, is subsequently converted to stored, electrical energy in the batteries used to power the system. The losses $Q_{24}$ can be and are minimized so that most of the translational kinetic energy $K_{30}$ of body 30 is retained as rotational and translational kinetic energy $K_{R24}$ and $K_{T24}$, respectively, of body 24. Thus, the total kinetic energy resultant of body 24, $K_{24}=K_{R24}+K_{T24}$ is equal to $\frac{1}{2}Iw^2_{DISCS(24)}+\frac{1}{2}m_{24}v^2_{24}$. During and as a result of the interaction of body 30 with body 24, body 30 decelerates and comes to a stop along the guide 34, after having moved a distance $d_{30}$ from its initial starting point along the guide 34, equal to that distance of linear displacement $d_{28}$ of body 28, at which time the interaction between the bodies is electronically disengaged.

If the losses $Q_{22}$ and $Q_{24}$ are minimal or negligible, then the energy U applied to each body 28,30 respectively, by the drives 32, is equal to the total energy E in each body after having received the energy from the drive. The total energy E is also equal to the kinetic energy K of each body 28,30 and the quantity of motion or linear momentum of each body 28,30 is equal. Since a portion of the linear momentum of body 30 is transmuted into rotational or angular momentum of the discs 26 on body 24, while the total quantity of the linear momentum of the body 28 is transferred to linear momentum of the body 22, and if each of the bodies 28,30 comes to rest as a result of their respective interactions, the resultant linear momentum of the body 22 is greater than the resultant linear momentum of body 24.

The system 20 does not breach natural law, processes and interactions. Since a portion of the original, finite quantity of translational or linear kinetic energy $K_{30}$ and linear momentum $P_{30}$ of body 30 is transferred by transmutation into rotational kinetic energy $K_{R24} = \frac{1}{2}Iw^2 - DISCS(24)$ and angular momentum $L_{26} = I_{26}w_{26}$ of the discs 26 on body 24, only a portion of the initial, finite quantity of linear kinetic energy $K_{30}$ and linear momentum $P_{30}$ is available to transfer from body 30, and transmute into a translational or linear kinetic energy component $K_{T24}$, and a linear momentum component $P_{24}$, of the body 24 through the interaction.

Accordingly, the translational kinetic energy $K_{T24} = \frac{1}{2}m_{24}v^2_{24}$, the resultant linear velocity $v_{24}$, and thereby the resultant linear momentum $P_{24} = m_{24}v_{24}$ of the body 24, is less than the corresponding values of body 30 prior to their interaction. Also, the resultant translational kinetic energy $K_{T24}$, linear velocity $v_{24}$, and linear momentum $P_{24}$ of the body 24 is less than the corresponding values of body 22, after its interaction with body 28. Considering this, one may look at and consider the law of Conservation of Total Momentum and realize that the linear momentum of one particle or mass can be transmuted into rotational momentum and "linear" momentum of another mass or mass system such that total momentum is conserved. This is so when considering the sum of the absolute values, of the resultant, individual changes in quantity of spin; yet more so, accordantly, in those specific cases wherein no further, internally actuated increase or decrease in the resultant quantity of spin occurs. However, the above example concludes that linear momentum is not conserved. This can be seen and defined initially in terms of the law of Conservation of Energy that is of higher rank, than the Law of Conservation of Linear Momentum.

To illustrate these findings, experiments were performed using carts supported on a track similar in configuration to the bodies 22,24,28, and 30 respectively, as is shown in FIG. 2a. For the sake of clarity, the same reference numerals used in FIGS. 1a and 1b will be used to indicate like components in the embodiment shown in FIG. 2a. The results of the experiments are illustrated in FIGS. 2b to 2g. In these experiments, the mass of each Cart 28,30 was equal to 0.286 kg. The mass of each Cart 22,24, including the flywheel, was equal to 1.293 kg, and the mass of the flywheel 26 was equal to 0.970 kg. The flywheel diameter was 0.254 m and the mass moment of inertia J of the flywheel was 0.00782 kg.m². The flywheel on the cart 24 also included a rod 33 secured to the periphery of the flywheel 26. A mass 26a was also provided on the flywheel 26 to maintain the dynamic balance of the flywheel.

During the experiment in Configuration B, the initial interaction between the Carts 30,24 began near the end of the rod 33, at a distance d=0.43 m. A repelling magnetic interaction between a magnet 36 on Cart 30, and a magnet 38 located at radius r on the flywheel 26 of Cart 24, occurred as Cart 30 approached and interacted with Cart 24. Both Carts 30,24 were equipped with accelerometers 40, and both acceleration signals generated in each test were fed into a GenRad 2515 Computer Aided Test System. For each test, the cart acceleration time histories were numerically integrated to yield the corresponding velocity profiles. FIGS. 2b to 2g illustrate the obtained velocity profiles. The initial ramp on the velocity profile, representing Carts 28,30, was caused by a small dc bias in the acceleration signal due to the trigger mechanism causing a slight tilt of Carts 28,30 before their release.

At the beginning of each test, Carts 28,30 were pressed against a coil spring and kept stationary with an electromagnetic trigger. Carts 22,24 were positioned down the track from the Carts 28,30 with their rear ends approximately 15 cm from the front end of the Carts 28,30. At the moment of trigger release, indicated by marker 1 in FIGS. 2b to 2g, Carts 28,30, propelled by the spring, accelerated toward Carts 22,24 quickly acquiring their full speed.

In Configuration A, after impact both Carts 28,22 moved along the track and were quickly brought to a stop due to friction forces occurring in the sleeve bearings of the cart wheel axles and in the track-wheel contact zones, and also due to air resistance.

In Configuration B, when Cart 30 was approaching Cart 24, the rod 33 coming into contact with the left front corner of Cart 24 caused the flywheel on Cart 24 to rotate, as well as caused the Cart 24 to move forward along the track. The interaction also caused Cart 30 to decelerate. The repelling, magnetic interaction between magnet 36 on Cart 30, and the magnet 38 on the flywheel 26 at radius r on Cart 24, further increased these actions. Minimal frictional losses in a ball bearing of the flywheel resulted in the flywheel spinning, even after both Carts 30,24 were stopped due to friction forces and due to air resistance. This demonstrated that a portion of the original, linear kinetic energy and "linear" momentum of Cart 30 was transmuted into rotational kinetic energy and angular momentum of the flywheel on Cart 24.

Three separate tests each for Configuration A and for Configuration B were conducted. From the test summary, for Configuration A, the average Cart 28 velocity $v_{28}$ immediately before impact, was 0.439 m/s. The average Cart 22 velocity $w_{22}$ after impact was 0.112 m/s. The quantity u designates the linear velocities of the Carts 28,30 after the interaction with the Carts 22 and 24 respectively. From the test summary for Configuration B, the average Cart 30 velocity $v_{30}$ before impact was 0.448 m/s. The average Cart 24 *maximum* velocity $w_{24}$ was 0.015 m/s.

The test results clearly indicate that although the velocity of the Carts 28,30 before contact with Carts 22,24 were similar for both test configurations, the resultant Cart 22 velocity $w_{22}$ was substantially greater for Configuration A than for Configuration B. The ratio of the respective resultant velocities $w_{22}/w_{24}$ was equal to 7.5. It was concluded that the experiment demonstrated that the cart interaction for the two, tested configurations resulted in higher final velocity, translational kinetic energy, and linear momentum of Cart 22 when direct contact (impact) between both Carts 28,22 occurred (Configuration A), than when the flywheel 26 was involved in the energy and momentum transfer (Configuration B). The Cart 22 to Cart 28 velocity ratio $w_{22}/v_{28}$ was equal to 0.255 for Configuration A, and the Cart 24 to Cart 30 velocity ratio $w_{24}/v_{30}$ was equal to 0.033 for Configuration B.

The difference between these results, in Test 1 and Test 2, is partly due to the engagement of the aluminum rod 33 of the flywheel by Cart 30, causing the flywheel to rotate. Additionally, the repelling, magnetic interaction between magnet 36 on Cart 30 and magnet 38 on flywheel 26, caused the flywheel to accelerate further rotationally, thereby further decelerating Cart 30 in this process. Thus, although the bodies 22,24 interact with identical bodies 28,30 having the same, finite quantity of linear kinetic energy and linear momentum, the resultant linear velocities and linear momenta of the bodies 22,24 are substantially different, due to the transmutation of linear kinetic energy and linear momentum to rotational kinetic energy and angular momentum in body 24.

Accordingly, the system 20 allows two bodies 22,24 to be accelerated with different resultant linear velocities and linear momenta even though equal, finite quantities of linear or translational kinetic energy and linear momentum are initially applied to each body 22,24 respectively. This is accomplished by transmuting a portion of the initial, finite quantity of linear momentum and translational kinetic energy of one body, into angular momentum and rotational kinetic energy of another body, by increasing or decreasing the spin of the discs 26 during this interaction.

Since energy is the ability to do work, the system of bodies 28,22 has a greater ability to do work linearly after interaction, than the system of bodies 30,24 after interaction. With the above parameters, this difference in the ability to do work linearly is represented by $K_{T22} - K_{T24} = K_{T,NET}$. This amount of linear kinetic energy, $K_{T,NET}$, can be applied to do work linearly on a body, or on the center of mass of a system of bodies to change their state of motion.

Other similar, precision experiments have been conducted, with the carts 28,30 and the carts 22,24 supported on tracks secured to the top of a third, flat, base cart (not shown), also supported on tracks. The results of these experiments are shown in FIGS. 2h to 2s. Two variations of the first and second cart systems were tested, both without a rod attachment. In the first variation, Carts 28,30 had a mass equal to 0.620 kg, while the Carts 22,24 had a mass equal to 1.785 kg. In the second variation, Carts 28,30 had a mass equal to 0.329 kg, while Carts 22,24 had a mass equal to 1.528 kg. In the first variation, the Carts 22,24 were provided with a single flywheel 26 having a radius equal to 23.3 cm. In addition, the flywheel 26 on the second cart body 24 was mounted on an electric motor which produced an additional torque, during the magnetic interaction with the magnet on the first cart body 30, at radius r in each test. This torque was applied to the flywheel 26 of the second cart body 24, in a direction opposite to the direction of the angular acceleration of the flywheel caused by the magnet on the first cart body 30, during the engagement, and was controlled by electrical switching integral to the flywheel and the base of the second cart body 24. The degree of this torque was accurately pre-adjusted by an electrical transformer, to control precisely the braking or deceleration of the first cart body 30.

Accelerometers 40 were mounted on the carts, and force transducers were mounted against each end, as well as on top of the negative end, of the third, flat, base cart, to record, in addition to the impulse applied in the initial linear acceleration of carts 28,30, and the impulse applied in the linear decelerations of carts 22,24 respectively, friction forces on the tracks of the third flat base cart. From the tests of the pure "linear" interactions and reflections, sums were taken of the positive and negative impulses, including the negatively directed, friction forces. The difference calculated by subtracting the negative sum from the positive sum was attributed to air resistance to the motions of the carts 28,30, and to the carts 22,24, which was taken into account in determining the accurate results.

The difference of the resultant, respective sums of "linear" momenta of the cart systems was confirmed by taking the difference of the resultant, negative sums of the respective impulses, as electronically recorded by the force transducers at the negative end of the third, flat, base cart. The first cart bodies 28,30 received equal impulses, causing equal, linear accelerations to equal, resultant, linear momenta in all tests. This difference was determined by integrating the respective, force through time curves for the respective, linear momentum curves. By a comparison of the linear momentum curves for the two test cases, for each of the two, individual, prototype systems comprising three carts, and by accounting for all factors contributing to these results, e.g., air resistance, friction, etc., it was determined that the resultant differentials were, consistently, not less than 15% for the first variation of tests, and not less than 30% for the second variation of tests. This difference, which can be applied to the center of mass of a complete system as a net impulse, is attributable to the transmutation of a portion of the linear momentum of the first cart body 30, into angular momentum of the flywheel or wheel system mounted on the base of the second cart body 24.

The results of the tests described above are illustrated in FIGS. 2h to 2s, which show graphs of the test results. In particular, FIG. 2h(i) shows the impulse applied by the Cart 22, after the linear interaction, directly to force transducer number FT2 located on the top of the third base cart, while FIG. 2h(ii) shows the same impulse applied by Cart 22, as registered by the force transducer number FT3 mounted against the same end of the third base cart, as is located force transducer number FT2. The irregularities in the graphs represent accelerations of the Carts, vibration of the third base cart, and the linear impact between the Carts. FIGS. 2j and 2k show two samples of momentum curves derived from integrating the curves illustrated in FIGS. 2h, with curve 41 being derived from graph 2h(i), and curve 42 being derived from graph 2h(ii).

Figure 2I:
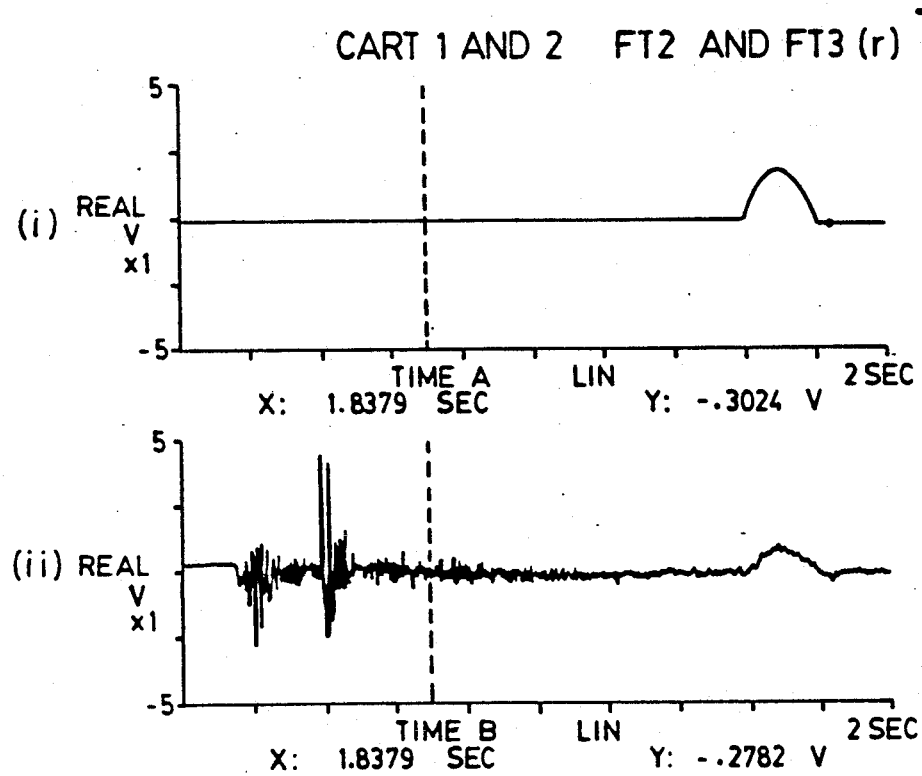
Figure 2J:
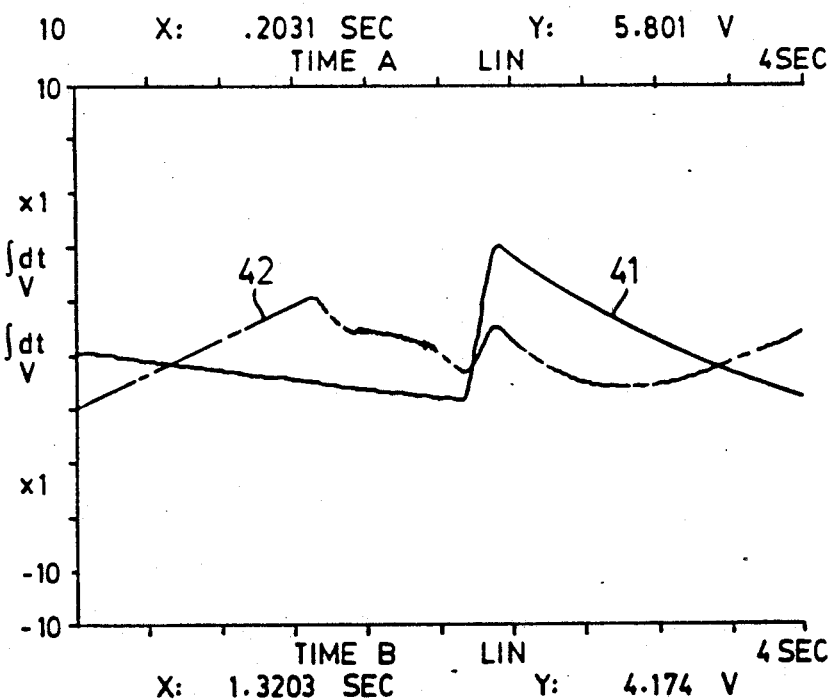
Figure 2K:
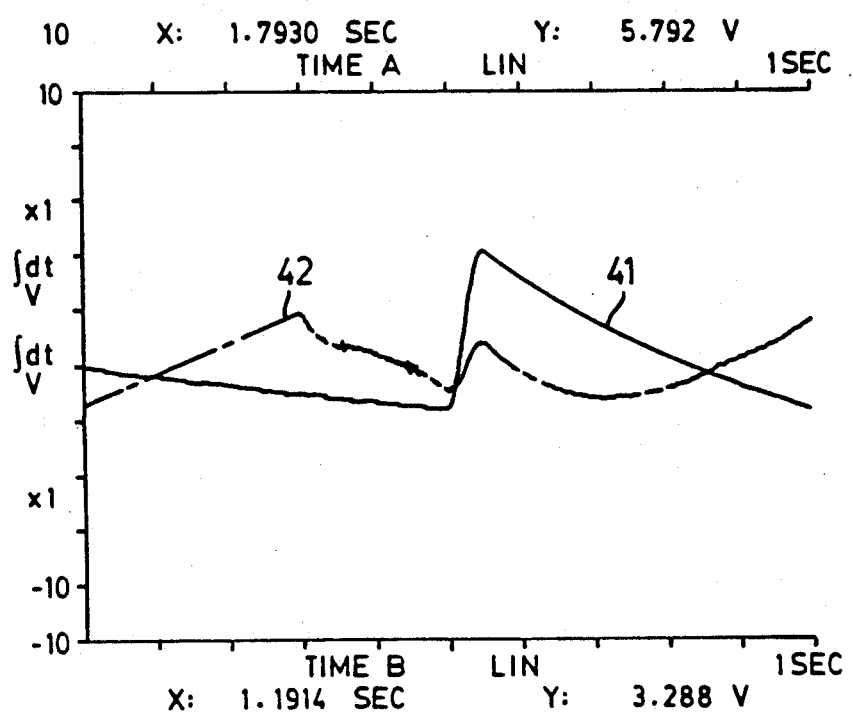
Figure 2L:
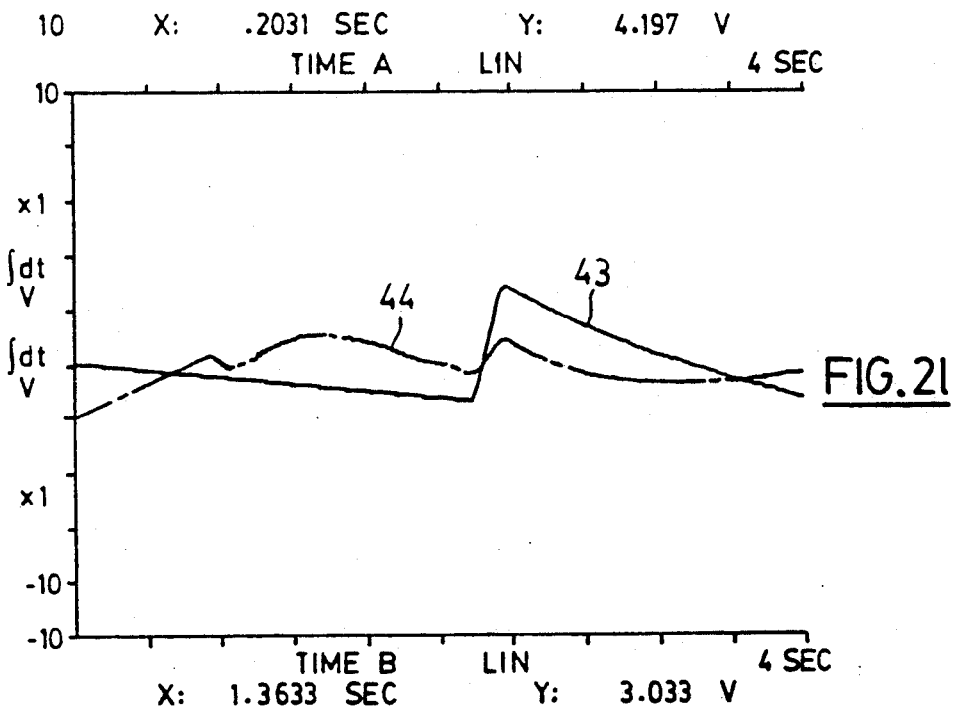
Figure 2M:
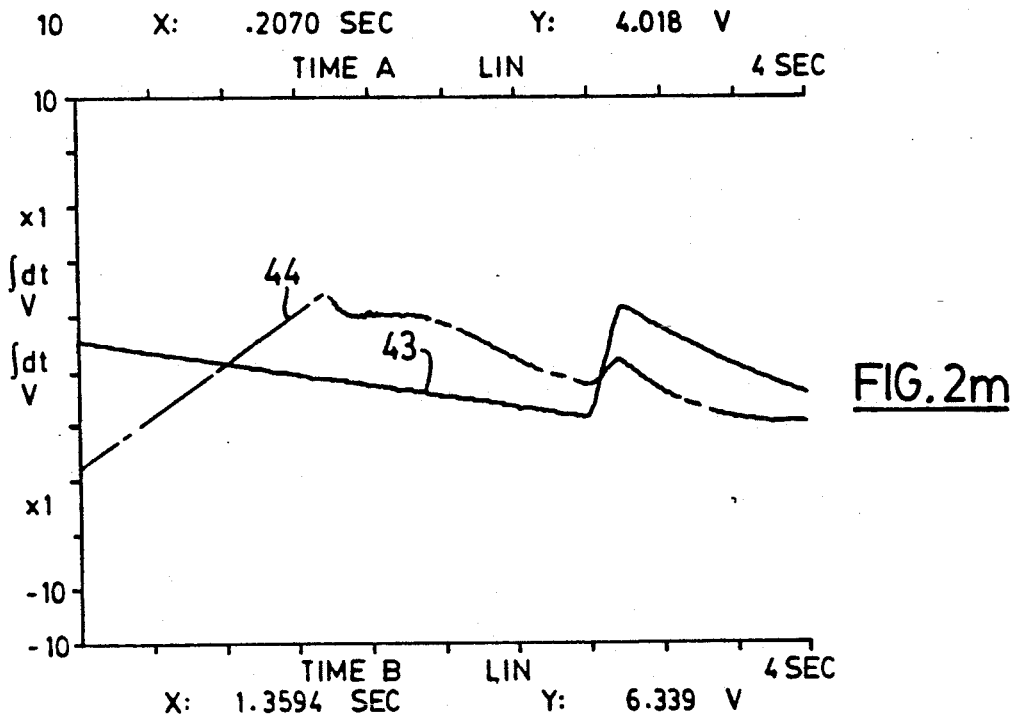

On the other hand, FIG. 2i(i) similarly shows the impulse applied by the Cart 24 after the interaction causing rotation of the flywheel, and FIG. 2i(ii) shows the same impulse applied by Cart 24 as recorded by force transducer number 3. The irregularities in the graphs represent accelerations of the Carts, vibration of the third base cart, and the interaction between the Carts. Similarly, FIGS. 2l and 2m show two samples of momentum curves derived from integrating the curves illustrated in FIGS. 2i, with curve 43 being derived from graph 2i(i), and curve 44 being derived from graph 2i(ii). By visually comparing the respective graphs, one can notice the significantly distinct differences between the resultant impulses applied in the Case 1 tests of linear interactions (direct impacts), and the resultant impulses applied in the Case 2 tests with the partial rotational interactions and absorptions of motion and momentum.

Figure 2N:
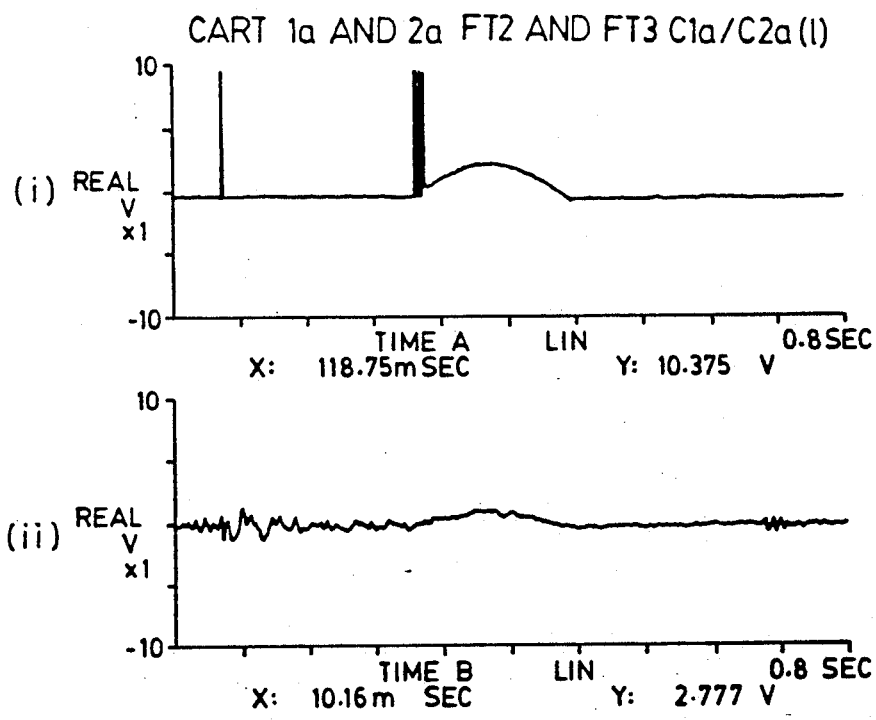
Figure 2O:
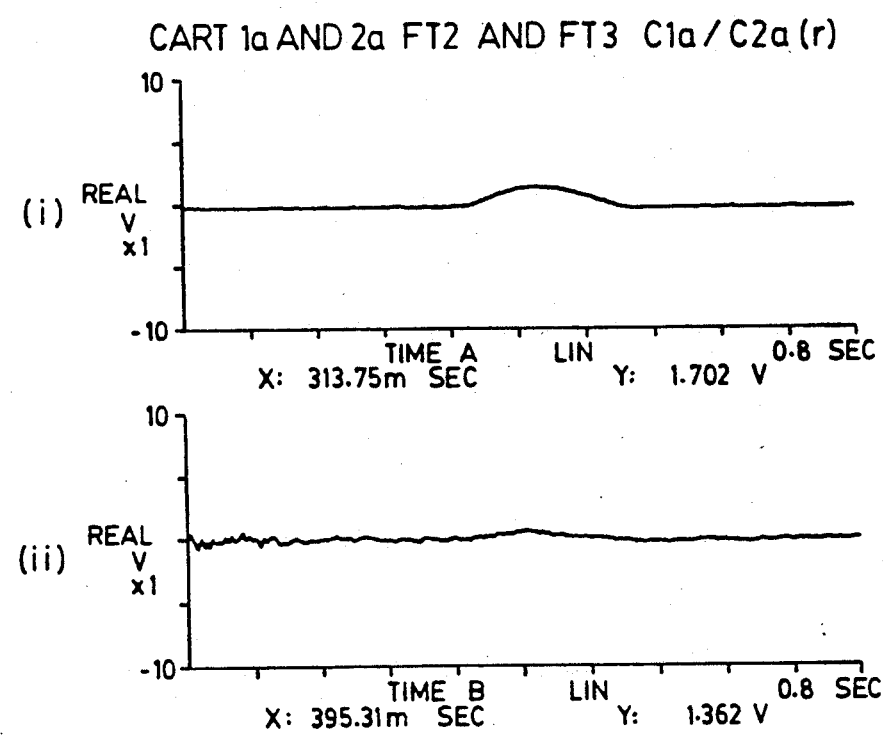

FIGS. 2n to 2s illustrate the results of the second variation of tests, wherein the Carts 22,24 were provided with a pair of internally interacting flywheels, for absorbing linear kinetic energy, and linear momentum relative to the end of the third base cart. FIG. 2n(i) shows the impulse applied by the Cart 22 to force transducer number FT2 during this test with a linear interaction, while FIG. 2n(ii) shows the impulse applied by the Cart 22 through the third base cart, as recorded by force transducer number FT3. In contrast, FIG. 2o(i) shows the impulse applied by the Cart 24, in the case with rotation, and FIG. 2o(ii) shows the impulse applied by the Cart 24, as recorded by force transducer number FT3. Once again, by visually comparing the respective graphs, one can notice the significantly distinct, impulse differentials, of the Case 1 test results compared with the Case 2 test results.

Figure 2P:
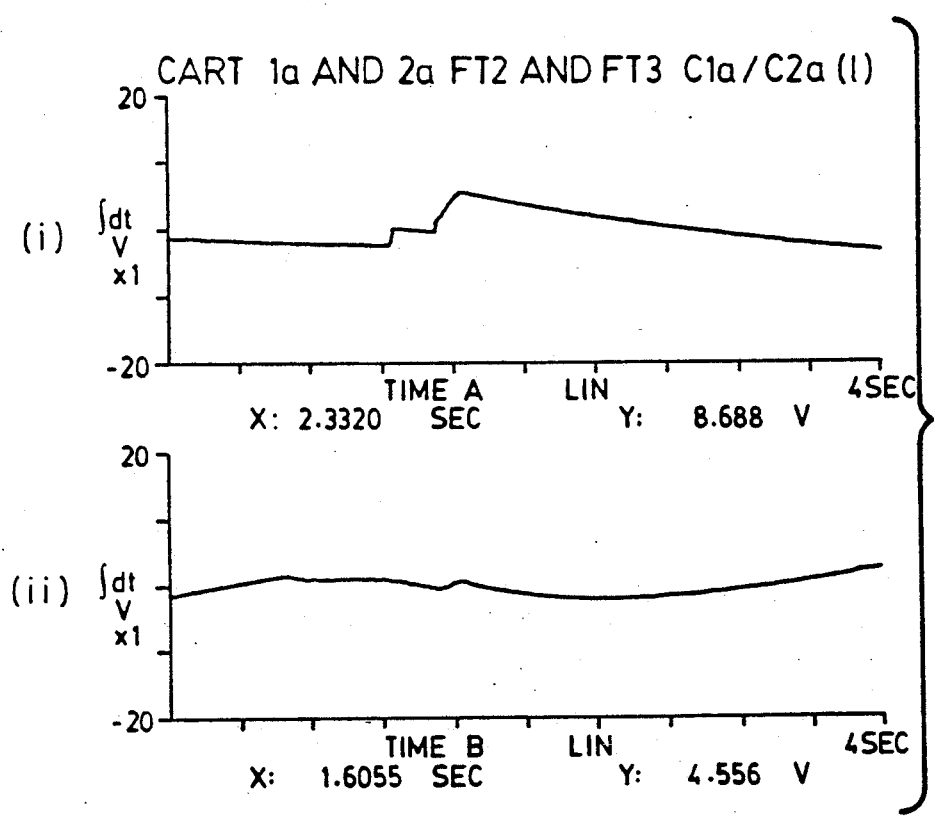
Figure 2Q:
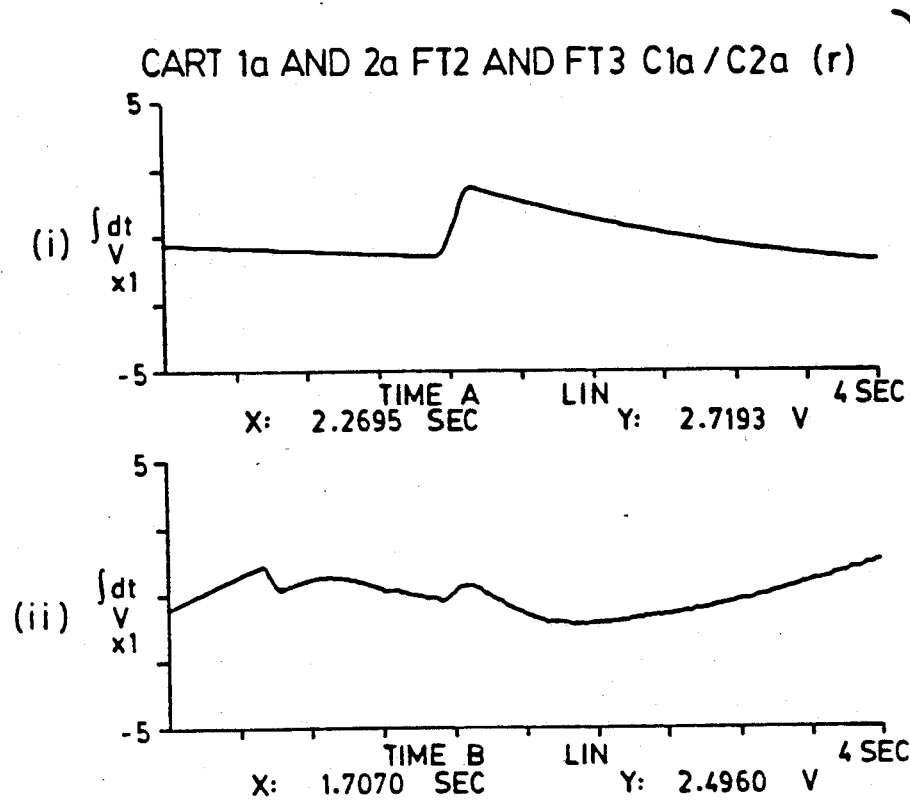

FIG. 2p(i) shows a momentum curve derived by integrating the curve shown in FIG. 2n(i), while FIG. 2p(ii) shows a momentum curve derived by integrating the curve shown in FIG. 2n(ii). Similarly, FIG. 2q(i) shows a momentum curve derived by integrating the curve shown in FIG. 2o(i), while FIG. 2q(ii) shows a momentum curve derived by integrating the curve shown in FIG. 2o(ii). By adjusting the respective scales, the very significant, resultant deltas or differentials should be apparent.

Figure 2R:
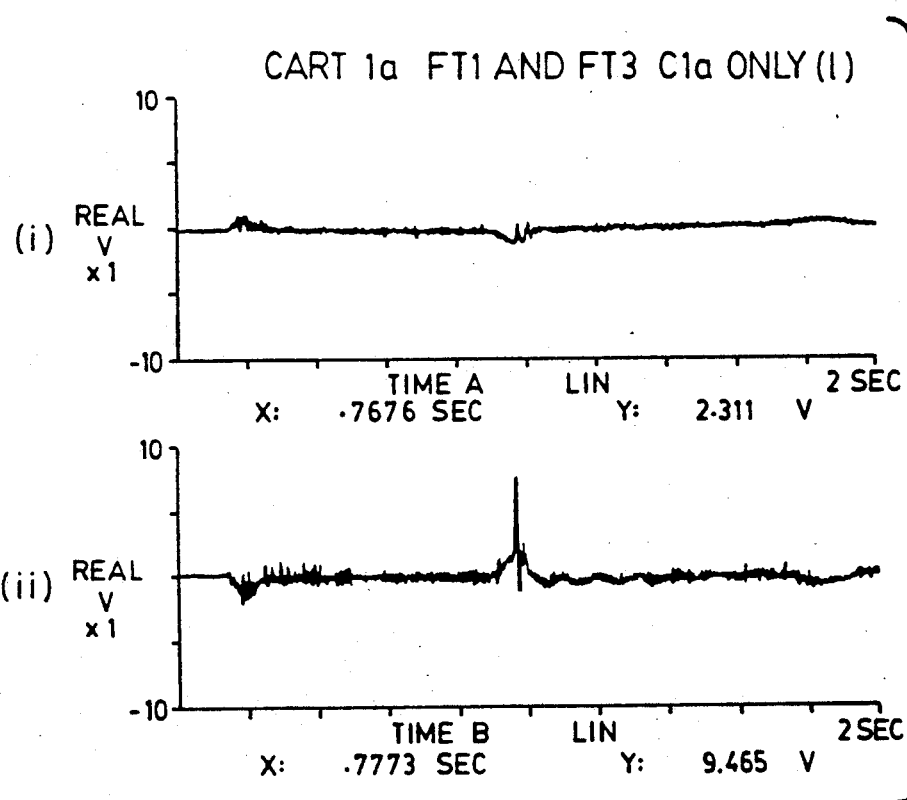
Figure 2S:
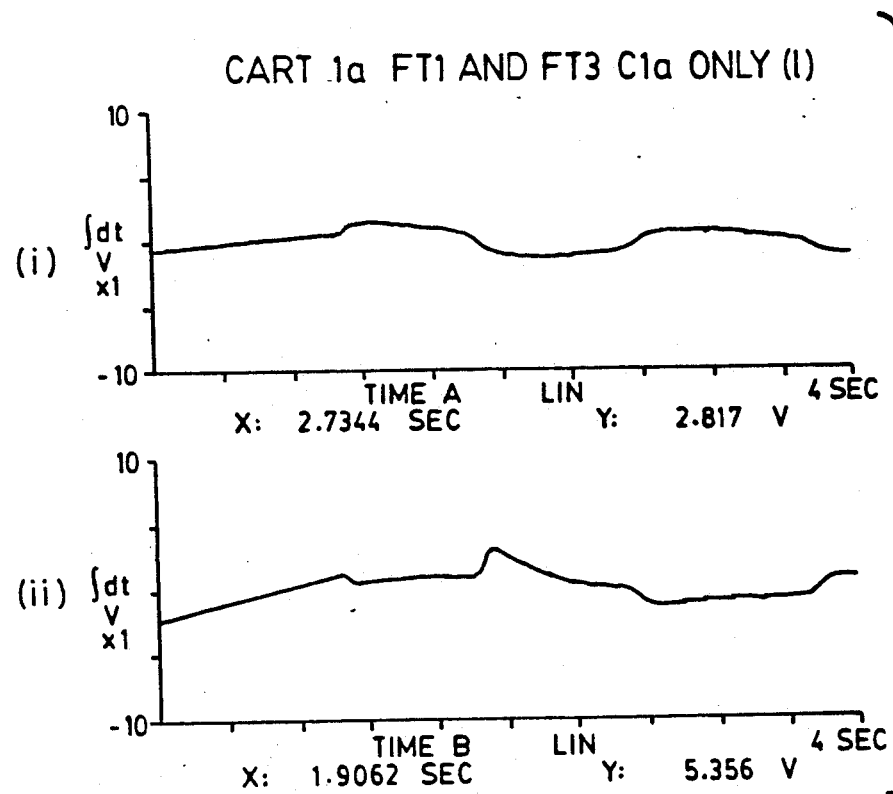

FIGS. 2r(i) and 2r(ii) show impulse curves measured by the force transducers FT1 (mounted on the base support and against the initial, one end of the third base cart), and FT3 (similarly, mounted against the resultant, other end of the third base cart), resulting from the initial, magnetic, linear acceleration of the Cart 28 or 30, of the second variation of tests, and allowing Cart 28 or 30 to travel the length of the track, without undergoing any interaction, so that it rebounds off permanent magnets located on top of the negative end of the track on the third base cart. FIGS. 2s(i) and 2s(ii) are momentum curves derived from the impulse curves shown in FIGS. 2r(i) and 2r(ii) respectively.

It should be apparent from the above tests that a portion of the total quantity of the initial, linear motion and the initial, linear momentum of body 30, which is motion relative to a location on the end of the third base cart, is transmuted during the interaction into angular motion and angular momentum of the flywheels 26, on the second body 24, through the application of external torques, $T_{EXT}=Fxr$, applied to the flywheels at radii r by the body 30. Accordingly, the flywheels 26, on the second body 24, rotationally brake and rotationally absorb a portion of the total quantity of the initial linear motion and the initial linear momentum of body 30.

The illumination and the transition of our understanding to knowledge, that the transmutation of a portion of the initial momentum of a first body, $m_1$, to angular momentum of a wheel or ring system on a second body, $M_2$, can occur, may be accomplished by giving further consideration to the parameters with which we view "linear" to non-linear conversions and transmutations, and by further including within our consideration, the second body, $M_2$. We may come to see and to understand this by considering the senior law, of conservation of angular momentum or non-linearity, which, as has been illustrated from the above, is consistent and holds true for all cases, rather than the law of conservation of linear momentum or "linearity", which will be further shown in the following to not be consistent, conserved, nor hold true for all cases.

To solve for conservation of angular momentum, a point of origin 0, of an inertial reference frame, can be chosen at any point with regard to the system of two masses. This may be chosen at some distance above, or approximately above, the axis of the flywheel or flywheel system itself. As the point of origin 0 approaches infinity, motion itself approaches zero, relative to the point of origin 0; yet, there is still a concept of motion, and a transmutation occurs. The formula for the conservation of angular momentum or conservation of the total quantity of angular or non-linear motion, relative to a point of origin 0 of an inertial reference frame, is given as, $m_1u_1r_i+M_2u_2r_i+Iw_i=m_1v_1r_f+M_2v_2r_f+Iw_f$, or, $l_{CM1i}+l_{CM2i}+l_{i,WHEELS}=l_{CM1f}+l_{CM2f}+l_{f,WHEELS}$, wherein $l_{CM}$ is the respective, individual, angular momentum of the center of mass of the first mass $m_1$, and of the second mass $M_2$, and $l_{WHEELS}$ is the respective, individual quantity of angular motion, angular momentum, or "absolute spin" of a wheel or wheel system about its axis of rotation, immediately prior to, or immediately after the interaction. From this formula it can be seen that, delta($L_{CM,m1}$)=delta($L_{CM,M2}$)+delta($L_{ROTATION,M2}$), wherein delta($L_{ROTATION,M2}$) is the resulting "absolute change" in the total quantity of rotational or angular momentum, or of "absolute spin", of the flywheel or the flywheel system about its axis or axes of rotation, without regard to the directions of the individual spin vectors. Accordingly, total angular momentum is conserved, specifically wherein no further, internally actuated increase or decrease in the resultant quantity of spin, of the wheels, occurs.

To solve for conservation of angular momentum in both cart systems shown in FIG. 1a, a point of origin outside each respective system of carts is chosen to be the origin 0 of an inertial reference frame. The origin 0 is not located on any of the carts in either system, as the basic definition of angular momentum of a particle, with respect to the origin 0 of an inertial reference frame, is $l=rxp$, wherein r is the position vector which locates the center of mass of the particle considered, with respect to this origin 0 of an inertial reference frame, and p is the "linear" momentum of the particle.

To solve for the conservation of angular momentum in the system including carts 28,22, choosing a point of origin 0 of an inertial reference frame, the formula is, $m_{28}u_{28}r_i+M_{22}u_{22}r_i=m_{28}v_{28}r_f+M_{22}v_{22}r_f$, or, $l_{CM28i}=l_{CM28i}=l_{CM28f}+l_{CM22f}$, or, delta($L_{CM28}$)=delta($L_{CM22}$), wherein angular momentum is conserved. To solve for the conservation of angular momentum in the system including carts 30 and 24, and choosing the same point of origin 0 of the inertial reference frame chosen for the other system, the formula is, $m_{30}u_{30}r_i+M_{24}u_{24}r_i+Iw_{i,WHEELS}=m_{30}v_{30}r_f+M_{24}v_{24}r_f+Iw_{f,WHEELS}$, or, $l_{CM30i}+l_{CM24i}+l_{i,WHEELS}=l_{CM30f}+l_{CM24f}+l_{f,WHEELS}$, or, delta($L_{CM30}$)=delta($L_{CM24}$)+delta($L_{WHEELS}$), wherein angular momentum is conserved.

Comparing the above formulae for the two systems, and for equal quantities of delta($L_{CM28}$) and delta($L_{CM30}$) respectively, the following can be determined:

$$\text{delta}(L_{CM22}) = \text{delta}(L_{CM24}) + \text{delta}(L_{WHEELS}).$$

Accordingly, delta($L_{CM22}$) is greater than delta($L_{CM24}$). From the preceding quantities, for equal quantities of delta($P_{CM28}$) and delta($P_{CM30}$) respectively, and by comparing the two systems, it can be determined that delta($P_{CM22}$) is greater than delta($P_{CM24}$), and that $\Sigma P_{SYSTEM\ 1}$ is greater than $\Sigma P_{SYSTEM\ 2}$ after their respective interactions, which is consistent with the experiments previously described. One may consider the initial conditions, the mutual interactions, and the resultant conditions of the two cart systems, or observe the experiments from any perspective, whereat one as the observer assumes the point of origin 0 of an inertial reference frame, and conclude that the total quantity of motion is conserved in both cases, and that in the case with rotation of the wheels or wheel systems, the total quantity of relative linear motion has been changed and is less after the interaction, as some of the initial relative linear motion of the first body has resulted in a change of the total quantity of rotational motion or "absolute spin" of the second body which supports the rotating flywheels.

If the two bodies 28,30 are located along the longitudinal axis of a system within and including a closed container, and are equidistantly spaced from the geometric center at opposite ends of the closed container, acceleration and motion of the two bodies 28,30 an equal distance d towards each other, after the application of equal, yet oppositely directed impulses J thereto, will provide no net acceleration of the closed container. The closed container does not accelerate since the equal, yet oppositely directed impulses are simultaneously applied to opposite ends of the closed container. This is in accordance with Isaac Newton's laws of motion. However, by allowing the bodies 28,30 to interact with bodies 22,24 in the above-described manner, the bodies 22,24 move in opposite directions towards one another with different resultant linear velocities, translational kinetic energies, and linear momenta. The total linear momentum P, of the combined system as a whole, is now equal to the vector sum of the linear momenta of the individual bodies, within and including the closed container. A net "linear" impulse in the direction of motion of the body with the greater translational kinetic energy and linear momentum, in this case body 22, will then be created. The difference in the linear momentum of the bodies 22,24 will be resultant upon the combined center of mass of the system, within and including the closed container, if both bodies 22,24 are decelerated and stopped simultaneously.

The above description and its various configurations, and accordant variety of interactions and sequences of interactions, is the basis on which the present impulse drive and energy absorption systems are based, as will be described hereinafter.

Referring now to FIGS. 3 to 6 an impulse drive 50 based on the previously described system 20 is shown. The impulse drive 50 includes a chamber or frame 52 having side walls 54a, 54b, end walls 56a, 56b and top and bottom walls 58,60 respectively thereby, defining a cylinder. Upper and lower pairs of rails 62,64 respectively, in the form of cylindrical rods, extend along the length of the chamber 52 and are secured at each end to one of the end walls 56. The rods 62,64, forming each pair of rails, are equidistantly and symmetrically spaced on either side of the longitudinal axis X of the chamber 52.

Figure 6:
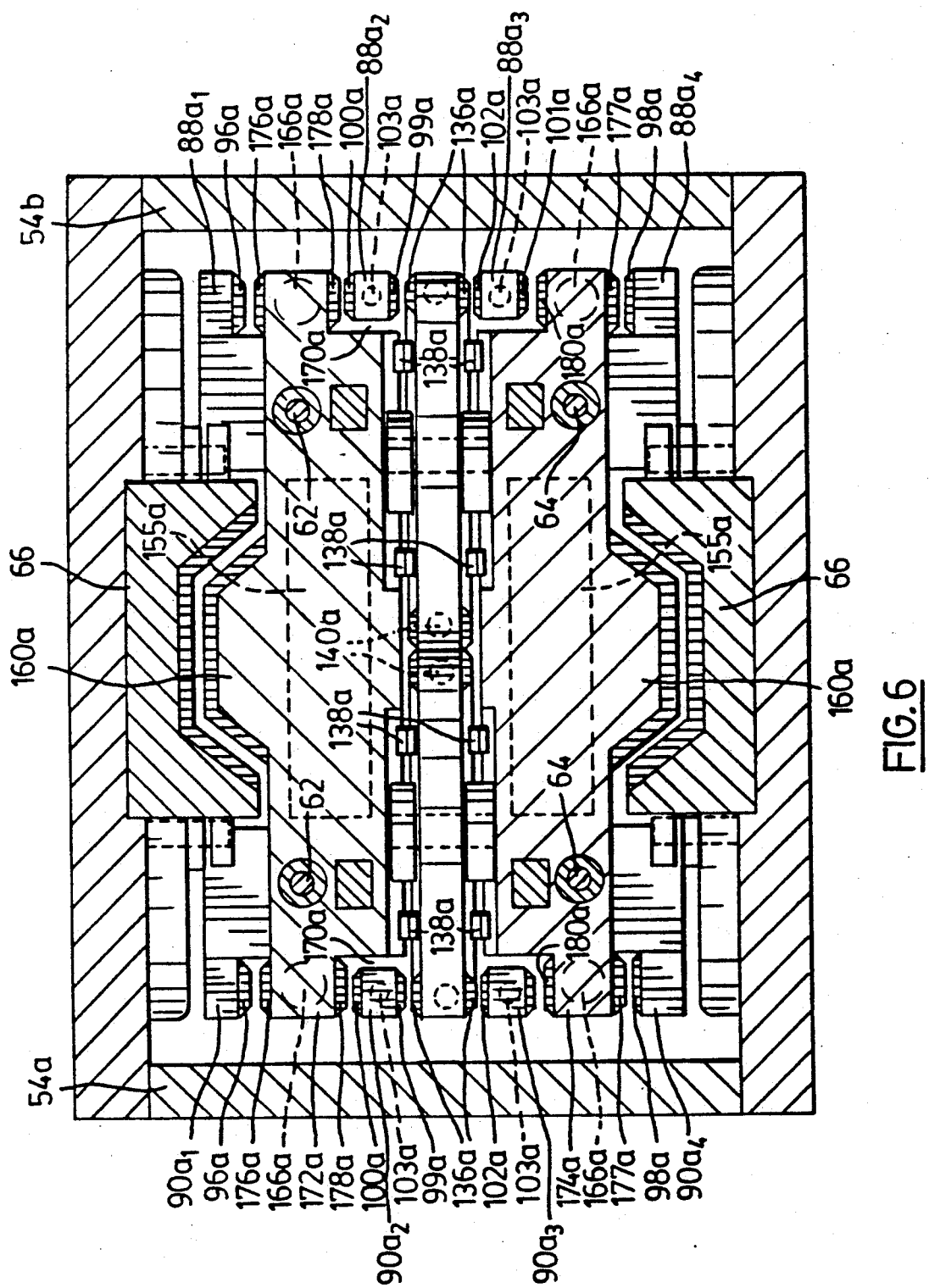
FIG. 6 is a section of the drive illustrated in FIG. 5 taken along line 6—6.

A linear induction motor railgun primary 66 is secured to the top and bottom walls 58,60 respectively, and extends along the length of the chamber 52 (best seen in FIG. 6). The railgun primaries 66 are also positioned to lie on the longitudinal axis X of the chamber 52. Each of the end walls 56a, 56b has upper and lower rectangular shaped recesses, 68a, 68b respectively, formed therein. The recesses 68 are equidistantly spaced above and below the longitudinal axis X of the chamber 52, and extend along a portion of the length of the respective end wall 56. Solenoids 69a, 69b are seated in each of the recesses and communicate with a power supply (not shown). An impulse generator in the form of a pair of systems 70,72, comprising movable masses, are disposed within the chamber 52, at each end thereof. The masses in each system are movable along the rails 62,64, as will be described herein.

Figure 3:
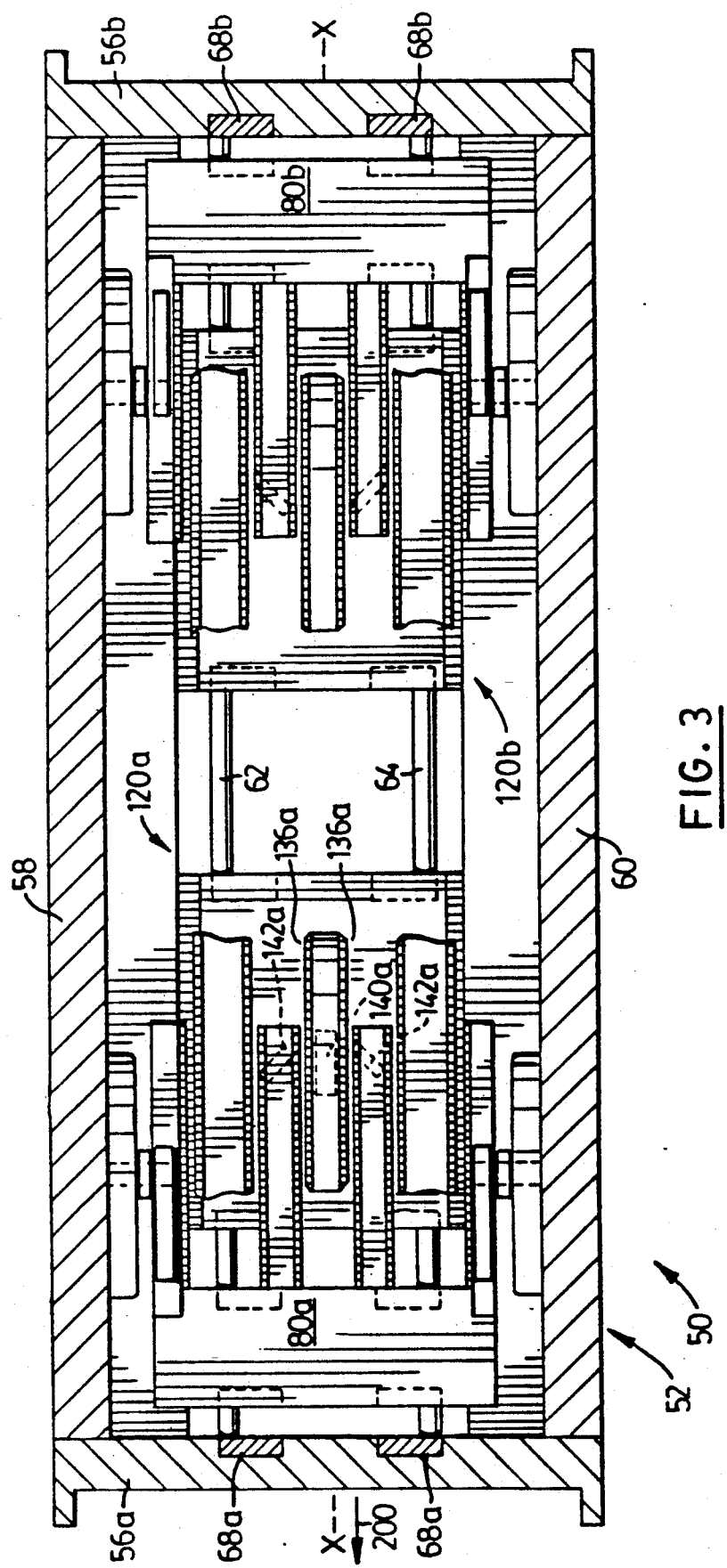
FIG. 3 is a sectional view of an impulse drive taken from the side.
Figure 4:
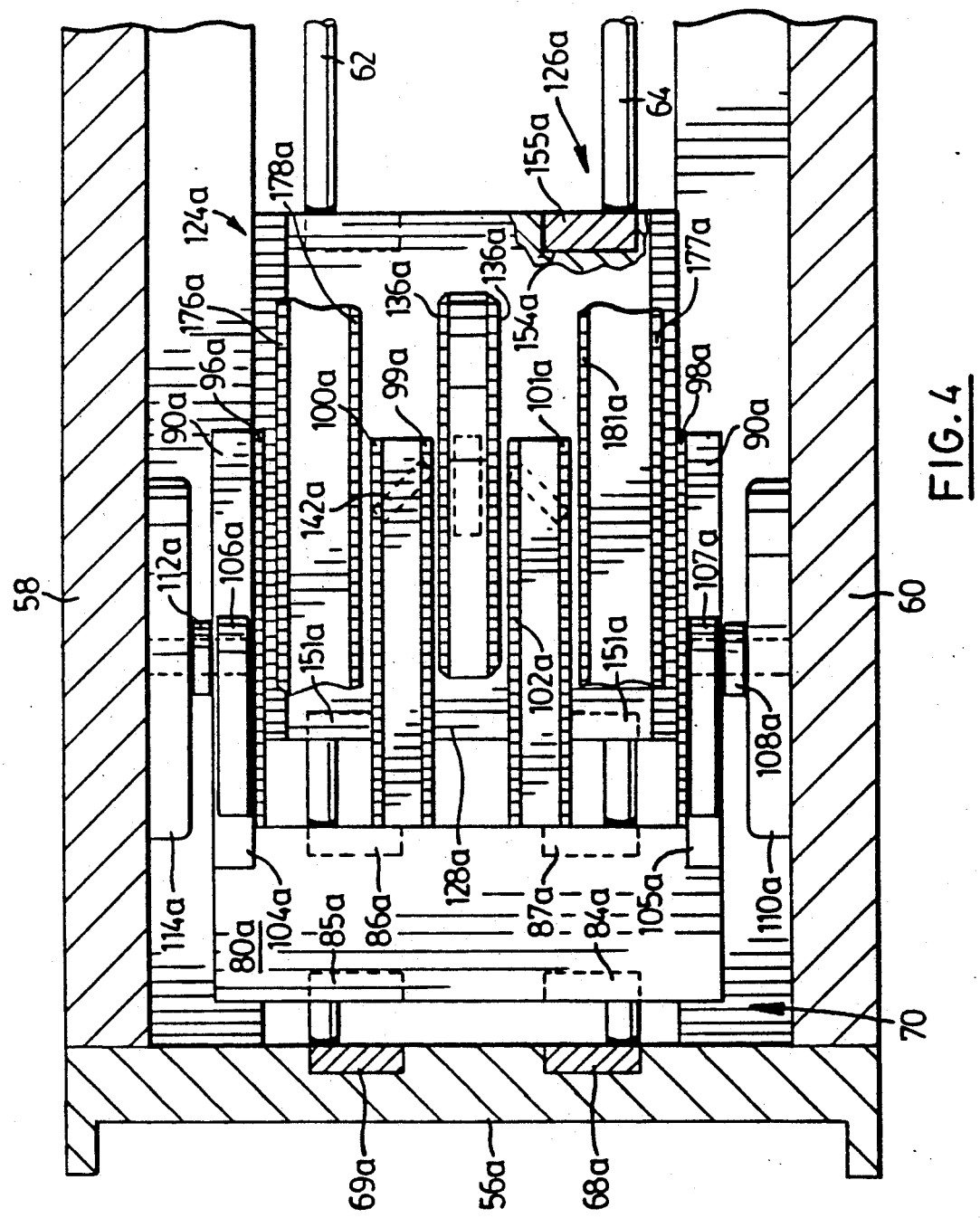
FIG. 4 is an enlarged view of a portion of the drive illustrated in FIG. 3.
Figure 5:
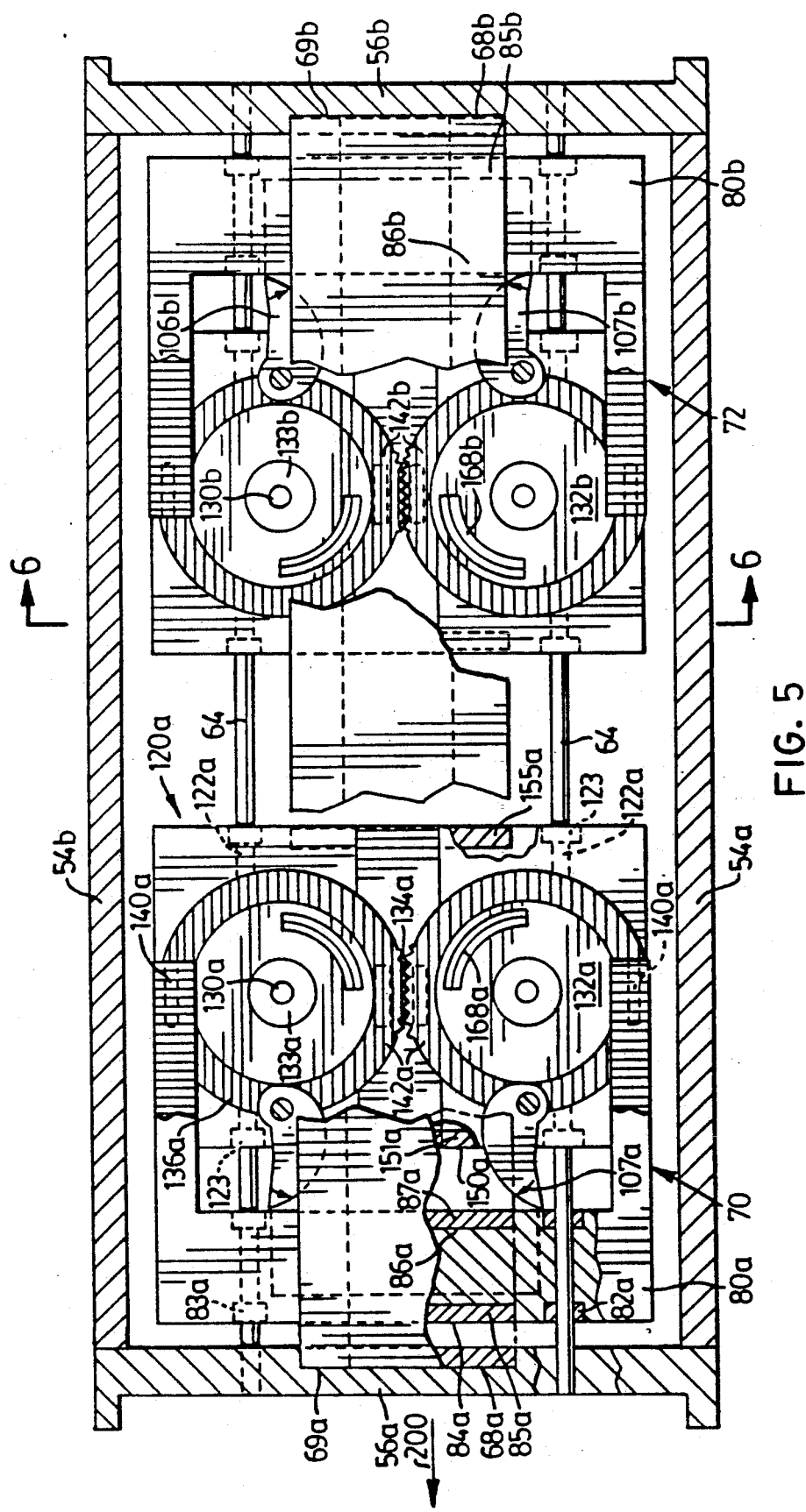
FIG. 5 is a sectional view of the drive illustrated in FIG. 3 taken from the top.

As can be seen from FIGS. 3, 5 and 6, each of the systems 70,72 are substantially identical. Since both systems are substantially identical, only one of the systems 70 will be described in detail, while system 72 will be described to indicate the operative differences between the systems 70,72. In these figures, like components of systems 70,72 will be indicated using like reference numerals, with the suffix "a" denoting system 70, and the suffix "b" donating system 72, added for clarity.

System 70 includes a rectangular shaped body 80a of mass $m_3$, having apertures 82a formed therein, which seat linear bearings 83a. The bearings 83a allow the rods 62,64 to pass through the body 80a, and permit the body 80a to slide along the rods 62,64, within the chamber 52 while minimizing friction. A pair of vertically spaced recesses 84a are formed in one side of body 80a, adjacent the end wall 56a. The recesses 84a are identical in dimension in comparison and aligned with the recesses 68a. Similarly, the recesses 84a receive solenoids 85a, which communicate with the solenoids 69a seated in the recesses formed in the end wall 56a. The opposite side of the body 80a has a pair of vertically spaced recesses 86a formed therein, which are identical in dimension and aligned with the recesses 68a and 84a. Solenoids 87a are seated in the recesses 86a. Two sets of arms 88a, 90a, integrally formed with the body 80a, project from the body and extend towards the center of the chamber 52. The two sets of arms are positioned on either side of the body 80a, adjacent the side walls 54a,54b, with each set of arms including four vertically spaced arms $88a_1$ to $88a_4$ and $90a_1$ to $90a_4$ respectively.

The upper arms $88a_1$ and $90a_1$ have linear induction motor railgun primaries 96a secured to their lower surfaces, while the lower arms $88a_4$ and $90a_4$ have linear induction motor railgun primaries 98a secured to their upper surfaces. The inner arms $88a_2$ and $90a_2$ have linear induction motor railgun primaries 99a secured to their lower surfaces, and linear induction motor railgun secondaries 100a secured to their upper surfaces. Conversely, the inner arms $88a_3$ and $90a_3$ have linear induction motor railgun secondaries 101a secured to their lower surfaces, and linear induction motor railgun primaries 102a secured to their upper surfaces.

The inner arms $88a_2, 88a_3, 90a_2$ and $90a_3$ also support solenoids 103a at their distal ends, remote from the body 80a. Upper and lower cam slots 104a, 105a are formed in the body 80a at each side thereof, near the side walls 54, for communication with upper and lower cams 106a, 107a respectively. The cams 107a are mounted on shafts 108a extending upwardly from disc motors 110a. The disc motors 110a are mounted on the bottom wall 60 of the chamber 52. The cams 106a are mounted on shafts 112a extending downwardly from disc motors 114a, with the disc motors 114a being mounted on the upper wall 58 of the chamber 52. The cams 106a and 107a are rotatable upon rotation of the shafts 108a,112a by the disc motors 110a,114a, to reposition the body 80a as will be described herein.

A second, substantially rectangular body 120a of mass $m_4$ is provided, and has apertures 122a formed therein in which linear bearings 123a are seated. The bearings 123a allow the rods 62,64 to pass through the body 120a, and permit the body 120a to slide along the rods 62,64, so that it may be moved within the chamber 52 with minimum friction. The body 120a comprises generally an upper section 124a, and a lower section 126a respectively, with the two sections being substantially identical. The two sections 124a,126a are vertically spaced to define a recess 128a, but are interconnected via a pair of shafts 130a. The sections 124a,126a are also structurally and integrally interconnected by additional supports.

Each shaft 130a supports a flywheel or rotatable mass 132a, preferably in the form of a disc or ring, via a pair of thrust-radial bearings 133a. The flywheels 132a are positioned in the recess 128a, and are mounted within the body 120a symmetrically across a plane that intersects the center of mass of the body 120a. This permits the flywheels 132a to rotate about the shafts 130a within the recess 128a. Each flywheel 132a includes a rack of teeth or spur gear 134a, formed along its circumference (only a portion of which is shown) so that the teeth 134a, provided on each flywheel, engage during rotation of the flywheels thereby ensuring that the flywheels counter-rotate.

Induction motor railgun primaries 136a are provided on the upper and lower surfaces of each flywheel 132a, and extend along the circumference thereof. The railgun primaries 136a on the flywheels 132a communicate with the railgun primaries 99a and 102a positioned on the surfaces of the arms $88a_2,88a_3,90a_2$ and $90a_3$ respectively, adjacent the surface sections of flywheels 132a at a chosen radius. Two pair of rollers 138a are also mounted on the upper and lower surfaces of each flywheel 132a, one diametrically across from the other, in order to maintain a dynamic balance of each flywheel 132a. The rollers 138a are positioned radially from the shaft 130a, but are spaced from the periphery of the flywheel 132a. The rollers 138a activate auxiliary interaction system solenoids 140a, which are mounted as one or more dynamically balanced pairs integral with flywheels 132a, when contacting electrical conducting strips 168a mounted on body 120a. The auxiliary interaction system solenoids 140a engage auxiliary interaction system solenoids 142a on arms $88a_2,88a_3,90a_2$ and $90a_3$ of body 80a.

The auxiliary solenoid systems 140a,142a are used either as alternate engagement systems, or to create an additional pulse and greater thrust during the interaction between the bodies 80a and 120a. All interaction systems, including the auxiliary solenoid systems, engage like polarity to like polarity, for example, north pole to north pole, but can be designed to engage opposite polarity to opposite polarity, for example, north pole to south pole. Also, all railgun interactions occur through a series of incrementally increasing, individual impulses.

The railgun primaries 136a provided on the flywheels 132a are also designed to interact with an electrical system on body 120a, and function as electric motors. In this manner, the spin of the flywheels 132a can be increased, initially, during the time intervals of the engagements and interactions, and/or during the time intervals between the engagements and interactions with the linear induction motor railgun primaries on arms $88a_2,88a_3,90a_2$ and $90a_3$, if the spin of the flywheels was decreased during the respective interaction. This is timed by the engagement of rollers 138a with electrical conducting strips 168a on body 120a, or body 120b if in reverse pulse, and this action is respectively applied, with regard to each wheel, as a pure couple between the induction motor railguns, and accordingly has no linear component.

The railgun primaries 136a are also capable of interacting with the electrical system on body 120a, and function as electric generators. In this manner, the spin of the flywheels 132a can be decreased so that the rotational, mechanical or kinetic energy of the flywheels 132a can be converted back into electrical, stored energy in the electrical system of batteries. This can occur during the time intervals of the engagements and interactions, and/or occurs during the time intervals between the engagements and interactions between the railgun primaries on arms $88a_2,88a_3,90a_2$ and $90a_3$ of body 80a, and the railgun primaries 136a on the flywheels, if the spin of the flywheels 132a is increased during the respective interaction. This operation of the railgun primaries 136a occurs as well whenever the spin of the flywheels 132a is decreased, for example, if lower revolutions of the flywheels are desired, or the whole system 50 is turned off. This is also timed by the engagement of rollers 138a with electrical conducting strips 168a on body 120a, and this action between the railguns is respectively applied, with regard to each wheel, as a pure couple between the railguns, and accordingly, has no linear component.

The flywheels 132a are mounted on electric motor-generator systems (not shown) which apply additional torques to the flywheels 132a, in directions opposite to the directions of their rotational acceleration during the engagement and interaction with body 80a. This enables the braking of body 80a to be precisely controlled, by electrically pre-adjusting the torque applied by the electric motor-generator systems to the flywheels 132a of body 120a, at any given rpm. By this method, additional resistance to turning or rotational acceleration of the flywheels 132a can be adjusted, without increasing the mass of the flywheels, and thus, a design using flywheels having a relatively light mass can be realized. In addition to each, individual, electric motor-generator system associated with each flywheel 132a, the rotational inertia of the flywheels can be appropriately established in design; for example, an equal quantity of mass distributed more in a ring configuration in a design, as compared with, and in preference to, a disc configuration of a wheel.

Vertically spaced recesses 150a are formed in one side of the body 120a adjacent the solenoids 87a. The recesses 150a are identical in dimension and aligned with recesses 86a and 84a, and receive solenoids 151a. The other side of the body 120a also includes a pair of vertically spaced recesses 154a, with the recesses 154a being of dimensions and aligned in the identical manner as recesses 150a, 84a, 86a and 68a. The recesses 154a house solenoids 155a.

The body 120a has recesses 170a, formed in each side thereof adjacent the side walls 54 of the chamber, which allow arms $88a_2$, $88a_3$ and $90a_2$, $90a_3$ to pass over the outer edge of the flywheels 132a. The recesses 170a define upper and lower arms 172a, 174a respectively, which are integral with the body 120a, but which are aligned with the arms 90. Linear induction motor (LIM) railgun primaries 176a are disposed on the upper surface of the arms 172a, while railgun primaries 177a are disposed on the lower surface of the arms 174a. The railgun primaries 176a provided on arms 172a communicate with the railgun primaries 96a provided on arms 88a,90a, while the railgun primaries 177a provided on arms 174a communicate with the railgun primaries 98a provided on arms $88a_4,90a_4$. Auxiliary solenoids 166 are also provided on the end of each of the arms 172a,174a which communicate with the corresponding, auxiliary solenoids provided on arms 172b,174b when required, and as will be described herein.

LIM railgun secondaries 178a are disposed on the lower surface of the upper arms 172a, and communicate with the railgun secondaries 100a provided on arms $88a_2,90a_2$. Similarly, railgun secondaries 180a are disposed on the upper surface of lower arms 174a, which communicate with the railgun secondaries 101a provided on arms $88a_3,90a_3$.

LIM railgun primaries 160a are mounted on the top and bottom surfaces of the body 120a, and communicate with the railgun primaries 66 mounted on the top and bottom walls of the chamber 52.

The bodies 80b and 120b of system 72 are structurally identical to bodies 80a and 120a of system 70. Each pair of bodies 80a, 80b and 120a, 120b has identical engagement, electrical, and mechanical systems, including identical induction motor railgun systems, and flywheels 132. Thus, as should be apparent, the chamber 52 is symmetrical about the x, y and z planes passing through the geometric center of the chamber 52.

The following is a description of one complete sequence of actions which occur during operation of the impulse drive 50 to impart a net impulse to the frame 52. When the electrical system supplying power to the components in the chamber 52 is turned on, the chamber 52 becomes operational. Linear induction motor railgun systems 66 and 160 position bodies 120a and 120b at their respective pre-engagement positions, near opposite ends of the chamber 52. The upper and lower cams 106,107, at each end of the chamber 52, are turned simultaneously by the speed-synchronized disc motors 110,114. The turning of the cams 106,107 causes the cams to engage the bodies 80a,80b via the cam slots 104,105, and move the bodies 80a,80b further toward and near to, yet not physically contacting, the respective end walls 56a,56b of the chamber 52. This causes the magnetic fields of solenoids 85 and solenoids 69, at each end of the chamber 52 respectively, to compress equally, resulting in equal amounts of stored, elastic, potential, linear spring energy between bodies 80a,80b and the end walls 56a and 56b of the chamber 52.

Cams 106,107 continue to turn under the influence of disc motors 114, 110 until cavities in cam slots 104,105 allow bodies 80a,80b to accelerate linearly in opposite directions towards the center of the chamber 52, along the rails. During this process, equal and oppositely directed impulses J are applied to the bodies 80a,80b, and to the end walls 56a,56b. Since the equal and oppositely directed impulses J are simultaneously applied to each end wall 56a,56b, there is no acceleration of the center of mass of chamber 52 during this process. The bodies 80a,80b in turn accelerate linearly in opposite directions towards one another, and have equal, resultant magnitudes of linear velocities, linear momenta, and equal, finite quantities of translational kinetic energy. This energy is imparted to each body 80a,80b via the stored, elastic, potential, equal, finite quantities of linear spring energy of the compressed magnetic fields between solenoids 85, and the solenoids 69.

After the initial linear acceleration of bodies 80a,80b, the linear induction motor railgun primaries 99a,102a on arms $88a_2,88a_3,90a_2$ and $90a_3$ of body 80a, and the linear induction motor railgun primaries 96b, 96b on arms $88b_1,88b_4,90b_1,90b_4$ of body 80b, are simultaneously, electrically activated and energized. This is done at a point when the linear displacements of the bodies 80a,80b have sufficient magnitude that there is substantially no interference between the magnetic fields of the energized, linear induction motor railgun primaries on bodies 80a,80b, and the magnetic fields of the solenoids 69, located on the end walls 56 of the chamber 52.

At this point in time, the induction motor railgun primaries 136a on flywheels 132a of body 120a are electrically activated and energized. Also, the upper and lower, linear induction motor railgun primaries 176b,177b, of body 120b, are electrically activated and energized. While the railguns are being energized, the bodies 80a,80b are moving in opposite directions in the chamber 52 towards one another, with equal, finite quantities of translational kinetic energy, and equal linear momenta.

As the bodies 80a, 80b approach respective bodies 120a, 120b, the linear induction motor railgun primaries 99a,102a on body 80a enter the recesses 170a and engage, interact and communicate with the induction motor railgun primaries 136a, at radii r on the flywheels 132a. Simultaneously, or substantially thereto, linear induction motor railgun primaries 96b,98b on body 80b enter the recesses and engage, interact and communicate with upper and lower, linear induction motor railgun primaries 176b, 180b, respectively on body 120b.

During these interactions, both bodies 80a,80b transmit their respective, individual, equal, finite quantities of translational kinetic energy and linear momenta to bodies 120a,120b, respectivelyl. Each interaction between the respective, energized railguns is in the manner of a series of individual impulses, of repelling, electromagnetic interactions, incrementally increasing the magnetic field strengths through the time interval of engagement, i.e., each, respective interaction is not in the manner of a collision. This type of interaction allows a greater change in rotation to occur. The railgun interactions are programmed and carried out in such a fashion so that both bodies 80a,80b come to rest relative to the chamber 52, after the interactions with bodies 120a,120b, respectively, at equal distances of linear displacement, d, from their respective end walls 56 of chamber 52. The distance d is defined by the differential of the cams 106,107 inner and outer radii. At this point in time, the LIM railgun primaries 99a,102a on arms $88a_2,88a_3,90a_2,90a_3$ of body 80a, and LIM railgun primaries 96b,98b on arms $88b,88b_4,90b$ and $90b_4$ of body 80b, and the upper and lower, linear induction motor railgun secondaries on sections 172b,174b of body 80b, adjacent the railgun primaries 96b,98b, are all electrically deactivated. These railgun deactivations occur at the precise instant when bodies 80 are decelerated to resultant, linear velocities of zero, with respect to the chamber 52.

Consider for illustration and with the purpose of clarity only, that the bodies 80a,80b are equal to approximately one fifth to one half of the total mass of bodies 120a, 120b, and that body 80a imparts a portion of its finite quantity of initial, translational kinetic energy and linear momentum to increase or to decrease the spin of the flywheels 132a. Thus, body 80a imparts a lesser amount of translational kinetic energy and linear momentum to accelerate linearly body 120a to its resultant translational kinetic energy and linear momentum than body 80b imparts to body 120b. If body 80b imparts substantially all of its finite quantity of translational kinetic energy and linear momentum to body 120b in the form of translational kinetic energy and linear momentum, the resultant velocities of bodies 120a,120b will be opposite in direction, and of significantly different magnitudes, with the resultant linear velocity of body 120b being up to approximately twenty percent greater than the resultant linear velocity of body 120a. The reason that the translational kinetic energy and linear momentum resultant of body 120a is less than the translational kinetic energy and linear momentum resultant of body 120b, is due to the fact that, as the kinetic energy and linear momentum of body 80a is imparted to the rims of the flywheels 132a of body 120a at radii r, to increase or to decrease the spin of the flywheels 132a, and as the finite quantity of translational kinetic energy and linear momentum of body 80a is delivered as a change of rotational kinetic energy and angular momentum of the flywheels 132a, body 80a loses some of its linear motion, linear momentum, and linear kinetic energy. The force curve, which is sequentially, instantaneously, of equal magnitude, yet oppositely directed along the lines of action of the force joining bodies 80a and 120a, drops off as body 80a loses energy and linear momentum to change the rotational kinetic energy and linear momentum of the flywheels 132a. As this occurs, the energy capability of body 80a, to do center of mass work to accelerate linearly body 120a, diminishes.

To have equal, resultant, translational kinetic energy and linear momenta of bodies 120a,120b, derived from equal, finite quantities of translational kinetic energy and linear momenta of bodies 80a,80b respectively, plus a change in the spin, rotational kinetic energy or angular momentum stored in the flywheels 132a, would be a breach of the true natures of the laws of Conservation of Energy and Conservation of Mechanical Energy. Accordingly, the translational kinetic energy and linear momentum resultant of body 120a must be less than the translational kinetic energy and linear momentum resultant of body 120b. To maximize this phenomenon, each respective, energy and momentum interaction between the body 80a and the flywheels 132a should be gradually applied, relative to the time interval of the interaction, and not in the form of a collision. Also, the ratio of the inertial moment or resistance to rotational acceleration of the flywheels 132a, with respect to the inertial mass or resistance to linear acceleration of the total mass of body 120a, should be optimized.

From the above, it can be seen that bodies 120a,120b, after the interactions with bodies 80a,80b, move towards one another, each with a substantially different quantity of translational kinetic energy compared to the other, and with substantially different linear velocities and linear momenta. At this point in time, the upper and lower solenoids 155 on the bodies 120a, 120b respectively, are electrically activated and energized. Up until this time, no effect is delivered to the chamber 52, and thus, the chamber 52 has a linear velocity and linear momentum equal to zero. The total linear momentum P of the combined system as a whole is now equal to the vector sum of the linear momenta of the individual bodies 80a,80b,120a,120b, within and including the same frame of reference, the chamber 52.

At this point, the cams 106,107, driven by disc motors 114, 110, continue to turn, and begin acting on the respective cam slots 104,105 provided in bodies 80a,80b. This causes the bodies to be repositioned at their starting positions so that the magnetic fields between the solenoids 69a and 85a are again compressed and so that the bodies 80a and 80b are in effect integral with the frame 52. As force and impulses of equal magnitude, yet of opposite direction, are simultaneously applied to the end walls 56 of the chamber 52, there is no net effect on, nor acceleration of, the chamber 52 due to this repositioning of bodies 80a,80b.

At this point in time, the spin adjustment of the flywheels 132a occurs, as earlier described, through the interaction of induction motor railguns 136a which are timed and electrically energized by the rollers 138a, contacting the electrical conducting strips 168a provided on the surfaces of body 120a, and, which communicate with an electrical system adjacent the railguns 136a. The railguns act as electric motors to increase the spin of the flywheels 132a, if the spin was decreased during the previous interaction between bodies 80a and 120a, or act as electric generators to decrease the spin of the flywheels 132a if the spin was increased during a previous interaction. Accordingly, the railguns act to maintain the spin of the flywheels 132a within a proper spin range, with respect to the frequency of complete sequences of interactions within the chamber 52, i.e., the relative, mutual velocities of approach of the respective, interacting bodies. As was described earlier herein, the spin adjustment of the flywheels 132a is applied as a pure couple between each, respective, railgun system, and accordingly has no linear component.

Body 120b travels along the rods 62,64, within the chamber 52 toward body 120a, a greater distance from its respective end wall 56b, due to its greater linear velocity, than the body 120a, which has a substantially lesser, resultant, linear velocity. The linear displacement of bodies 120a,120b within the chamber 52 should be minimized.

The magnetic fields of solenoids 155b of body 120b interact with the repelling, magnetic fields of solenoids 155a of body 120a, in a spring-like fashion. The interacting, magnetic field between the solenoids 155a and 155b is compressed, such that bodies 120a and 120b come close to, but do not contact, one another. The magnetic interaction between bodies 120b and 120a is much like the interaction between two billiard balls moving towards one another on a straight path, with one having a substantially greater, linear velocity compared to the other, which, when colliding head-on, rebound such that they substantially interchange and exchange linear momenta. Thus, the first body, moving initially with a greater, linear momentum and linear velocity, rebounds with the lesser, linear momentum and linear velocity of the pair, and the second body, originally with the lesser, linear momentum and linear velocity, now rebounds with the greater, linear momentum and linear velocity of the pair. This rebound phenomenon, and substantial exchange of linear momenta, now occurs between the bodies 120a and 120b, respectively.

At this point in time, there has been no acceleration of, nor impulse applied to the chamber 52 due to the described interactions, as the interactions occur on bearings along the rods 62,64, parallel to the longitudinal axis of the chamber, and intersecting the center of mass of the chamber 52.

Thereafter, LIM railgun and linear, electric generator systems 66,160a are electrically activated and energized, to engage and decelerate body 120a, now initially with the greater linear momentum, as compared to body 120b. The body 120b is allowed to continue its free motion within and toward end 56b of the chamber 52. The deceleration of body 120a applies an impulse to, and simultaneously accelerates, the chamber 52 and the bodies 80 from their apparent, previous, combined state of rest or zero motion, relative to a stationary, outside observer, in the direction of the applied impulse, represented by arrow 200. The change in linear momentum of the combined system of chamber 52 and bodies 80, acted upon by the impulsive force, is equal to the impulse applied, as in accordance with the impulse-momentum theorem. During this interaction, body 120a decelerates, and the now combined body, consisting of chamber 52 and bodies 80, accelerates in the direction of the arrow 200 to reach a common, equal, combined, resultant, linear velocity and linear momentum. At this point, body 120a is now positioned at its original, pre-engagement position within chamber 52, and is engaged to the chamber 52 by LIM railgun systems 66,160a.

This above-described interaction is much like a man running down a dock and jumping into an initially stationary row-boat. The man decelerates in the process and the row-boat accelerates, to arrive mutually at a common, equal, combined, resultant, linear velocity and linear momentum, of the man, row-boat system. Body 120a is represented by the man, and the total mass of chamber 52 and bodies 80, mutually integral, is represented by the row-boat in this example. This interaction may, as well, be likened to a completely inelastic collision, in which the bodies stick together after the collision, and apparent linear momentum is conserved. Also, during this interaction and process, a portion of the linear kinetic energy of body 120a is converted into electrical, stored energy, through the interaction between the linear, electrical generator and the linear, LIM railguns 66 and 160a.

During the occurrence of the above-described interaction, body 120b moves toward the end 56b of the chamber 52, at a substantially lesser, linear velocity and linear momentum to that initially of body 120a prior in time to the above-described interaction. However, since body 120a, in decelerating, accelerates the combined body of chamber 52 and the bodies 80, integral thereto, in the direction of the arrow 200, the body 120b has relatively less distance to move, to reach its initial, pre-engagement position within the chamber 52. This is due to the movement of the chamber 52, and the bodies 120a, 80 in a direction opposite to that of body 120b. At this point in time, the combined body of chamber 52, bodies 80, and the body 120a, has a substantially greater and oppositely vectored linear momentum, compared to that of body 120b, and the system, as a whole, now has a total linear momentum P, in this particular reference frame, which is defined simply as the vector sum of the linear momenta of the individual bodies within this frame. In other words, this momentum P, of the combined system of chamber 52, bodies 80, and bodies 120, is equal to $P = P_{COMBINED\ BODY} + (-p_{BODY\ 120b})$ or, $P = Mv_{COMBINED\ BODY} + (-mv_{BODY\ 120b})$, which is now greater than zero in the positive direction of the arrow 200, and wherein v designates and represents the respective, individual, linear velocities.

At the end 56b of the chamber, linear induction motor railgun 66 is electrically activated and energized to communicate with linear induction motor railgun 160b, which is simultaneously, electrically activated and energized. This causes body 120b to interact magnetically with the oppositely moving, combined body of chamber 52 and bodies 80 and 120a, and brake or decelerate body 120b to a velocity equal to zero, relative to a stationary, outside observer. This action simultaneously decelerates the combined body in this process, which of course, is still moving with substantial linear momentum in the direction of the arrow 200. Linear induction motor railgun systems 66,160b continue to communicate, and body 120b is accelerated from its instantaneous state of rest or zero velocity, relative to a stationary, outside observer, to a common, resultant velocity equal to the common, resultant velocity of the combined body of chamber 52, and bodies 80 and 120a, integral thereto. The system, including chamber 52 and bodies 80 and 120a, further decelerates during this process, with body 120b continuing to move toward the sternward end 56b of the chamber 52 during this interaction. When the body 120b reaches a linear velocity synchronized with the combined body, the body 120b is engaged to the chamber 52 at its initial position, near the end 56b of the chamber 52. Also, during this interaction and process, a portion of the linear kinetic energy of body 120b is converted into electrical, stored energy through the interaction between the linear, electrical generator and the linear induction motor railguns 66 and 160a.

This common, resultant, linear velocity and common, resultant, linear momentum, of the complete system as a whole, is now greater than zero in the positive direction of the arrow 200, as the total linear momentum of a system of bodies, now structurally integral as one unit or mass, is now equal to the product of the total mass of the system and the velocity of its combined center of mass. This combined center of mass, for a completely symmetrically designed and manufactured system, is temporarily and instantaneously located at the geometric center of the combined system and of chamber 52, as body 120b has become repositioned at its initial, pre-engagement position within chamber 52 as a result of this process and interaction. The combined center of mass is now moving with a resultant, linear velocity and a resultant, linear momentum in the positive direction of arrow 200, and this motion is substantially greater than zero, relative to the stationary, outside observer. Also during this interaction, a portion of the linear kinetic energy of the magnetically interacting bodies is converted into electrical energy and transmitted to batteries in the system 50 for storage, through interaction, engagement and communication of the linear, electric generator components of the interacting, engaging and communicating, linear induction motor railgun systems 66 and 160a.

The complete system now moves with a linear velocity and linear momentum $P_{CS}$, which is greater than zero in the positive direction of the arrow 200, having accelerated due to the internal interactions within the chamber 52, from a state of complete rest. Although the chamber 52 and all internal bodies are now moving with a velocity designated as $V_1$, the internal components of the chamber 52 are now at their respective, initial, starting or pre-engagement positions, and thus, when the cams 106,107 are rotated via the disc motors 110,114, to release the bodies 80a,80b, in the manner described previously, a similar sequence of events occurs to apply another net impulse to the combined system, i.e., to the combined center of mass in the direction of the arrow 200, so that the combined system, appearing to the stationary, outside observer to be the chamber 52, accelerates to assume a second, net resultant, combined, linear velocity designated as $V_2$, which is greater than the first, resultant, combined linear velocity $V_1$. Thus, the combined system of chamber 52 and all internal bodies can be operated so that the combined system, i.e., the combined center of mass receives continuous, successive impulses, and is accelerated until it reaches its desired linear velocity $V_N$. To decelerate the system, the internal bodies are engaged in an opposite manner such that the combined system, the combined center of mass, receives oppositely directed, continuous, successive impulses, thrust, and is decelerated from velocity $V_N$, through a second, deceleration velocity $V_{N-1}$, until it reaches its desired linear velocity, either greater than a velocity equal to zero but less than linear velocity $V_N$, or to a complete stop.

All interactions described herein, with the exception of the cams 106,107 repositioning of bodies 80 towards their respective end walls 56, involve no contact. This results in a substantially extended span of life of each system. The interactions are preferably accomplished magnetically between bodies of some substantial mass, relative to the size of the whole system and its performance requirements; however, it should be realized and apparent that all interactions can as well be accomplished, for example: by friction braking systems; by fluid or gas interactions with fluid or gas absorption turbines; by light or electromagnetic radiation having non-linear absorption chambers or mechanisms; or by other atomic or subatomic particles via non-linear absorption chambers or mechanisms; et cetera. In designs and in operational systems, the acceleration capacities, performances, optimum thrust at any given "r.p.m.", and the peak thrust capacities can be optimized, maximized, and accordingly accomplished as desired.

The above-described, non-linear impulse drive 50 is preferably used in a group of four, with each of the chambers 52 and internal systems providing a net thrust in the same direction, but timed appropriately out of phase with respect to each other for a smooth acceleration of the vehicle, yet timed and phased so as to not create undesired torques. For some applications, two, synchronized, counter-revolving turbines, driven by steam derived from solar heat and attached to two, counter-revolving, electric generators, can provide a source of electrical power for this system.

The auxiliary system solenoids 87,151 function as additional position control systems for anomalous motion control and containment. Thus, the solenoids help in preventing any physical contact between the bodies 80, 120 and their adjacent counterparts or end walls 56. The auxiliary solenoid systems 166 are electrically activated and energized when additional position control is required, to prevent the bodies 120 from colliding, and these communicate with their respective counterparts on the other, adjacent body. The adjacent, auxiliary, linear induction motor railgun systems 100,101, on arms $88a_2, 88a_3, 90a_2, 90a_3, 88b_2, 88b_3, 90b_2, 90b_3$ of bodies 80, and railgun systems 178,180 on bodies 120, may be electrically activated and energized when required to provide additional, repelling impulses to avoid contact between the bodies 80,120, and to ensure sufficient transfer of energy and momentum therebetween.

In general operation, linear displacement transducers, integral to and within the upper and lower rods 62,64, with complementary components mounted internally, integral to, and within bodies 80,120 respectively (although not shown), are provided and are regulated by appropriately programmed, off-the-shelf, precision, electronic motion controllers. These are able to interface, with the linear induction motor railgun systems 66,160, to adjust the respective, internal body or bodies to their proper position in the event of anomalous motion or as required.

Also in general operation, with the flywheels 132a in an overall, active, pulsed operation at any given spin range, the flywheels 132b of body 120b are also maintained, respectively, in an identical spin range, using the railguns disposed on the flywheels or the respective, electric motor-generator systems. Since the respective adjustment is actuated in the mode of a pure couple, it has no linear component. This is performed via electronic switching so that the chamber 52, the internal bodies thereto, and the vehicle housing the chamber can be instantaneously accelerated, or decelerated, that is, braked, by reverse thrust engagement, and as desired. Upon reaching the appropriate, identical spin range, to maintain the flywheels 132b of body 120b within this appropriate, identical spin range, very little additional energy input is required due to the inertia of their spin. If the spin range of one set of flywheels 132 on either of bodies 120 is changed, through linear acceleration or deceleration of the chamber 52 and the vehicle, the spin range of the other set of flywheels 132 is also adjusted to maintain an equivalent spin range on both pairs of flywheels 132, on bodies 120. This is to ensure that gradual, incremental acceleration or, as appropriate, gradual, incremental deceleration or braking occurs smoothly, much like that, respectively, of an aircraft or an automobile, as controlled and regulated by the pilot or driver.

Although described as using solenoids 69,85, it should be apparent that the respective, linear accelerations of bodies 80, from their respective end walls 56, may also be accomplished by springs, hydraulic or gas systems, slider-crank mechanisms, cams, or the like.

Also, it should be apparent that the upper and lower cam systems 106,107 can include similar cam systems mounted on the opposite sides of bodies 80, for total motion control of the positioning and repositioning of bodies 80 near to their respective end walls 56. These additional cams can be similarly driven by speed-synchronized, disc motors, and can serve to fasten firmly and integrally the bodies 80 to the chamber 52, at each, consecutive moment during the repositioning process, and thereby completely obviate the use or the partial use, of the linear induction motor railgun systems 66 and 160, for this process. It should be carefully noted, however, that the internal bodies should be freely "floating" and unrestricted by the cams during the time interval of their respective interactions. Anomalies due to, for example, environmental influences on the motions of the internal bodies, can be corrected by the cam systems in between the respective interactions. Furthermore, the rods 62 and 64 may also serve as electrical conductors, to supply power to each of the bodies 80a,80b, and 120a, 121b.

Although not described in detail, it has been contemplated that the operation of the various electrically energized components in the chamber be controlled by a microprocessor-based circuit programmed to ensure that the components are energized at the proper times to effect the desired operation of the impulse drive 50.

Referring now to FIG. 7, another embodiment of an impulse drive is shown. In this embodiment, like reference numerals will be used to indicate like components, with a "200" added for clarity. In this embodiment, the impulse drive 250 includes a chamber 252, having end walls 256a, 256b, side walls 254a,254b, and top and bottom walls (not shown). Intermediate walls 300 are provided, which extend the length of the chamber 252, to divide the chamber 252 into four cylinders. The cylinders are equidistantly spaced and are positioned so that the impulse drive is symmetrical about the longitudinal axis X of the chamber 252. The end walls 256 are provided with recesses which hold end solenoids 269. Each of the solenoids provided on the end walls is associated with one of the cylinders. The solenoids communicate with solenoids provided on bodies 280 in an identical manner to that previously described, to cause the bodies 280 to move linearly along guides in the form of rods (not shown) provided in the cylinders. Upper and lower railguns 262 are provided in each of the cylinders and extend the length thereof. In this embodiment, bodies 280 are provided at each end of the cylinders, although only one body 320 is provided in each of the cylinders. The bodies 320i in the inner two cylinders are positioned at opposite ends of the chamber 252 with respect to the positions of the bodies 320o provided in the outer two cylinders.

In operation, when the solenoids 269b associated with the inner cylinders and solenoids 269a associated with the outer cylinders operated, an equal impulse and therefore a finite quantity of linear kinetic energy and linear momentum is transferred to each of the bodies 280, associated with these solenoids. This causes the bodies 280 to move along the guides within the cylinders. Since equal and oppositely directed impulses are initially placed on the end walls 256, during and resulting from the interaction between the solenoids 29 and the bodies 280, no net acceleration of the chamber 252 is seen. The bodies 280 in the inner cylinders interact with the bodies 320i, transferring the linear kinetic energy and linear momenta of the bodies 280 into linear kinetic energy and linear momenta of the bodies 320i, without any rotation of flywheels occurring (i.e., these bodies interact in the same manner as bodies 80b and 120b described previously). This interaction therefore causes the bodies 320i to move along the rods in the inner cylinders towards the end wall 256a, at a first linear velocity. At the same time as that time of the above-described interaction, the bodies 280a interact with the bodies 320o located in the outer cylinders. This interaction transfers only a portion of the linear kinetic energy and linear momenta of the bodies 280 into linear kinetic energy and linear momenta of the bodies 320o. However, the majority of the linear kinetic energy and linear momentum is transmuted into rotational kinetic energy and angular momentum of the flywheels 332o, provided thereon (i.e., these bodies interact in the same manner as bodies 80a and 120a described previously). Thus, the bodies 320o, disposed in the outer cylinders, move along the rods towards the opposite end wall 256b at a slower linear velocity than the bodies 320i, disposed within the inner cylinders.

Since the bodies 320i, disposed within the inner cylinders, move at an equal velocity towards the opposite end wall, yet at a greater velocity than the bodies 320o, disposed in the outer cylinders, the bodies 320i within the inner cylinders reach the opposite end 256a of the chamber 252 before the bodies 320o. When this occurs, the bodies 320i are braked in the manner previously described to place a net impulse on the combined mass of chamber 252, bodies 280 and bodies 320i, in the direction of arrow 400. After or simultaneously to the net impulse being applied to the chamber 252 and combined system, the bodies 320o disposed in the outer cylinders approach the opposite end of the cylinder. The bodies 320o are then braked, resulting in a force being applied to the chamber 252 and the internal bodies temporarily integral thereto, in the direction of arrow 402. However, since the linear velocity and momentum of the chamber system, in the direction of the arrow 400, is substantially greater than that of the bodies 320o, the resultant or net linear acceleration, the resultant or net linear kinetic energy, and the resultant or net linear momentum of the chamber system is maintained in the direction of the arrow 400.

It should be apparent to one skilled in the art, that when the movement of the bodies along the cylinders is occurring, the bodies 280, respectively located at opposite ends of the cylinders, are repositioned via cams in a manner similar to that previously described. Thus, when the bodies 320 have moved to the opposite ends of the cylinders, and have been locked in position after generating a resultant, net impulse on the chamber 252 and the combined system in the direction of the arrow 400, the above-described procedure can be performed again. However, for the next impulse, the bodies 320o are moved linearly along the cylinders, without any rotation of the flywheels occurring, while the bodies 320i are moved linearly along the cylinder with a rotational component, and with substantially lower, linear velocities and linear momenta than those, respectively, of the bodies 320o. This allows impulses in a single direction to be generated and applied through the chamber 252 to the combined center of mass of the impulse drive 250.

Figure 8A:
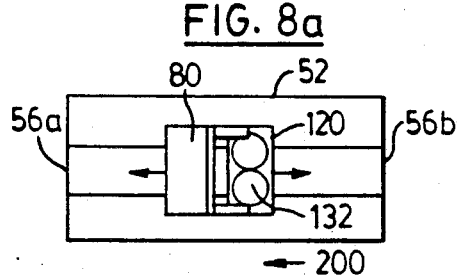
FIGS. 8a to 8k show other embodiments of the interactions of components in an impulse drive.
Figure 8B:
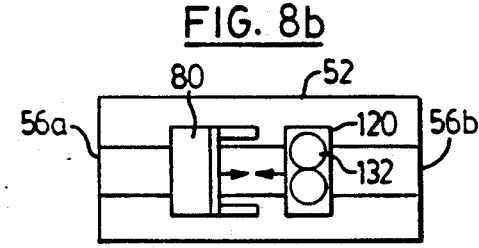
Figure 8C:
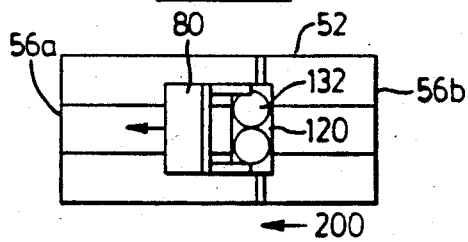
Figure 8D:
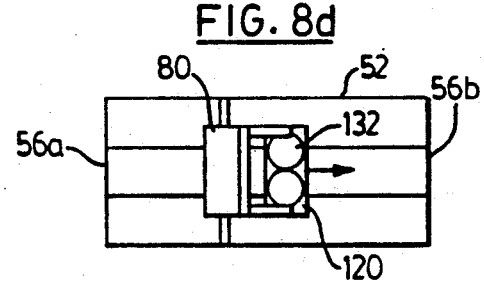
Figure 8E:
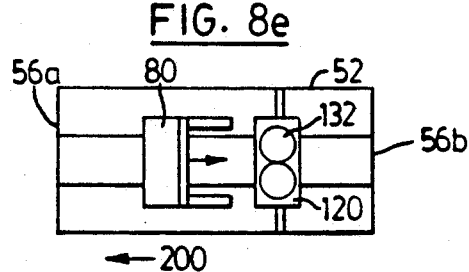
Figure 8F:
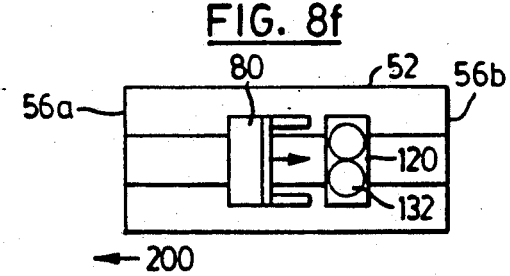
Figure 8G:
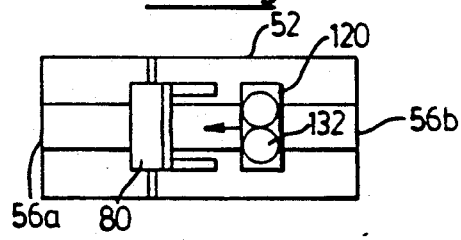
Figure 8H:
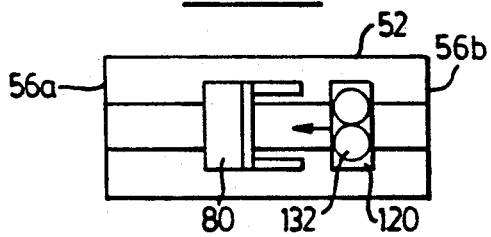
Figure 8I:
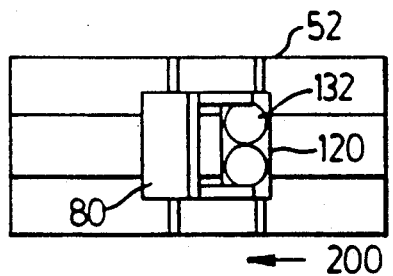
Figure 8J:
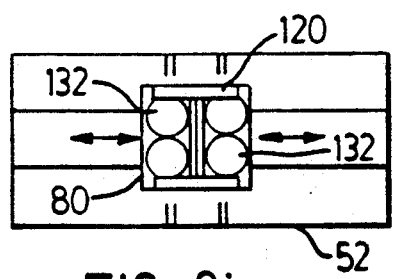
Figure 8L:
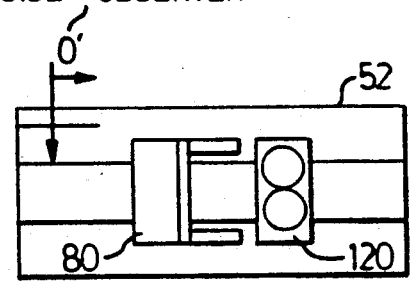
FIG. 8l shows reference frames with respect to different observers for the impulse drives shown in the figures.
Figure 8K:
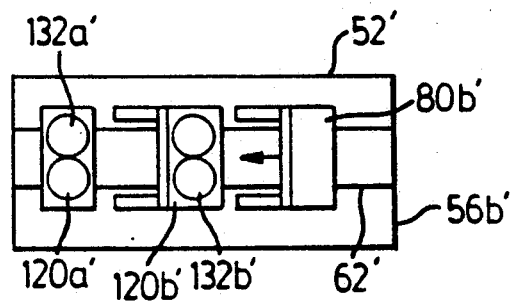
Figure 8M:
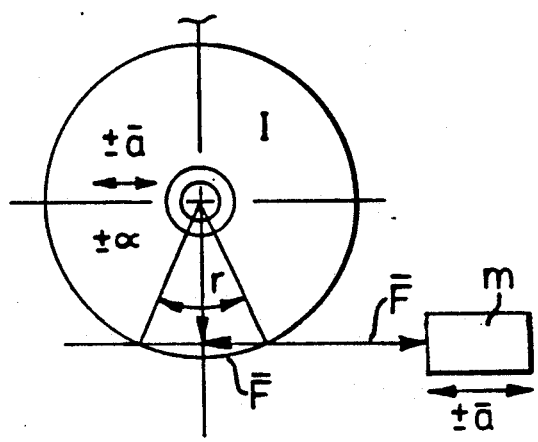
FIG. 8m shows a force diagram of the forces acting on and interacting within the drives used in the impulse drives illustrated in the figures.

Referring now to FIG. 8k, another embodiment of interacting masses for use in an impulse drive 50 is shown. In this embodiment, like reference numerals are used to indicate like components, with a "'" added for clarity. As can be seen, the body 80b' is linearly accelerated by a linear impulse from a solenoid located at end wall 56b', so that the body 80b' moves along the rods 62',64' within the chamber 52' in the direction of the arrow. The chamber 52' is simultaneously and oppositely linearly accelerated from this initial, applied impulse. The linear induction motor railgun system on body 80b' engages with the induction motor railguns (not shown), on flywheels 132b' mounted on the body 120'. The body 80b' interacts with body 120b' in the manner previously described, and is linearly decelerated to a velocity of zero, relative to an outside observer. The linear kinetic energy and linear momentum of body 80b' is transmuted into rotational and linear kinetic energy of body 120b', which now moves within the chamber 52' with lower translational kinetic energy and linear momentum components, than those originally of body 80b', immediately prior to this interaction.

The body 120b' has arm extensions similar to the body 80b', and includes LIM railgun, engagement systems similar to the railgun systems provided on body 80b'. The linear induction motor railgun system provided on body 120b' engages the railgun system (not shown), on the flywheels 132a' positioned on body 120a'. Body 120b' interacts with body 120a' and linearly decelerates, converting and transmuting its linear kinetic energy and linear momentum into rotational and linear, kinetic energy and momentum of body 120a'. Body 120a' may be fastened to the chamber 52', causing body 120b', when interacting rotationally with the flywheels 132a' on body 120a', to interact with the chamber 52 which is, in this instance, integral to the body 120a. If body 120a' is freely floating on the rods 62',64', the translational kinetic energy and linear momentum component of body 120b' is further reduced. This is a double absorption sequence, and these methods can be repeated to any desired "n" number of interactions and absorptions. Body 120a' is similarity decelerated by railguns systems 66',160a', which continue to engage bodies 120a',120b', and 80b', and accelerate them in the direction of motion of the chamber 52'. This partially decelerates the chamber 52' in this process. However, there is a resulting or net linear velocity increase of the combined center of mass, of the complete system, in the direction of the initial motion of the chamber 52.

In the embodiment shown in FIG. 8a, the bodies 80 and 120 are both freely displaceable, linearly, in opposite directions within the chamber 52. In operation, the bodies 80 and 120 are initially located at or near the center of the chamber, and then interact, applying equal and oppositely directed impulses to one another. This particular interaction does not cause a resultant or a net impulse to be applied to the chamber 52. The arms of body 80 communicate with the flywheels 132 provided on the body 120 via railguns, and cause the flywheels 132 to begin rotating. Thus, body 80 moves towards end 56a of the chamber 52, with the initial impulse being translated totally into linear kinetic energy and linear momentum. However, body 120 translates the initial impulse energy into linear kinetic energy and linear momentum, and rotational kinetic energy and angular momentum of the flywheels 132 on body 120, due to the interaction with the railguns. Thus, body 120 moves towards the end 56b of the chamber 52 at a slower linear velocity, and with a lower linear momentum, than those quantities respectively, of the body 80. Accordingly, as previously described, using the linear induction motor railgun primaries 66 disposed within and on the chamber 52, and the railgun primaries 168 disposed on the bodies, the bodies can be decelerated and braked to apply a net, resultant impulse to the chamber 52 and combined system, in the direction of the arrow 200.

In the embodiment shown in FIG. 8b, the bodies 80 and 120 are accelerated, by equal impulses, towards one another with equal linear velocities, and accordingly, a net impulse is not applied to the chamber 52 during this process. The bodies approach one another, and then interact. The linear kinetic energy and linear momentum of body 80 is transferred and converted into linear kinetic energy and linear momentum of the body 120, and into rotational kinetic energy and angular momentum of the flywheels 132, disposed thereon. The linear kinetic energy and linear momentum of body 120, on the other hand, is transferred to body 80 in the form of linear kinetic energy and linear momentum only. This interaction is achieved in the same manner as previously described. Since the body 120 translates more linear kinetic energy and linear momentum to body 80, than body 80 translates to body 120, the body 120 has a greater, resultant linear velocity and thus greater, resultant linear momentum, at that instant, than body 80. Once this occurs, using the linear induction motor railguns, when the bodies 80 and 120 are braked and stopped simultaneously, relative to the chamber, a net impulse is provided on the chamber 52 and accordingly to the combined system, in the direction of the original motion of the body 120.

FIG. 8c shows still yet another embodiment of interactive masses for use in the present impulse drive. In this embodiment, body 120 including the flywheels 132, is latched to the frame via suitable, structural members. Initially, the bodies are positioned centrally in the chamber 52, and when the bodies 80 and 120 interact to apply oppositely directed impulses to the two bodies, the impulse applied to body 80 by the stationary body 120, is translated substantially and entirely into linear kinetic energy and linear momentum, causing the body 80 to move towards end 56a of the chamber 52. The impulse applied to the initially stationary body 120 by the body 80 is transmuted into rotational kinetic energy and angular momentum of the discs 132, and a smaller amount of linear kinetic energy and linear momentum of the body 120 and the chamber 52, mutually integral, causing the chamber system 52,120, to move in a direction opposite to that of body 80. This interaction is similar to that described in FIG. 8a. However, since the linear velocity and linear momentum of body 80 is greater than those quantities respectfully, of the combined body, the chamber system 52,120, when the body 80 reaches the end section of the chamber 56a, and is braked and brought integral to the chamber 52, a net impulse is applied to the chamber 52 and thus body 120, in the direction of movement of body 80, resulting in a net linear movement as a combined system, of the chamber 52 and body 120 in the direction of movement of the body 80.

In FIG. 8d, the interaction is similar to that shown in FIG. 8c; however, the body 80 is integrally secured to the chamber 52, and the body 120 is free to move towards the end 56b of the chamber 52, during and after the interaction between the bodies 120 and 80, 52. Since the body 120 transmutes a portion of the applied impulse and energy into rotational kinetic energy and angular momentum, by then mutually braking the bodies 120 and 52,80, a net impulse is applied to the chamber 52 and the internal bodies 80,120, as a combined system, in the direction opposite to that of the initial motion of the body 120.

In the embodiment shown in FIG. 8e, the body 80 initially interacts at the end 56a of the chamber 52, causing the chamber 52 and the body 120, mutually integral, to move in the direction opposite to that of the body 80. The body 80, in turn, interacts with body 120 which is secured to the chamber in the same manner as previously described. However, the linear kinetic energy and the linear momentum, of the moving body 80, is transmuted into rotational energy and angular momentum of the flywheels 132, provided on the body 120, and a smaller, linear kinetic energy and linear momentum component, opposite in vector to the initial movement on the chamber 52 and the body 120. However, the component of linear kinetic energy and linear momentum provided on the combined mass of chamber 52 and body 120, in the direction opposite to its original velocity, is significantly smaller in comparison, thereby resulting in a net, continuing motion of the chamber 52 and the internal bodies 80,120, as a combined system, in the direction of the arrow 200.

The embodiment shown in FIG. 8f is similar to the embodiment shown in FIG. 8e. However, the body 120 is free to move within the chamber, and transmutes the linear kinetic energy and linear momentum applied thereto by the body 80, into rotational kinetic energy and angular momentum, and accordingly into a lesser quantity of linear kinetic energy and linear momentum, compared to that of body 80 immediately prior to this interaction. The impulse and resultant motion and momentum supplied to the chamber 52 in the direction of arrow 200, during the interaction with body 80, to cause body 80 to move towards body 120, is sufficiently greater than the linear kinetic energy and the linear momentum of the body 120 moving within the chamber 52, after the interaction with body 80. This results in a net acceleration of the combined system, of chamber 52 and the internal bodies 80, 120, in the direction of the arrow 200.

The embodiment shown in FIG. 8g is similar to the embodiments shown in FIGS. 8b,8e, and 8f, except that the body 120 initially starts from one end of the chamber, and the body 80 is attached to the chamber 52. As should be apparent, in this embodiment the total quantity of motion or momentum applied to the chamber system 52,80, in the initial interaction between the chamber system 52,80, and the body 120, and in a direction opposite to that of the initial movement of body 120, is less than the total quantity of motion or momentum applied by the body 120 to the combined mass of the chamber 52 and body 80 in the direction of travel of body 120. For equal applied impulses, respectively, the portion of the linear momentum and of the linear impulse, resultant upon the center of mass of the body 120, is less than the portion of the linear momentum and of the linear impulse resultant upon the combined center of mass of the chamber 52 and body 80. By then braking the body 120 in the manner previously described, a resultant, net impulse is created that accelerates the center of mass of the combined system in the direction of the initial movement of the body 120. This occurs since a portion of the linear kinetic energy, impulse, and momentum, applied to the body 120, is used to rotate the flywheels.

The embodiment shown in FIG. 8h is similar to that shown in FIG. 8g, except the two bodies 80 and 120 are free to move within the chamber 52. The difference in linear kinetic energy and linear momentum resulting from the interaction between bodies 120,80, subsequently results in a net impulse being applied to the combined system, of the chamber 52 and the internal bodies 80,120, in the direction of the initial movement of the body 120.

In FIG. 8i, both bodies 80 and 120 are secured to the frame 52. When the bodies interact through pulsed emissions of particles or fluids, from either body to the other, the repelling impulses applied to each of the bodies, respectively, is translated into the chamber 52, since the bodies are fastened thereto. However, the impulse energy applied to the body 120,52 is partially translated into rotational kinetic energy and angular momentum of the flywheels and non-linear absorption chambers 132. In contrast, the impulse energy applied to the body 80,52 is translated more substantially into linear kinetic energy and linear momentum of the chamber 52 and combined system, in the direction of the arrow 200. Thus, the difference in applied linear kinetic energy and momentum to the bodies is also applied to the chamber which results in a net acceleration of the chamber 52 and the combined internal systems in the direction of the arrow 200.

Figure 8N:
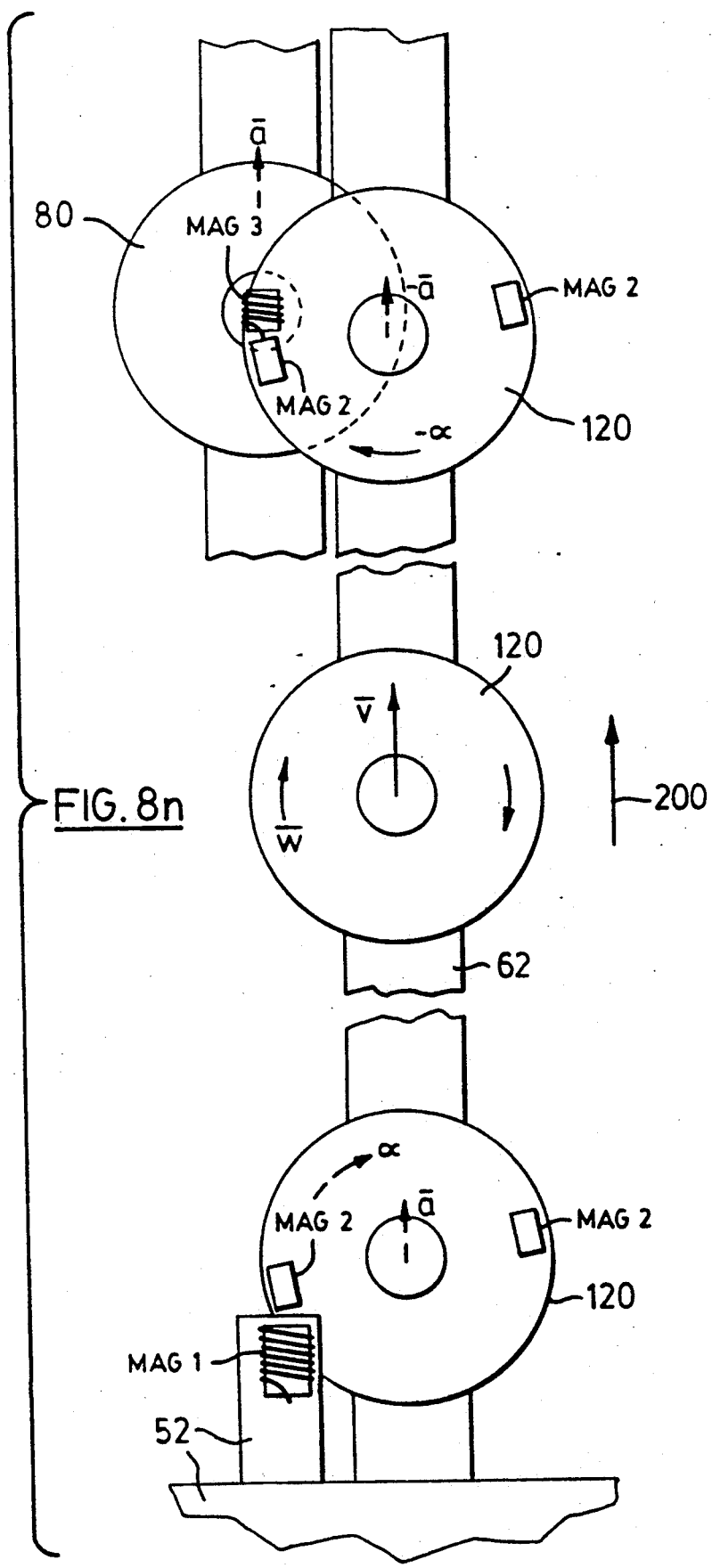
FIG. 8n is a top plan view of a plurality of interacting masses.

In the embodiment shown in FIG. 8n, the bodies 120 and 80, of equal mass (or of any other suitable ratio of mass, one to the other), include a single, rotatable flywheel, mounted on a shaft. The bodies are movable along the rods 62, extending the length of the chamber 52. Of particular interest in this system is that the body 120 can be used to accelerate the body 80. For example, if the body 120 is supplied with an impulse, as illustrated, via the interaction between the magnets, Mag1, secured to the chamber 52, and one of the magnets, Mag2, secured to the flywheel, the body 120 will accelerate and move with a linear velocity $v_1$, and a linear momentum $p_1$, in the direction of the arrow 200, and the flywheel will rotate about the shaft with an angular velocity $w_1$, and an angular momentum $l_1$, due to the transfer of energy as previously described.

When the body 120 interacts with the body 80, a finite portion of the rotational kinetic and linear kinetic energy, and the resulting rotational and linear momentum, of the body 80, causing the body 80 to move with a linear velocity $v_2$, and a linear momentum $p_2$, substantially greater than the linear velocity $v_1$ and the linear momentum $p_1$, originally of the body 120. This is achieved by providing a magnet, Mag3, on the shaft of the flywheel mounted on the body 80, and displacing the bodies 120,80, so that one of the rotating magnets, Mag2, compresses the magnetic field set up between the magnets, Mag2 and Mag3, causing a repelling force to be applied to the center of mass of body 80, thereby causing it to move linearly in the direction of the arrow 200. Thus, in accordance with this embodiment, rotating bodies can be used to create a resultant difference, delta, or differential in linear kinetic energy and linear momenta between two bodies, that is, to increase or to decrease the total, initial quantity of the apparent linear momentum of a system of bodies, in order to apply a net impulse to a chamber, as desired.

In FIG. 8j, both bodies 80,120 include flywheels 132 and arms which can engage the flywheels of the other body, and either body, or neither or both bodies can be secured to the frame 52 via latches. The flywheels 132 on one of the bodies have a different rotational inertia, compared to their counterparts, in order that a lesser amount of the impulse or linear kinetic energy and linear momentum, applied during an interaction between the bodies, is transmuted into rotational kinetic energy and angular momentum, and a greater amount of the applied impulse, during an interaction between the bodies, is transmitted into a translational kinetic energy and linear momentum component. Thus, during the interaction between the bodies 80,120, a difference or delta in the resultant impulses and, appropriately, in the resultant, linear kinetic energy and linear momenta between the two, interacting and/or oppositely moving bodies occurs. This permits a net impulse to be applied to the center of mass of the combined system.

FIG. 8l represents different frames of reference for observers, for any one, and any number of the embodiments of the present system, wherein the stationary, outside observer may be chosen to be at a point representing the origin O of an inertial reference frame. FIG.

8m shows a force and motion diagram of the interaction between two bodies, to impart or derive rotational kinetic energy and angular momentum, to or from the flywheel(s).

Referring now to FIG. 9, a portion of another embodiment of one of the bodies 120 is shown. In this embodiment, although only half of the body 120 is shown, it should be realized that it is symmetrical and balanced. The body 120 is composed of either one, or two, of the statically and dynamically balanced systems 88, herein described. As can be seen, the flywheels 132 on each side of the body 120 include arms 500, mounted on the periphery of the flywheels 132, respectively, which extend outwardly therefrom. A mass 502, is diametrically positioned, with respect to each arm 500, adjacent the periphery of the flywheels 132, to balance dynamically the flywheels. A second pair of rails 504 are provided on opposite sides of the rails 62,64, which support the body or bodies 80.

Initially, the mass system 80 is accelerated linearly by impulses applied by solenoids (not shown) within the chamber 52 (not shown), through their mutual, electromagnetic interactions with solenoids 400, located on the ends of the mass systems 80. Subsequently, during the interaction between the body 80 and the body 120 in this embodiment, the body or bodies, 80, interact mechanically with the arms 500, extending from the flywheels 132. In addition, the solenoids 506 on the ends, respectively, of the body 80, interact with, and apply an impulse to the solenoids 507, positioned on the periphery of the flywheels, causing the flywheels to accelerate rotationally, the body 120 to accelerate linearly, and the mass system 80 to decelerate linearly. Thus, a portion of the linear kinetic energy and the linear momentum of the body 80 is transmuted into rotational kinetic energy and angular momentum of the flywheels 132. Body 120, in the form of one or two, dynamically balanced, individual systems, can also be symmetrically mounted on an axle lying on a secondary axis, 122, and revolve as well from the applied impulse.

The secondary axis 122, supporting the body 120, may also be mounted on a cart base (not shown), and approximately supported by the rails 62,64, to allow translational as well as rotational motion of this system, as a result of the interaction with the mass system 80. In such a manner, dynamically balanced, individual pairs of systems can be mounted on a third, fourth, or "nth" axes of rotation, and therefore comprise any number of statically and dynamically balanced sets of wheels or ring systems, which may be allowed to translate as well as rotate.

FIG. 10 shows yet another embodiment wherein the flywheels 132 include a plurality of diametrically spaced arms 520, mounted on the tops and/or bottoms of the flywheels 132. The arms 520 communicate with the arms 90,92 on the body and mass system 80. This allows the flywheels 132 to be revolved, upon successive interactions of the engagement pin 70 formed on the body 80, with the arms 520 of the flywheels 132.

The embodiment of the flywheel 132 shown in FIG. 11, includes an arm 530, extending tangentially from the periphery of the flywheel 132, which communicates with the arm 90 of the body 80 (not shown) via solenoids, (not shown). Arm 530 is linked to a one-way, positive-traction, clutch and ring and mechanism, 130, by pin and pivot 72. This permits the flywheels 132 to be revolved during interaction between the bodies 80 and 120.

Figure 12:
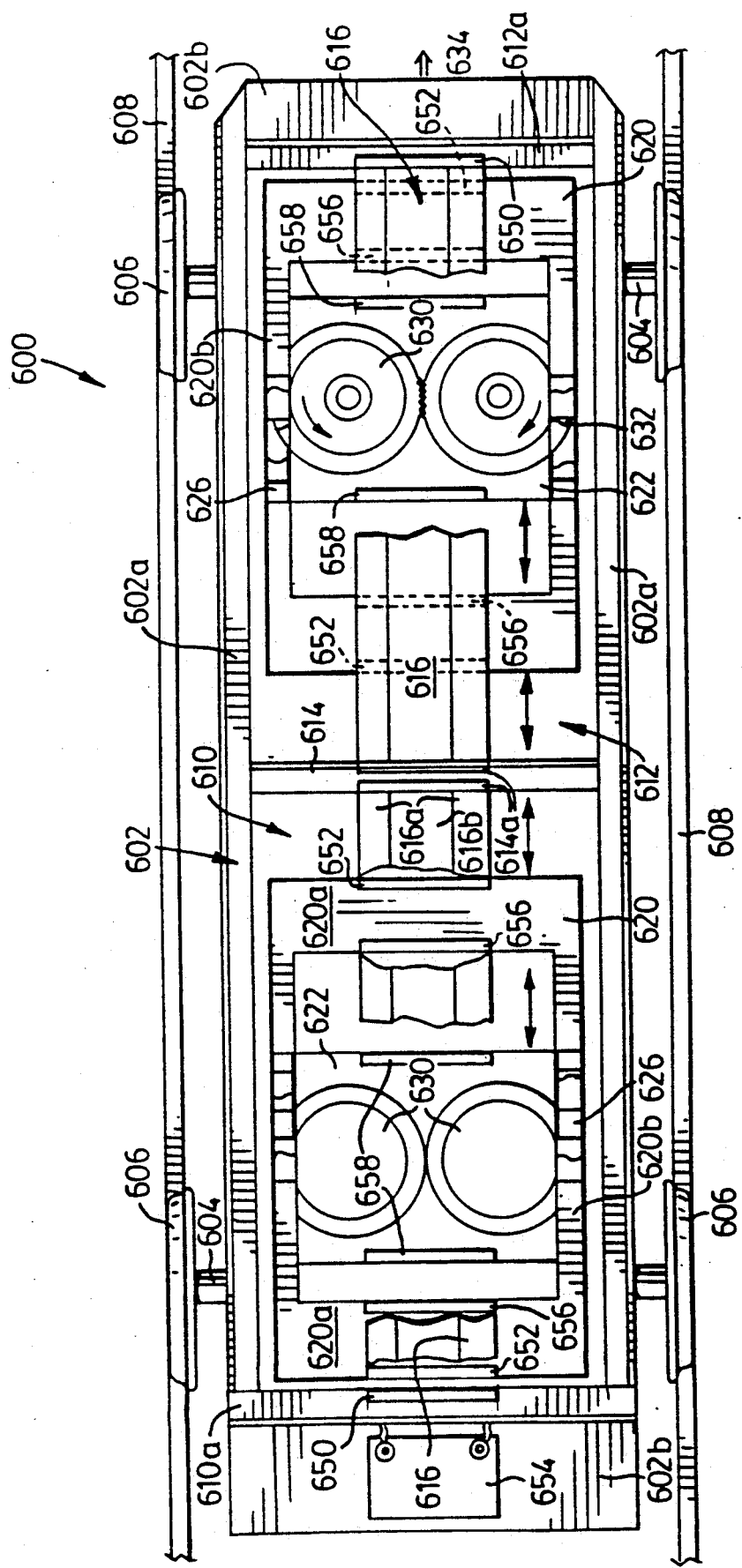
FIG. 12 is a top plan view of a vehicle provided with yet another embodiment of an impulse drive.

Referring now to FIG. 12, another embodiment of an impulse drive, 600, similar to the one shown in FIGS. 3 to 6, is illustrated. In this embodiment, the impulse drive 600 includes a frame 602 in the form of a chassis, having a pair of side walls 602a, and a pair of end walls 602b. At each end of the chassis is an axle 604, supporting a pair of wheels 606. The wheels 606 rest on the rails 608 of a track, to guide the movement of the frame 602. The frame is divided into two cylinders, 610,612, by a transverse wall 614 extending between the side walls 602a, which carries a pair of solenoids 614a, one on either side thereof. Upper and lower pairs of guide rails 616 (only the lower pair of which is shown) lie along the longitudinal axis of the frame 602, and extend the length of each cylinder. A pair of carts 620, 622 are located within each cylinder 610, 612 respectively, and are movable along the guide rails 616, as will be described herein, with the pairs of carts in each cylinder constituting an impulse-generating unit. The guide rails 616 are constituted by pairs of linear bearings 616a, and electromagnetic brakes in the form of linear induction motor railguns 616b, which are operable to brake the carts at any position along the rails 616, within the cylinders.

Located at the end walls 610a,612a, of each cylinder 610, are solenoids 650, which are capable of applying equal, yet oppositely directed impulses to the first carts 620, located in each cylinder, via the solenoids 652 located on the outer walls of the carts. The solenoids are powered by a battery 654 which can be conveniently carried by the frame 602, at any suitable location.

The first carts 620 include spaced end wall members 620a, joined by upper and lower pairs of arms, 620b and 620c, respectively. The arms 620b, 620c extend from the end wall members 620a, adjacent the upper and lower corners thereof, and carry upper and lower, linear induction motor, railgun primaries 624, which are operable to apply an electromagnetic force to the second carts 622, in a manner to be described. The first carts 620 also carry solenoids 656, on the inner walls of the end wall members 620a. The solenoids 656 communicate with solenoids 658, located on the outer walls of the second carts, to allow repelling, magnetic forces to be applied between the carts 620,622, when desired. The second cart 622 in each cylinder 610,612 respectively, is located between the end wall members 620a of the first cart. The second carts 622 are of course of suitable dimensions so that the arms pass above and below the outer peripheral surfaces of flywheels 630, rotatably mounted on the second carts. Each second cart 622 carries a pair of flywheels 630, communicating via teeth, so that the flywheels counter-rotate. The flywheels 630 are of dimension so that a portion of the rim of each wheel passes directly between the arms 620b,620c. As in the previous embodiment, the flywheels 630 carry rotational railgun secondaries, which communicate with the railgun primary 626, to allow the flywheels to be rotated by the arms 620b,620c and electric motor generator systems (not shown) which provide a reverse torque on the flywheels 132.

This embodiment of the impulse drive is similar to the previous embodiment, except that the first carts 620 are not repositioned after an interaction, but are rather operated in a manner such that they assume their initial positions after two interactions have occurred, while ensuring that the impulses generated after each interaction are applied to the frame 602 in the same direction, if desired.

In operation and initially, the first carts 620 are at their symmetrically opposite, starting positions within the frame 620, adjacent the end walls 610a,612a. Simultaneously, equal, yet oppositely directed impulses are applied to each cart 620 by the solenoids 650. As the frame 602 receives two, equal and oppositely directed impulses by these events, no net motion of the frame 602 occurs, since these net impulses cancel each other out. The first carts 620, having received, respectively, the equal but oppositely directed impulses, are linearly accelerated to equal, yet oppositely directed linear momenta, and travel along the rails 616 towards the center wall 614. Each of the first carts 620 are then braked to zero velocity, or decelerate by equal amounts, through either repulsive, magnetic forces applied by and to the second carts 622, via the LIM railguns 626 located on the arms 620b and 620c, and via the railgun secondaries located on the wheels 630, or by repulsive forces applied by the solenoids 656, 658, located on facing sides of the bodies 620,622, respectively.

On the second cart 622 in cylinder 612, the repulsive, magnetic forces are applied at the rims of flywheels 630, causing the flywheels 630 on the second cart 622 to begin to turn, while also causing the second cart 622 to accelerate linearly towards the center wall 614. During this interaction, the first cart 620 is of course caused to brake or linearly decelerate. Similar to the embodiment shown in FIGS. 3 to 6, a reverse torque is applied to the flywheels 630, respectively, via electric motor-generator systems (not shown), within and integral to each flywheel and the body of the second cart, in directions opposite to the directions of the rotational accelerations of the flywheels 630, during the interactions with the first cart 620. This causes the first cart 620 to have to do extra work to the flywheels 630, and accordingly, the flywheels 630 to do extra work to the first cart 620. This assists in precisely controlling the braking or deceleration of the first cart 620 during the interaction, and also assists in the timing process.

Within the cylinder 610, occurring concurrently with the interaction above, between the first and second carts in cylinder 612, repulsive, magnetic forces are applied linearly to the body of the second cart 622, via the solenoids 656,658, located on the facing sides of the carts 620,622 respectively. The wheels 630 on the second cart 622 are not engaged or caused to turn in this particular interaction. This causes the second cart 622, within the cylinder 610, to accelerate linearly toward the center wall 614, while at the same time causing the first cart 620 to brake linearly and decelerate.

Comparing each, individual system of the first and second carts within the cylinders 610, 612 to the description of the respective, individual motions the carts, the second cart 622 in cylinder 612 is accelerated to approximately 80% of the linear momentum of the first cart 620, with the remaining 20% of the linear momentum, originally of the first cart 620, being transmuted and absorbed into rotational motion and angular momentum of the flywheels 630. This is in contrast with the second cart 622 in cylinder 610, which linearly absorbs approximately 100% of the linear momentum of the first cart, 620. During each, respective interaction, the first carts 620 are braked to zero velocity, or by equal amounts, relative to their individual motions within the frame 602 and their respective cylinders, and both first carts 620 travel equal distances from their initial starting positions.

The two first carts 620 are now latched to their symmetrically opposite, new starting positions, by electromagnetically activated, solenoid latches (not shown). The second cart 622 in the cylinder 610 now has a linear momentum, in the forward direction of the arrow 634, which is about 20% greater in magnitude than that of the other second cart 622, which is now moving oppositely and in the reverse direction within the cylinder 612, as part of the original, linear momentum of the first cart 620 was absorbed by the flywheels 630.

By now having the linear, electromagnetic, braking systems 616b, within the rails 616, act simultaneously on both the second carts 622, by the time the second carts have reached their symmetrically opposite positions within the respective cylinders, the 20% greater linear momentum of the second cart 622, within the cylinder 610, is applied through the frame 602, through the first carts 620 latched temporarily to the frame 602, and to the body of the moving, second cart 622, within the cylinder 612, as a resultant, net impulse to the center of mass of the whole system. This of course causes the combined system to accelerate linearly to a first, resultant, linear velocity, $v_1$. The second cart 622, within the cylinder 612, is linearly braked by the frame 602, and then linearly accelerated in the opposite direction, by a portion of the resultant, net impulse applied to the frame 602 and the combined system 600, by the second cart 622 within cylinder 610.

After their respective linear accelerations, the frame 602, along with the combined system 600, moves in the direction of the arrow 634, and the first and second carts 620, 622 are at the opposite ends of their respective cylinders, adjacent the center wall 614. Instead of mechanically repositioning the arts 620, 622 to their initial, starting positions, the wheels 630 on the second cart 622 in cylinder 612, that were active during the previous interaction, are electrically disengaged, and the wheels 630 on the second cart 622 in cylinder 610 are electrically activated. Once this is done, the solenoids 614a, located on opposite sides of the center wall 614, are activated, to apply symmetrically, equal and oppositely directed impulses to the first carts 620 via solenoids 652, so that they move along the rails 616 towards the end walls 602b of the frame.

Since the frame 602 receives two, equal, yet oppositely directed impulses by these actions, no increased or decreased motion of the moving frame 602 occurs. The first carts, having respectively received the equal impulses, linearly accelerate relative to the moving frame 602, to equal, yet oppositely directed, resultant, linear momenta. Each of the first carts 620 are caused to brake to zero velocity, or to decelerate by equal amounts, relative to the moving frame 602, through repelling, magnetic forces applied by and to the second carts 622. On the second cart 622 in cylinder 610, these repelling, magnetic forces are applied to the rims of the wheels 630 via the railgun primary 626, causing the wheels to spin and the second cart 622 to accelerate linearly toward the sternward, end wall 602b, while at the same time causing the first cart 620 to brake or linearly decelerate.

On the second cart 622 in the cylinder 612, occurring at the same time as the above interaction, the repelling, electromagnetic forces are applied linearly, directly from and to the first cart 620, to the body of the second cart 622, mutually via the solenoids 656,658. The wheels of the second cart in cylinder 612 are not engaged or caused to turn in this interaction. This causes the second cart 622 in cylinder 612 to accelerate linearly, toward the forward, end wall 602b of the frame 602, while at the same time causing the first cart 620 to brake or linearly decelerate.

As previously described, with regard to the interaction between the carts 620,622 within the forward cylinder 612, the second cart 622 in the sternward cylinder 610, now is only accelerated to approximately 80% of the linear momentum of the first cart 620, with the remaining 20% of the linear momentum, originally of the first cart 620, being absorbed by the rotation of the flywheels 630. This is in contrast with the second cart 622 in the forward cylinder 612, which linearly absorbs approximately 100% of the linear momentum of the first cart 620. In each interaction between the first and the second carts, the first carts are braked to zero velocity or by equal amounts, relative to their individual motions within their respective cylinders, relative to and within the moving frame 602.

The first two carts 620 are then latched to their respective cylinders, at their original positions (opposite that of their starting positions for this interaction), by solenoid latches (not shown). Due to these interactions, the second cart 622 in cylinder 612 has a linear momentum in the forward direction of arrow 634, that is about 20% greater in magnitude than the oppositely directed, sternward linear momentum of the other second cart 622, relative to the moving frame 620 and the first carts 620, that are now latched integrally to it.

The electromagnetic braking systems 616b are then caused to act on the second carts 622, concurrently, and by the time the second carts 622 have reached their original starting positions, their linear momenta is transmitted to the moving frame 602 and the combined system 600. The differential between the resultant linear momenta of the two second carts 622, results in the transfer of the net, linear momentum as a second, resultant, net impulse to the frame 602 and the combined system 600. This causes the whole system 600 to accelerate further in the direction of the arrow 634, to a second, resultant, linear velocity, $v_2$, which is greater than its previous linear velocity, $v_1$. The second cart 622, within the cylinder 610, is linearly braked by the frame 602, while at the same time being linearly accelerated in the opposite direction, by a portion of the second net impulse applied to the frame 602 and the combined system 600, by the second cart 622 with cylinder 612.

During the respective time intervals between the engagements and the interactions of the first carts 620 with the second carts 622, the rate of spin of the synchronized flywheel system 630 is adjusted, by decreasing the r.p.m. of the wheel system 630 by the amount it was increased during the engagement and interaction with the first cart 620. This is done in order that the approach velocity of an incoming first cart 620, relative to the motion of the rim sections of the flywheels 630, is consistent for each rotational engagement and interaction. The r.p.m. is respectively adjusted, by disc, electric motor-generator systems (not shown).

The above series of actions is repeated, alternating the linear interactions and the partial rotational, absorption interactions between cylinders. In this manner, the vehicle 600 should be able to achieve any desired, linear velocity. To brake the vehicle 600, once moving, the interactions simply need to be performed in the reverse mode, to those interactions as described above, so that the impulses applied to the frame 602 are in a direction opposite to that of the arrow 634.

Figure 13:
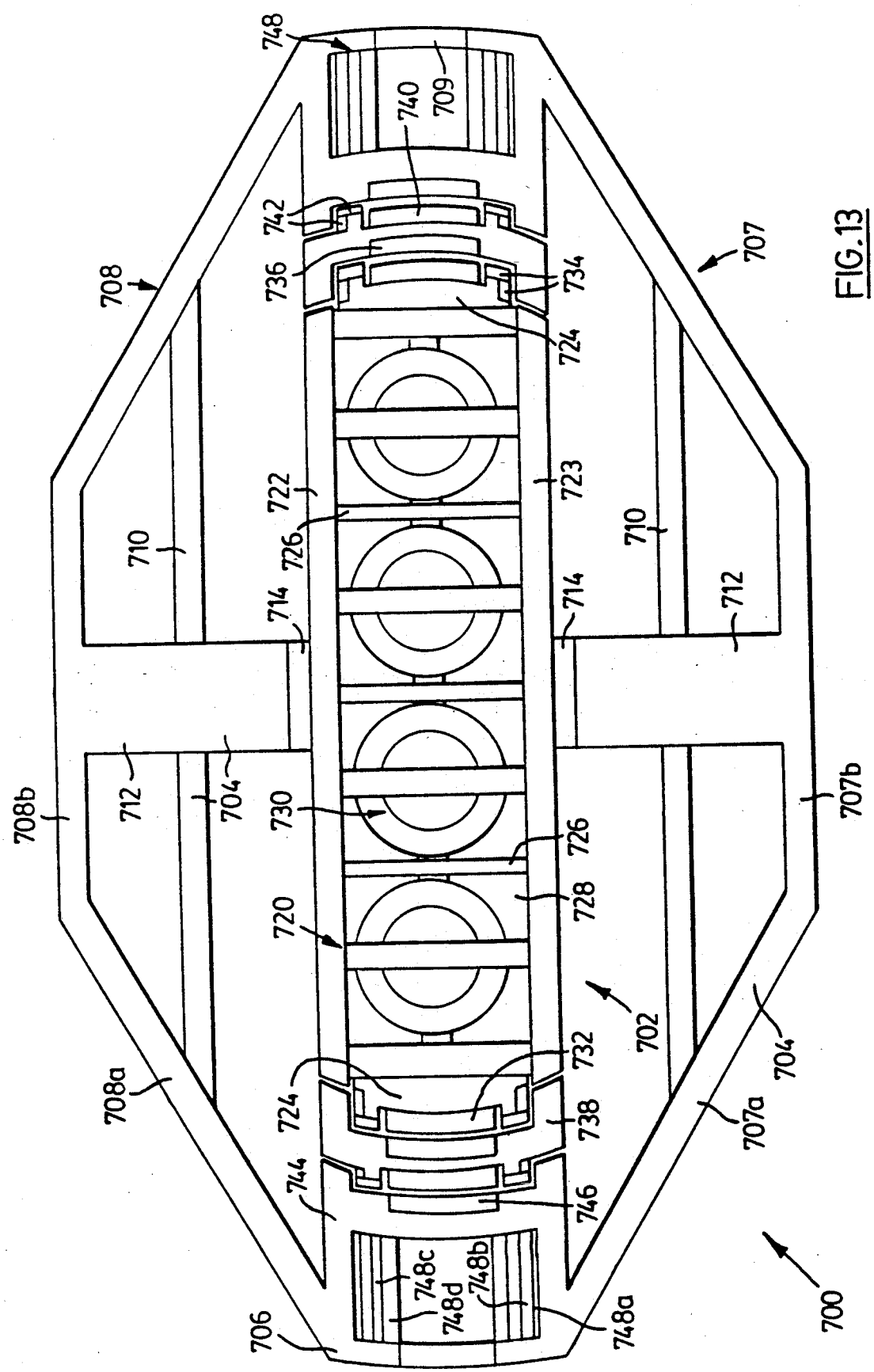
FIG. 13 is a side view of a vehicle provided with still yet another embodiment of an impulse drive.
Figure 14:
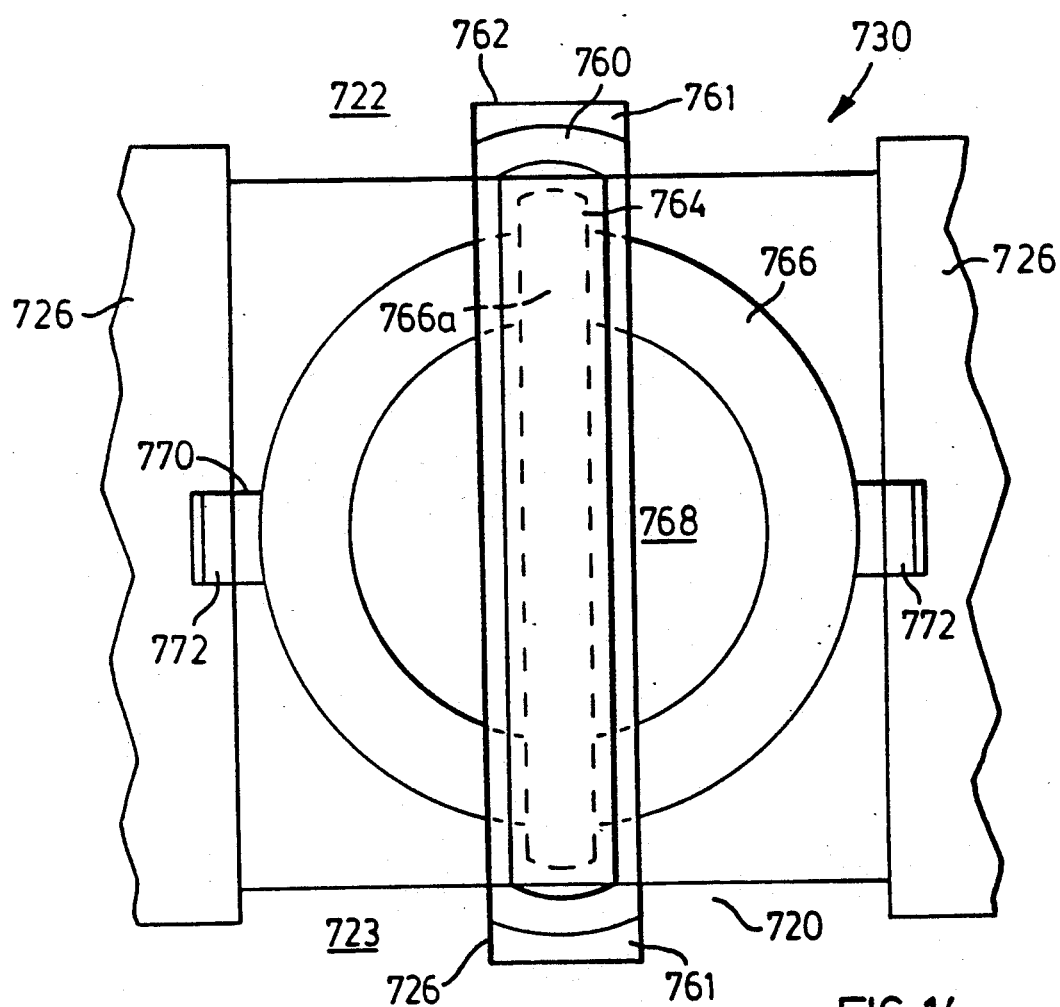
FIG. 14 is an enlarged front view of a portion of the vehicle shown in FIG. 13.
Figure 15:
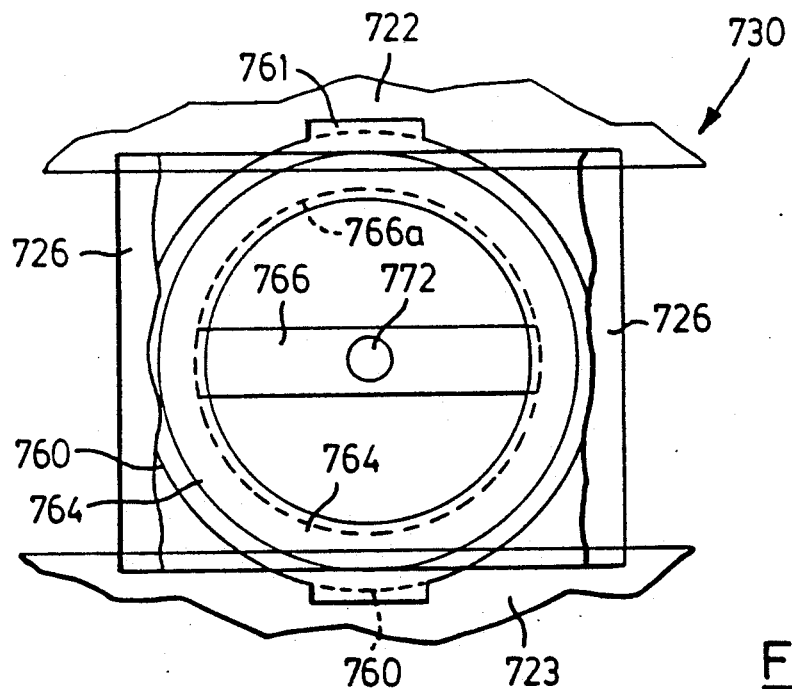
FIG. 15 is a side view of the portion shown in FIG. 14 with an element therein rotated by 90°.
Figure 16:
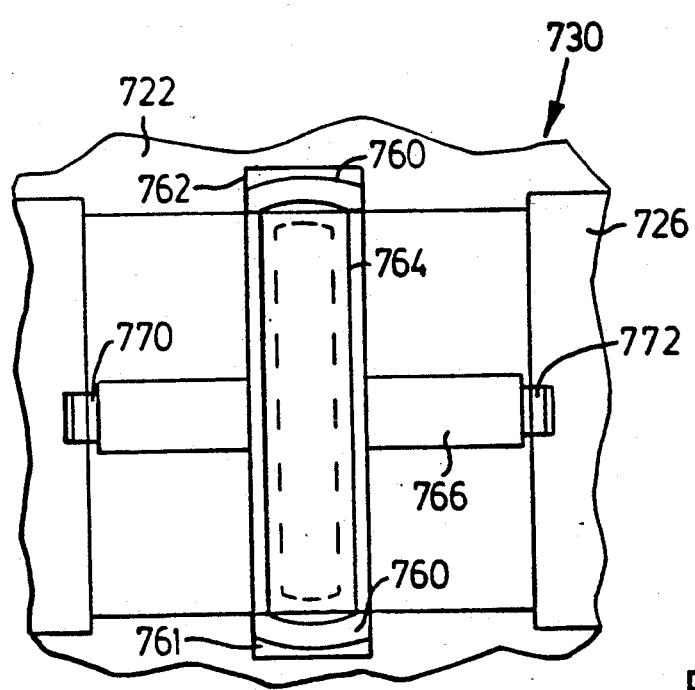
FIG. 16 is a front view of the portion shown in FIG. 15.

Referring now to FIG. 13, a vehicle 700, embodying another embodiment of an impulse drive 702, is shown in section from the side. The impulse drive 702, in this embodiment, is operable to provide thrust to the vehicle 700, in any direction within the x,y, and z planes. The vehicle 700 is symmetrical about the three, perpendicular axes, and includes a frame or chassis 704. The chassis 704 includes a cylindrical side wall 706, with a cup-shaped base 707 and a dome-like top 708, connected to the side wall 706 to form an enclosure. The top 708 comprises an upwardly and inwardly inclined section 708a, extending from the upper edge of the side wall 706, and an upper flat section 708b. The base 707 is of a similar configuration to the top 708, and includes a downwardly and inwardly inclined section 707a, and a lower flat section 707b. Portholes 709 are located around the circumference of the vehicle 700,. Two, horizontal, annular, support members 710 are provided and are secured to the angled sections 707a,708a of the base and top, respectively, at their mid-points. A pair of upright members 712 extend from the center of the flat sections 707a,708a, of both the base and the top 707, 708 respectively, and pass through the annular support members 710. The upright members 712 support the impulse drive 702, within the vehicle 700, via thrust-radial bearings 714. This permits the impulse drive 702 to rotate within the vehicle in the x,y plane. The upright members 712 may also serve as housings for the energy supplies necessary to operate the vehicle 700.

The impulse drive 702 includes a support frame 720 which is generally annular in plan, having a ceiling 722, and a floor 723. Surrounding the support frame 720, is an annular, side wall 724 which bridges the floor and the ceiling. Intermediate walls 726, extending between the floor and the ceiling, are equally spaced along the length of the support frame 720, to define four cylinders 728. Each cylinder 728 houses an impulse generator 730, as will be described. A rotor 732, forming a part of a rotational induction motor, is mounted on each end wall, 724. Disposed on each side of the rotors 732 are a pair of bearings 734, preferably of the thrust-radial or magnetic bearing type. The rotor 732 communicates with the stator 736 of the induction motor, which is mounted on one side of an annular, intermediate frame member 738. The bearings 734 also communicate with the intermediate frame member 738, to facilitate rotational movement between the support frame 720 and the intermediate frame 738, while the impulse drive 702 is rotating in the x,y plane.

The outer side of the intermediate frame 738 supports the rotor 740 of a second, rotational induction motor, together with thrust-radial bearings 742 along its circumference. A motor housing 744 extends inwardly from the inner surface of the side wall, along the circumference thereof, and supports the stator 746 of the second induction motor. As with the first induction motor, the bearings 742 facilitate rotation of the intermediate frame 738 with respect to the chassis, 704. The arrangement of the support frame 720, the intermediate frame 738, and the motor housing 744 forms a swivel, so that rotation in the x,y plane of the support frame 720, within the vehicle 700, provides no net torque on the chassis 702.

Within the motor housing 744, a gyroscopic stabilizer 748 is located, and includes upper and lower rotational induction motors having stators 748a surrounding rotors 748b. The rotors 748b surround thrust-radial bearings 748c, which themselves, surround frame members 748d. The upper and lower rotors, integrally mounted to upper and lower, thrust-radial bearings 748c respectively, are of equal mass and rotational inertias.

In the operation of the gyroscopic stabilizer 748, the upper and lower stators, 748a are electronically activated and electrically energized to equal extents, thereby causing the rotors 748b to accelerate rotationally, one in the opposite direction with respect to the other, to equal yet oppositely directed extents of rotational motion or angular momenta. Thus, the gyroscopic stabilizer 748 functions much like a spinning toy top, or gyroscope, and helps maintain the vehicle 700 within the plane of operation. Similar yet oppositely directed modes of operation are automatically caused to occur, in sequence, when electronically disengaging these systems. Accordingly, there is no net torque provided to or resultant upon the vehicle 700 by the use of the gyroscope stabilizer 748.

Referring now to FIGS. 14 to 21, one of the impulse generators 730 is better illustrated. Since each impulse generators 730 is identical, in configuration and function, only one will be described herein. As can be seen, the impulse generator 730 includes an outer, annular, ring casing 760, which seats within recesses 762 formed in the ceiling 722 and floor 723 of the frame 720. The casing 760 is mounted to the ceiling and floor of the frame 720 by supports 761, structurally integral to the ring casing 760, and in a manner so that relative movement between the frame 720 and the ring casing 760 is not permitted. An inner, annular, ring casing 764 is also provided, and is supported by the outer ring casing 760 in a manner which permits relative, rotational movement to occur.

The inner ring casing 764 supports a pair of wheels, namely an outer wheel 766, and an inner wheel 768, which lie in a plane perpendicular to the plane in which the inner ring casing 764 is seated. As can be seen in the FIGS. 14 to 19, the outer wheel 766 is mounted and supported within the inner ring casing by a ring 766a which is integral yet perpendicular in configuration to the wheel 766. The ring 766a provides for more uniformly distributed force along the inner ring casing 764 when such a force applied and is a structural component of the wheel 766 A casing and support 800 (see FIG. 17) surrounds the outer surface of the wheel 766, and at diametrically located positions, is provided with two swivel casings 770 mounted thereon. The swivel casings 770 communicate with the walls 726 of the frame 720, defining the sides of each cylinder via thrust-radial bearings 772, to permit rotational movement of the outer wheel 766 with respect to the side walls 726, when the inner and outer wheels are rotated with respect to the inner ring casing 764.

Figure 17:
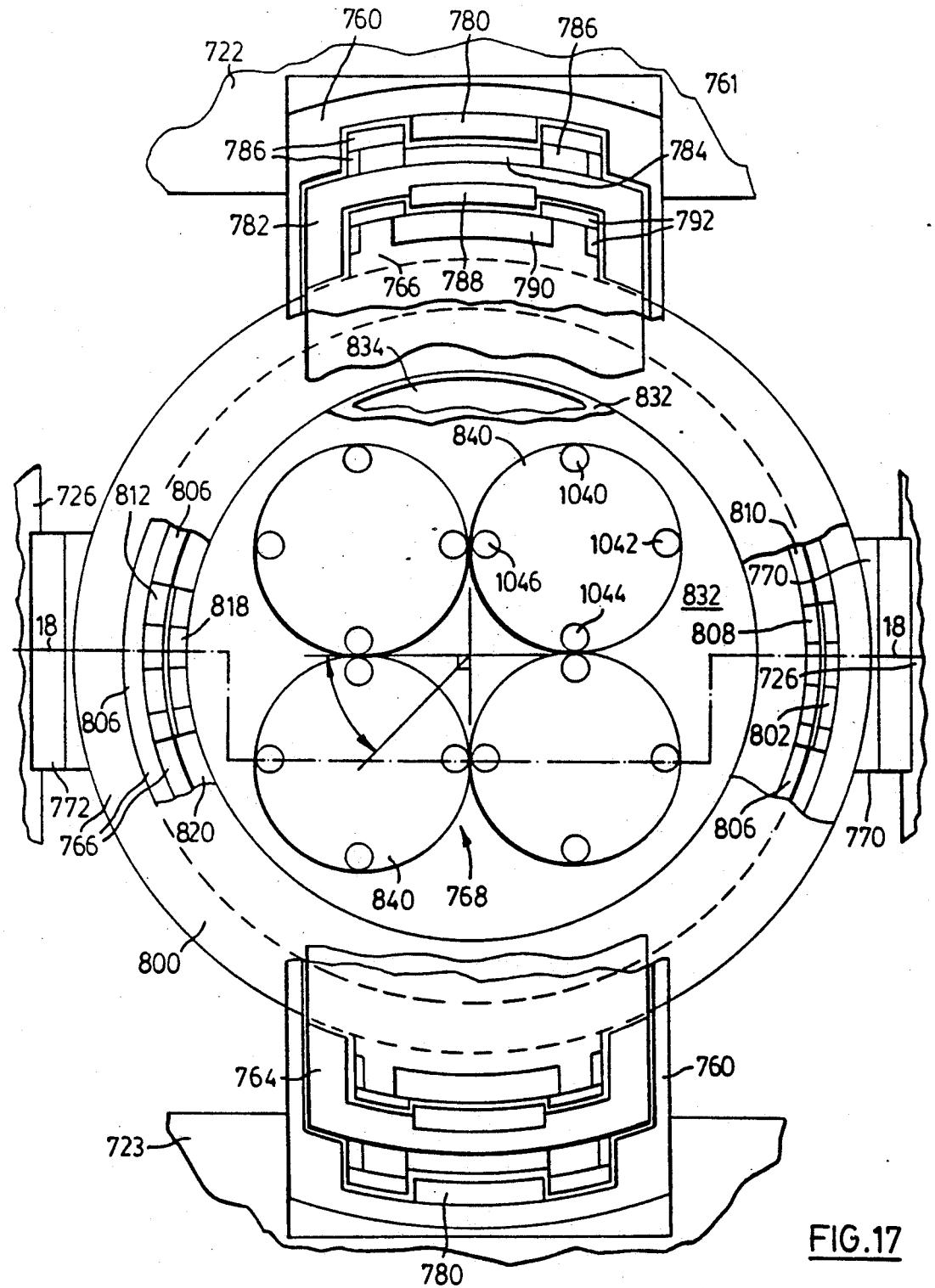
FIG. 17 is an enlarged front view of the portion shown in FIG. 14 better illustrating the components therein.
Figure 18:
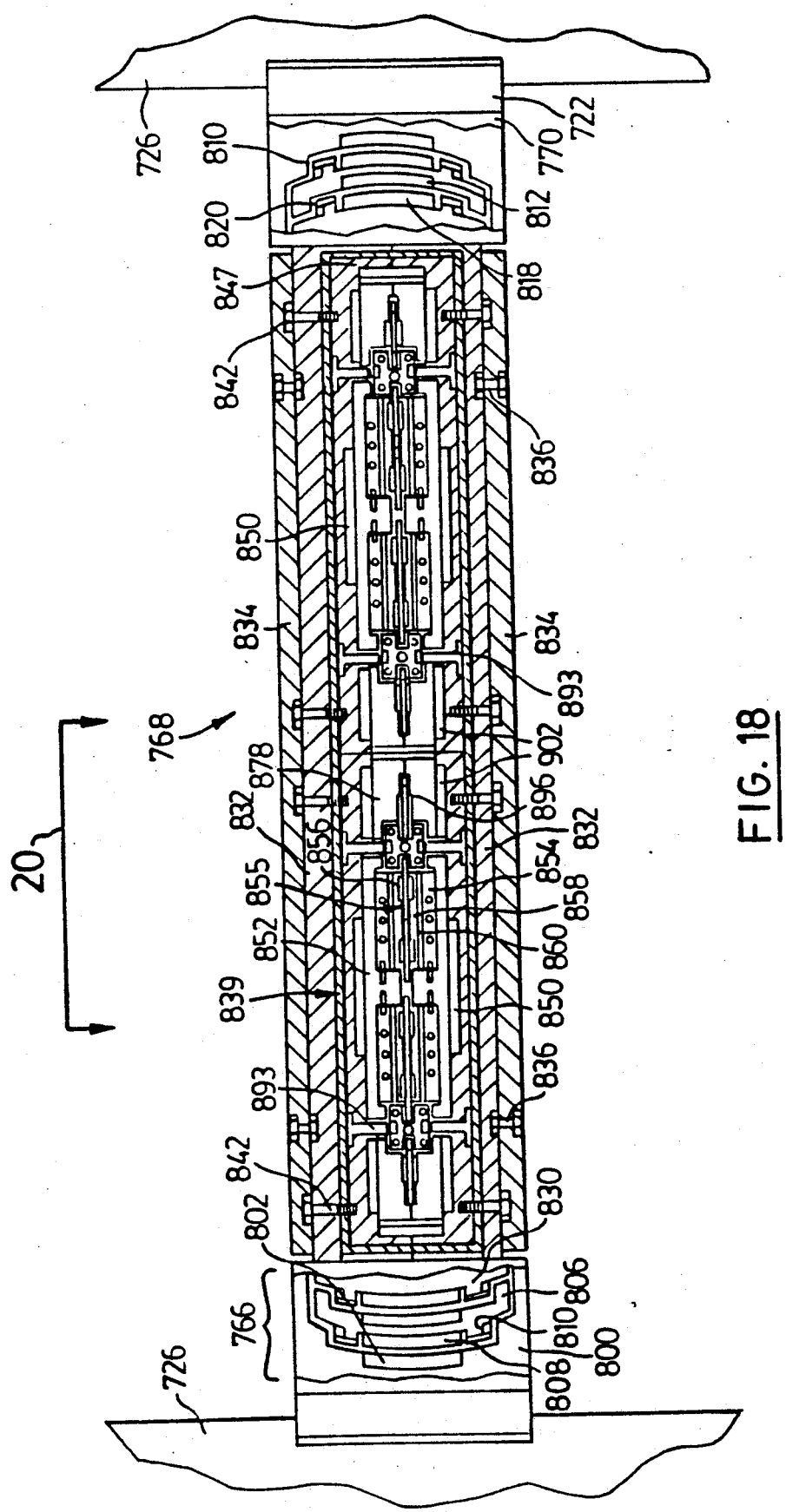
FIG. 18 is a section of the portion shown in FIG. 17 taken along line 18—18.

FIGS. 17 and 18 better illustrate the impulse generator 730 and as can be seen, the inner circumferential surface of the outer ring casing 760, supports the stator 780 of a rotational induction motor. The outer circumferential surface of the inner ring casing 764, supports the rotor 784 of the induction motor, along with a set of thrust-radial bearings 786, to permit rotational movement of the inner ring casing 764, with respect to the outer ring casing 760. The inner circumferential surface of the inner ring casing 764 supports the stator 788 of a second rotational induction motor. The rotor sections 790 of the second induction motor are supported by the outer surface circumference of the outer wheel-ring 766. Thrust-radial bearings 792 are also located on the outer circumferential surface of the outer wheel-ring 766, adjacent the rotor sections 790, to facilitate 360 degree, rotational movement of the outer wheel-ring system 766, with respect to the inner ring casing 764, without creating a torque on this system.

As mentioned previously, the outer wheel 766 includes the outer ring casing 800 which supports the swivel casing 770, and which does not move relative to the swivel casing. Extending along the circumference of the inner surface of the outer ring 800, is the stator 802 of a rotational induction motor. The outer surface of a second interior, intermediate ring 806 supports the rotor 808 of the rotational induction motor, along with thrust-radial bearings 810, to permit relative, rotational motion between the two rings 800, 806, respectively. The inner surface of the interior ring 806 supports a circumferentially extending stator 812, which communicates with the rotor 818, of the rotational induction motor extending along the circumference of the outer surface of the inner wheel, 768. The outer surface of the inner wheel 768 also supports thrust-radial bearings 820, to facilitate rotational movement between the inner wheel 768 and the inner ring 806, without creating a torque on the system.

The inner wheel 768 includes a cylindrical body 830, defining the outer circumferential surface on which the rotor 818 of the rotational induction motor and the bearings 820 are secured. Upper and lower walls 832 are provided, and extend across the upper and lower edges respectively, of the body 830. Circular, planar covers 834 are secured to the upper and lower walls 832 via fasteners 836, such as bolts, to enclose completely the interior of the body 830, and to define an enclosure 839. Within the enclosure 839 are located four disc systems 840, with adjacent pairs of disc systems communicating, so that rotation of one disc system 840 causes rotation of the other disc systems 840, as will be described. The disc systems 840 are also fastened to the upper and lower walls 832 by fasteners 842, such as bolts.

Each disc system 840 includes a circular, upper section 844 and a circular, lower section 846, which are secured together. The two sections 844, 846 define the upper and lower walls which are bridged by a side wall 847, to form an enclosure 848. The upper and lower walls of the disc systems 840 receive the fasteners 842. A portion of the side wall 847 is removed adjacent the other disc systems 840, to permit the mechansism disposed within the enclosure 848 to engage mechanically the other disc systems 840. Located at the center of the enclosure 848 are a pair of disc, electric motor-generators 850. The disc motor-generators 850 seat in recesses formed in the interior surfaces of the top and bottom walls 844, 846, respectively. Each disc motor-generator 850 is coupled to opposite sides of an inner rotating wheel 852. Within slots 853 formed in the inner rotating wheel 852, are a pair of diametrically located masses 854, each of which supports a pair of flywheels 855. The flywheels 855 are provided with teeth 855a on their circumference so that the flywheels 855 counter-revolve. The flywheels 855 communicate with disc motor-generators 856 mounted on supports 858 within the masses 854.

Rotational induction motor railguns 870 are provided along the circumference of each of the flywheels 855. The flywheels 855 on each mass 854 extend radially beyond the outer edges of the mass. The supports 858 communicate with disc motor-generators 860 which rotate and are supported by the masses 854. The masses 854, within slots 853, rest on linear bearings 864 supported by bearing rods 864a integral to the wheel 852, to permit linear movement of the masses 854 with respect to the wheel 852, as will be described. Electronically activated, solenoid latches 865 are formed on the inner wheel 852, and communicate with latches 867 on the masses 854, to inhibit sliding of the masses 854 along the bearing rods 864a within the slots 853, when desired. Linear induction motor coilguns 866, integral to the wheel 852, also pass through the upper portion and the lower portion of the masses 854, adjacent to their respective LIM complement, coils 866a which are integral to and within the masses 854.

Diametrically positioned on opposite sides of the inner wheel 852 are masses 874 which rest in slots 876 defined between the inner circumference of an outer wheel 878 surrounding the inner wheel 852 and the outer circumference of the inner wheel 852. The masses 874 are supported by a number of linear bearings 880, on bearings rods 880a integral to the outer wheel 878, and extending the length of the slots 876. This permits the masses 874 to move linearly along the slots 876. A linear induction motor coilgun 882 also extends through each mass 874, adjacent to its respective LIM complement, coil 882a, which is integral to and within each mass 874. The masses 874 have slots 884 formed in their side walls. One of the slots receives the rim of one of the flywheels 855.

Linear induction motor railguns 888 are located on the upper and lower surfaces defining the one slot 884, which communicate with the induction motor railguns 870 on the flywheels. The upper and lower walls of the other slot 884 also carry linear induction motor railguns 890. In addition, the upper and lower surfaces of each mass 874 carry linear induction motor railguns 891. The linear induction motor railguns 891 communicate with induction motor railguns 892 secured to the inner surface of a pair of rings 893 on the sections 844 and 846 respectively. Auxiliary solenoids 891a (see FIG. 21), integral to and within the outer wheels 878, are positioned within each end wall of the slots 876, so that they are adjacent the ends of the railguns 891, respectively. The auxiliary solenoids 891a function as additional motion, position, and timing control systems for the masses 874, as required, during the operation of the systems 840.

The other slot 884 receives the rims of another pair of flywheels 896, which have induction motor railguns 898 formed on their periphery. The flywheels 896 are rotated by a pair of upper and lower disc motors 900, secured to the outer wheel 878. The flywheels 896 are employed for additional acceleration and deceleration assists, and in the repositioning of the masses 874, along arcs defining approximately 1 to 8 degrees, with their centers, indicated by the arrows 400 in FIG. 19. During the repositioning of the masses 874, the oppositely directed, lateral impulses created, sum to zero, respectively, and do not create any resultant effect on the vehicle chassis. The outer wheel 878 is rotated by the upper and lower ring motors 902, which are mounted to the upper and lower sections 844, 846, respectively. The outer surface of the circumference of the wheel 878 is provided with teeth 904 which mate with the teeth 904 respectively, on the two, adjacent, disc systems 840, so that the rotation of one disc system imparts rotation of the other disc systems 840. The inner wheels 852 are electronically and computer programmed to spin at the same angular velocities as the outer wheels 878 of the systems 840, respectively, such that all wheels 852, 878 revolve uniformly.

The operation of the impulse drive will now be described with reference to FIGS. 13 to 22. For the sake of clarity, the operation of a pair of disc systems will be fully explained, although it should be apparent to one of skill in the art that the other pair of disc systems function in an identical manner, to provide an impulse to the frame, and hence the chassis, in the same direction as the other disc systems within the particular impulse generator. It should also be apparent that although the operation of only one impulse generator 730 is to be described, the other impulse generators function in an identical manner, so that the two pairs of resultant impulses applied to frame by the impulse generators 730 are generally applied in a symmetrical manner. This is done in order that the sum of each, respective pair of mutually complementary impulses is repetitively applied through the center of mass of the vehicle 700, respectively and uniformly as one, net impulse, or as two, resultant impulses combining into one, resultant vector.

Figure 19:
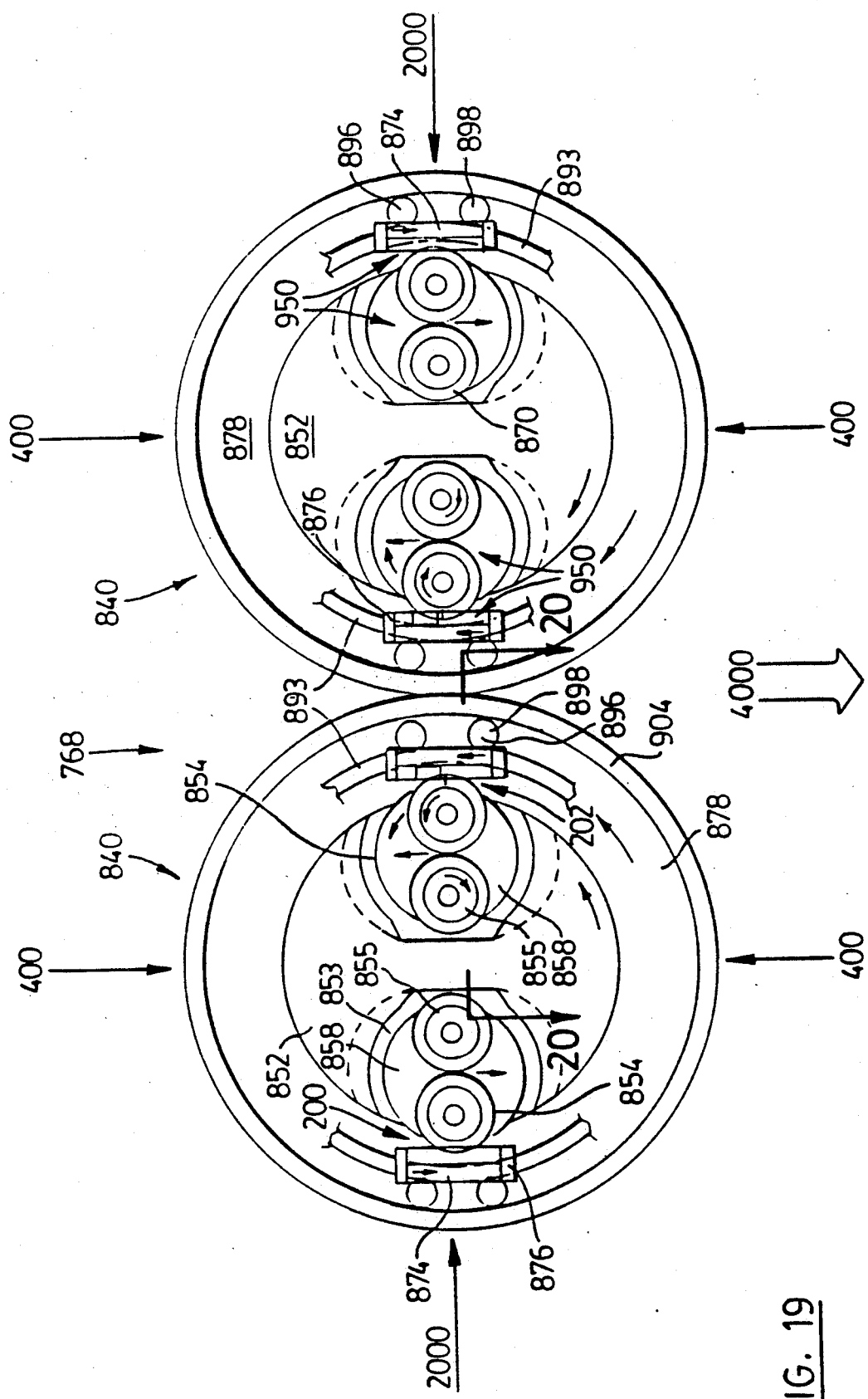
FIG. 19 is an enlarged top plan view of some of the components illustrated in the portion shown in FIG. 17.

When it is desired to operate the impulse drive to apply a net impulse to the frame, the disc motor-generators 856 are energized to pre-spin the flywheels 855. Simultaneously, the disc motor-generators 860 are energized to pre-spin the flywheel supports 858, upon which the systems 856, 855 are mounted. Thereafter, the disc motors 850 are energized so that the inner wheels 852 begin to rotate in the directions of the arrows, as illustrated in FIG. 19. Simultaneously, the ring motor-generators 902 are energized so that the outer wheel systems 878 begin to rotate in the directions of the arrows, at the same angular velocities, overall, as the inner wheel systems 852. As the inner and outer sets of wheels 852,878 revolve, to bring the internal pairs of masses 854,874, respectively to the positions indicated by the arrows 200,202 in FIG. 19, the first masses 874, diametrically located on both sides of the wheel systems 878, are simultaneously accelerated ("linearly", with respect to their initial positions at the ends of their respective slots 876 but angularly, with respect to the axes of the wheel systems 878). The acceleration of the masses 874 is achieved by repelling, electromagnetic fields, automatically created by electronically activating and electrically energizing either, or any combinations of the following mutually interacting elements. The masses 874 can be accelerated due to such an interaction between the solenoids 981a at the other ends of the slots 876 and induction motor railguns 891 within the masses. Alternatively or in combination, acceleration of the masses can be achieved by the interaction between the induction motor systems 892 on the rings 893 and the induction motor railguns 891. Still further, interaction between the coilguns 882 passing through the masses 874 and their respective complement, coil systems 882a on the masses can be used to accelerate the masses 874. At higher r.p.m. of operation of the wheel systems 840, the interaction between the induction motor systems 898 on the revolving wheel systems 896, and upper and lower induction railgun systems 890 on the walls defining the other slots 884 can be used to accelerate the masses.

Once the interaction has taken place and the masses 874 are accelerated, at the precise instant in time that the pairs of masses 874 have simultaneously reached their respective, desired, peak velocities along the slots 876 and of approach to their respective, corresponding pairs of second masses 854, the systems used to accelerate the masses 874 are electronically deactivated and electrically disengaged. The simultaneous, respective accelerations of the two pairs of masses 874 within the slots 876 create two, equal yet oppositely directed, net impulses through the center of mass of the two wheel systems 840, which sum to zero, and have no effect on the frame or vehicle.

For the sake of clarity, the operation of the pair of disc system shown in FIG. 18 will be described with the disc system providing a net impulse in the direction of arrow 400. Immediately prior to, or simultaneous to the above-described electronic disengagements of the acceleration systems used to accelerate the pairs of masses 874, the induction motor systems 870, on the inner and outer pairs of wheel systems 855, are electronically activated and electrically energized. At the same time, the electric motor systems 856,860 of the wheel systems 855,858 respectively, are electronically disengaged. Thereafter, the electric generator systems 856,860 are allowed to be operative, and the electric motor systems 856,860 respectively, are electronically activated and electrically energized in the reverse direction to the spin directions of the wheel systems 855,858, in order to accomplish and effect "braking" torque applications by the wheel systems 855, 858 with respect to the pairs of moving masses 874. These are accomplished in modes that precisely control the respective decelerations of the pairs of moving masses 874.

As the masses 874 move along the slots 873, the induction motor railguns 888 on the masses and the induction motor railguns 870 on the flywheels 855 are energized and interact. The interaction between the inner masses 874 in the pair of disc system shown in FIG. 19 and the flywheels 855 decelerates the masses 874 and causes the masses 854 to begin moving along the slots 853. In addition, the interaction imparts rotation of the flywheels 855.

Figure 20:
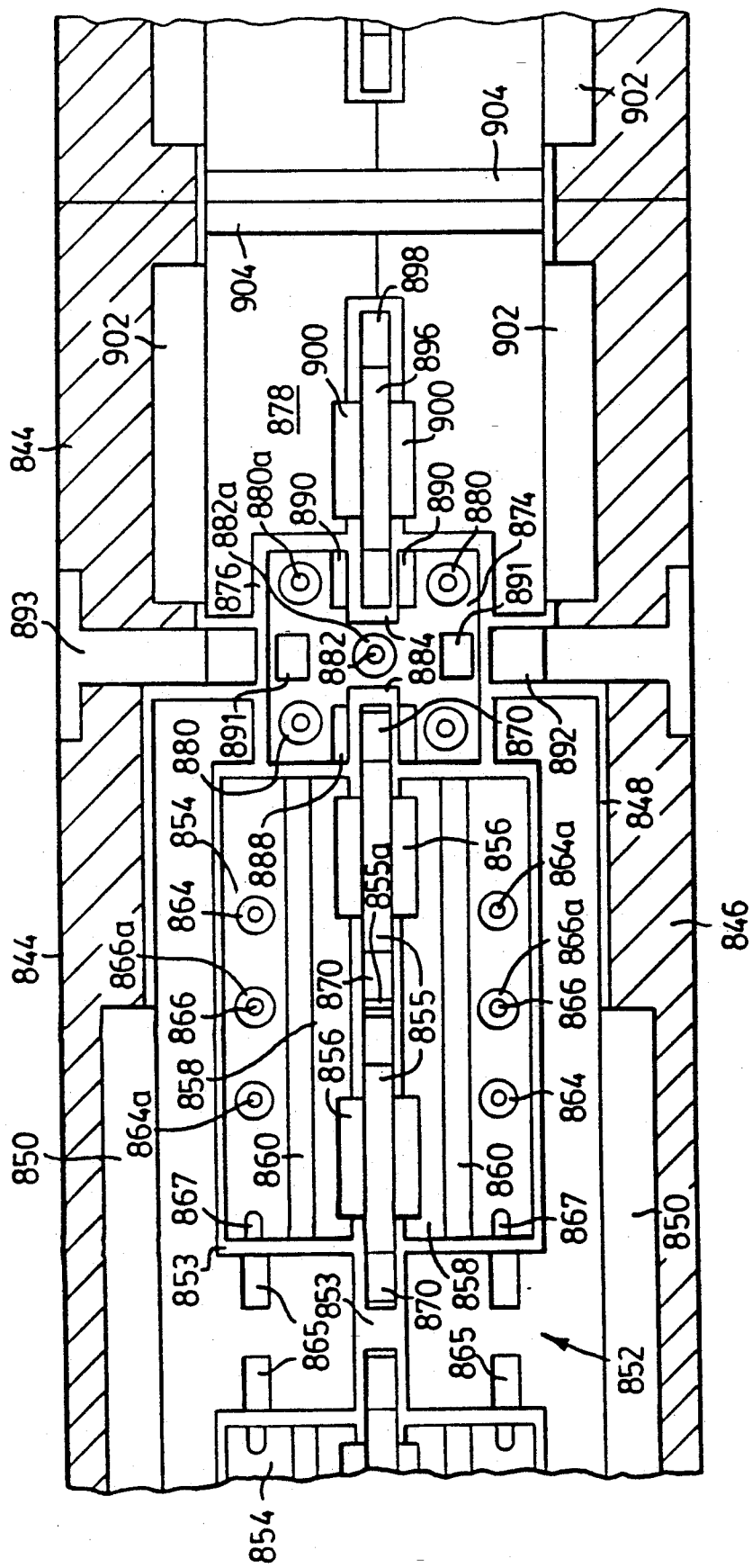
FIG. 20 is a section of a portion of the components shown in FIGS. 18 and 19 taken along line 20—20.
Figure 21:
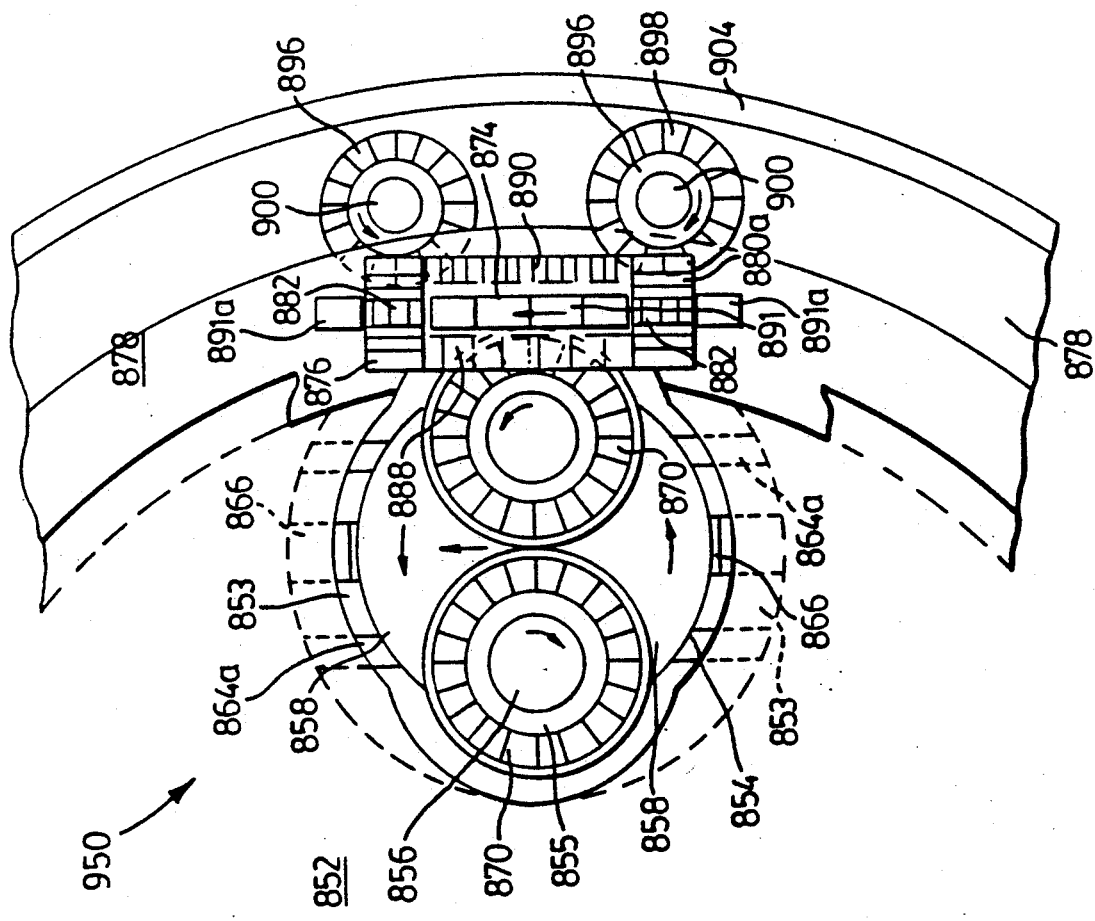
FIG. 21 is an enlarged top plan view of some of the components shown in FIG. 19.

It should be apparent to one of skill in the art, that, with reference to the multiple wheel absorption system, for example 855, 858 illustrated in the FIGS. 19 to 21 and similarly, elsewhere within the specification, that a ring gear may interconnect the two wheels 855 in order that they may both be caused to turn clockwise or counter-clockwise during their operation as a system, as may be desirable for a particular design.

In contrast, the outer pair of masses interact with the flywheels 855 on the masses 854 in a manner which inhibits rotation of the flywheels 855 but causes the masses to begin moving along the slots 853.

These above-described actions cause the pairs of masses 874 to be "braked" and decelerated by the repelling, electromagnetic fields of the respective, mutually interacting systems, to their respective, resultant, angular velocities (which are in design and in operation, equal to their respective, initial, angular velocities within the wheel systems 878). This occurs by the time they have reached their mutual positions at the opposite ends of their respective slots 876, where the mass systems 874 are electromagnetically, integrally latched to the wheel systems 878, by the coilgun systems 882,882a, until they are repositioned.

The inner set of wheel systems 855,858, which allow rotation to occur, absorb a significant portion of the momenta of the incoming masses 874, and transmute this particular portion of momenta into an increase in, or a change (a delta), of the total, absolute quantity of rotational motion and angular momentum of the pairs of wheel systems 855,858. Therefore, only a portion of the initial, angular momenta of the incoming masses 874 is converted into the respective, resultant, angular accelerations (with respect to the axes of the wheel systems 852) of the centers of mass of the bodies 854 (upon and within which the pairs of wheel systems 855,858 are mounted). Accordingly, the resultant quantity of the increased motion or angular momenta of the centers of mass of the inner pair of bodies 854 (with respect to the axes of the wheel systems 852) is less than the net, resultant delta in the motion and angular momenta of the corresponding pair of masses 874 (with respect to the axes of the wheel systems 878), after the respective, mutual interactions between the mass systems 874 and their particular, corresponding wheel systems 855, 858.

However, the outer set of wheel systems 855, 858, which do not allow rotation to occur (due to the strong, reverse torques applied by the electric motor systems 856,860 to the incoming pair of masses 874, during the respective interactions), are allowed to convert approximately 100% of the net, resultant delta in the motion and angular momenta of the outer pair of masses 874, into angular accelerations of the mass centers of the corresponding, outer pair of masses 854 (with respect to their axes of rotation, the axes of the wheel systems 852). Therefore, the resultant, angular motion and angular momenta of the mass centers of these outer mass systems 854, is greater than the resultant, angular motion and angular momenta of the mass centers of the inner pair of mass systems 854, wherein their particular wheel systems 855,858 allowed rotation to occur. Accordingly, this particular impulse drive 768 allows for a completely linear transmission of momentum from the outer pair of masses 874 by applying strong, reverse torques to the outer pair of wheel systems 855, 858 via the electric motor-generator systems 856, 860 respectively, and partial transmissions to rotational motion and momentum and to linear motion and momentum by applying lesser, reverse braking torques to the inner pair of wheel systems 855, 858.

At the instants of time when the inner and outer pairs of masses 874 have been respectively "braked" angularly or angularly decelerated in the manners above-described, which is at the time they arrive, adjacent the ends of their respective slots 876, all of the systems activated to accomplish the two modes of the interactions described above are automatically, electronically disengaged and electrically deactivated. Simultaneously thereto, the coilgun systems 866,866a are respectively energized to brake angularly and decelerate the pairs of mass systems 854 to their mutually equal, initial angular velocities (those prior to their respective, particular interactions and thus, different time rates of their center of mass, angular accelerations, respectively) by the time the pairs of mass systems 854 have arrived at the ends of their respective slots 853. As a greater impulse is applied to "brake" the outer set of mass systems 854, with the greater quantity of center of mass, angular momenta, in relation to the axes of the wheel systems 852, and resultant after their respective interactions, than is respectively applied to "brake" the inner set of mass systems 854, having the lesser quantity of center of mass, angular momenta, with respect to the axes of the wheel systems 852 and resultant after their respective interactions, there occurs a net, resultant impulse which is generated to the vehicle via the support frame and impulse generators through the center of mass of the combined system in the direction of the arrow 4000, illustrated in the FIG. 19 which is transferred to the vehicle.

Although only a pair of disc systems has been described, it should be apparent to those of skill in the art that when a system having four disc systems 840 as shown in FIG. 17 is used, the sequence of interactions for each pair are reversed. In other words, in one pair of disc systems, one of the inner or outer masses 854 absorb kinetic energy and momentum through rotational motion of flywheels 855 while in the other pair the opposite masses 854 perform this function. This ensures that both pairs of disc systems generate an impulse in the same direction.

Kinetic energy is converted to electrical energy during the interactions, by the respective, rotational, electric generator systems 856,860 of the inner set of wheel systems 855,858, and by the induction motor electric generator systems of the coilgun systems 866,866a. This electrical energy is reapplied to the wheel systems 840, or stored within the electrical batteries (not shown) used to energize the components in the system. As should be apparent, all of these actions and interactions, with respect to all of the wheel systems 840, are computer programmed to occur concurrently, over the same intervals of time. As the wheel systems 878,852 and the inner wheel systems 855,858 continue to revolve, their respective, individual r.p.m. is adjusted to once again equal their respective, individual r.p.m. immediately prior to the interactions. These adjustments are internally accomplished as pure couples and accordingly do not produce any anomalous torques on the wheel systems 840. When the wheel systems 878,852 have respectively accomplished approximately one quarter of their journeys, the coilgun systems 866,866a and 882,882a are energized to reposition the inner and outer sets of pairs of mass systems, 854,874 respectively, to their original positions within the slots 853,876, so that the next interactions can take place. This repositioning creates two, equal, yet oppositely directed, lateral impulses through the wheel systems 840, which sum to zero, and have no net effect on the frame or the vehicle. The two modes of the interactions, and the repositioning of the pairs of mass systems 854,874 described herein, preferably occur within approximately 0.5 to 4 degrees to either side of the positions shown and indicated by the arrows 2000 and 400 respectively, in FIG. 19.

To accomplish the reverse mode of operation of the wheel systems 840, that is, in order to decelerate the center of mass of the wheel systems 840 (and the vehicle), the order of engagements of the pairs of mass systems 854,874, illustrated in FIG. 19, are reversed so that the interactions of inner pairs of masses, herein described, now occur in the positions of the outer pairs of masses, and so that the interactions of the outer pairs of masses now occur in the positions of the inner pairs of masses. Accordingly, reverse thrust is accomplished.

With reference to FIGS. 17 to 21, the individual, impulse systems 950 have four, primary engagement positions wherein the masses 874 are accelerated and permitted to interact with the masses 854, namely positions 1040, 1042, 1044, and 1046, as illustrated in FIG. 17, although the individual systems 950 can be programmed to engage at any positions along the rings 893, as will be described. Combining these, respectively, with a 45 degree turn of the inner wheel 768, yields directional change capability in any of 360 degrees, radially, with respect to the plane of the wheel systems 766 and 768. Either of systems 950 with respect to the rings 893, or systems 766 and 768 may be individually employed, or employed in the various combinations thereof, to accomplish this 360 degree, directional change capability, as described above. Further, combining the 360 degree, directional change capability of the inner wheel system 768 with respect to the outer wheel-ring system 766, and the 360 degree, directional change capability of the outer wheel-ring system 766 with respect to the inner ring-wheel casing and system 764, yields an individual, impulse generator 730 in the configuration and appearance of gimbals, with 360 degree spherical, directional change capabilities. To one of skill in the art, it should be apparent that, in designs and within operational systems and vehicles, variations and modifications of the swivel systems and gimbals described herein, can also be employed, e.g., to absorb any anomalous gyroscopic torque, without departing from the scope of this specification.

To one of skill in the art, it should be apparent that, although two pairs of mass systems 874,854 are included within each wheel system 840, as illustrated in FIG. 19, any number of corresponding sets of pairs of mass systems 874,854 can be included within each operational wheel system 840. It should also become apparent that the wheel systems 840 are very similar to the impulse drives illustrated in FIGS. 3 to 8, and in FIG. 12, and that the basic, two different modes, of the interactions described within the specification, can be designed to occur within any frame or vehicle configuration. The very high r.p.m capabilities and thrust capacities, and the repetitive natures or modes of the net impulse, center of mass applications, enable the impulse drive 702 to accelerate the vehicle to any desired and chosen velocities.

Figure 22:
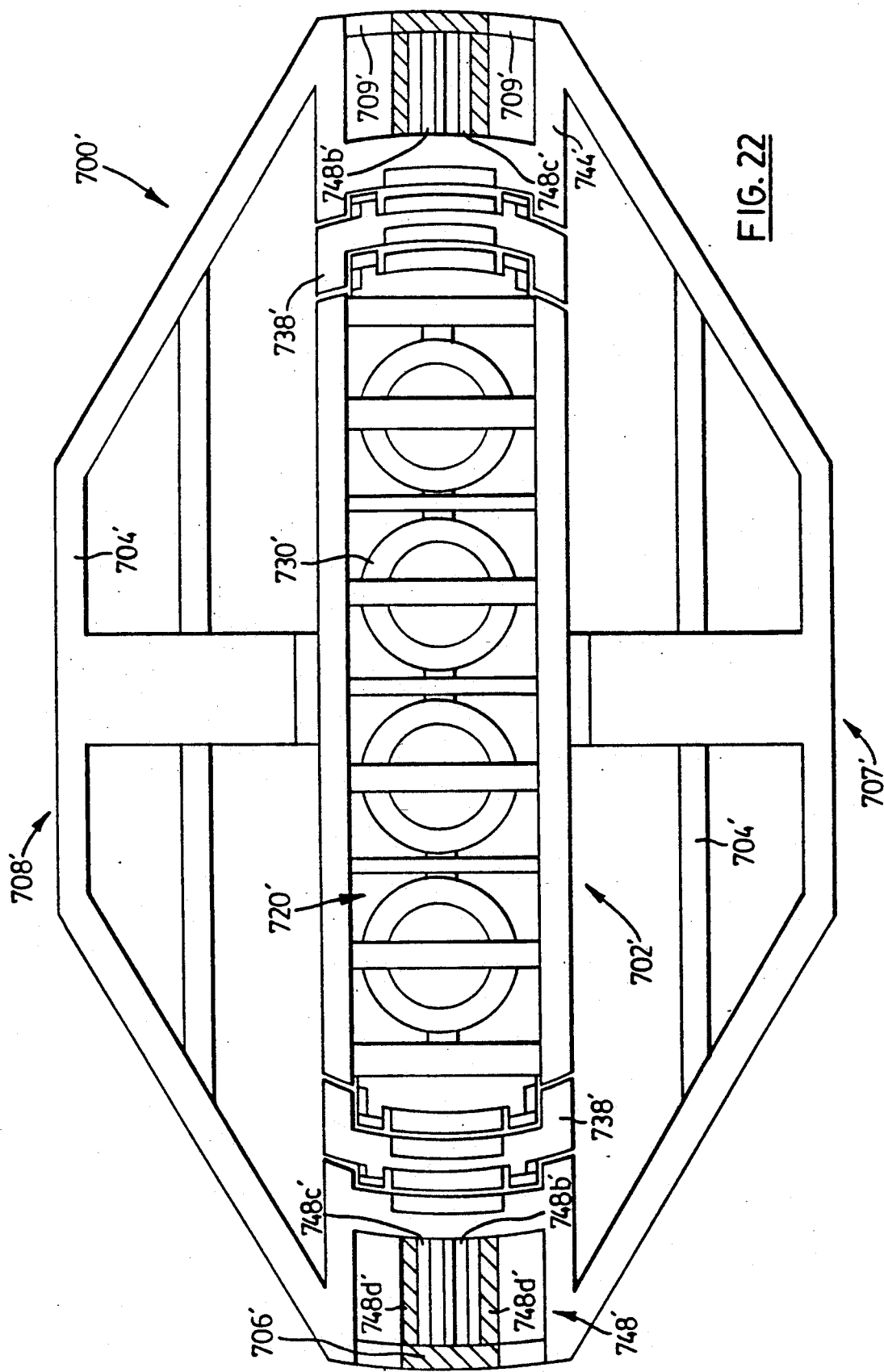
FIG. 22 is a side view in section of another embodiment of a portion of the vehicles shown in FIG. 13.

The vehicle 700', illustrated in FIG. 22, shows an alternative design for the gyroscopic stabilizer 748, illustrated in FIG. 13. In this embodiment, the gyroscopic stabilizer 748' is also located within the motor housing 744' although it should be apparent that it may be configured, with respect to its functions and modes of operation, in any suitable location. The gyroscopic stabilizer 748' includes upper and lower, rotational induction motors 748b', which are preferably of equal, total mass and rotational inertias. Each one of the upper and lower, rotational LIM systems 748b' surrounds a thrust-radial bearing 748c', which itself surrounds a frame member 748d', and accordingly, either one of the LIM systems 748b' can be located in the upper and lower positions within the motor housing 744'. Portholes 709' are located around the circumference of the vehicle 700', above and below the annular, side wall 706' of the vehicle 700', which interconnect the upper and lower, frame members 748d' to form the enclosure for the gyroscopic stabilizer 748'.

In the operation of the gyroscopic stabilizer 748', the rotational induction motor systems 748b' are respectively, electronically activated and electrically energized to equal extents, thereby causing the induction motor systems 748b' to accelerate rotationally, by repelling, electromagnetic fields, one in the opposite direction to the other, to equal, yet oppositely directed extents of rotational motion or angular momenta. There is no net torque provided to or resultant upon the vehicle 700' by the use of the gyroscopic stabilizer 748', which helps maintain the vehicle 700' within its plane of operation. Similar yet oppositely directed modes of operation are automatically caused to occur, sequentially in reverse order, when electronically disengaging these systems.

Figure 23:
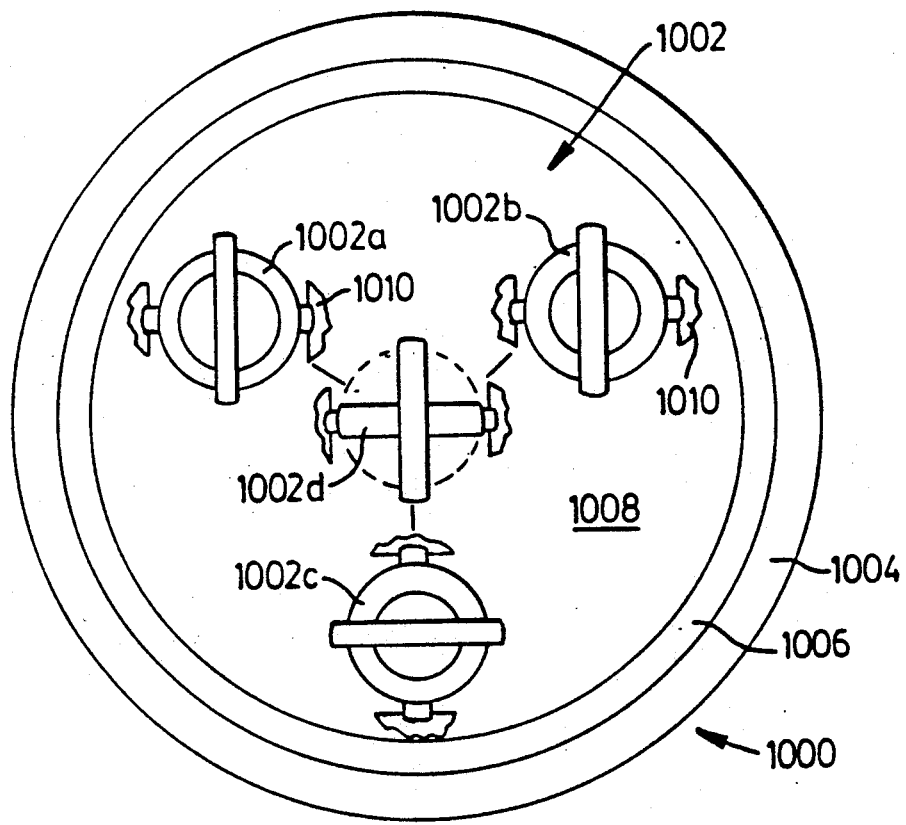
FIG. 23 is a top plan view of another vehicle embodying an alternative arrangement of the impulse drive shown in FIGS. 13 to 21.

FIG. 23 shows an alternative vehicle 1000, embodying four impulse generators 1002, identical to those shown in the previous embodiment. In this embodiment, the vehicle 1000 is disc-shaped and includes an outer ring 1004, an intermediate ring 1006, and an inner wheel 1008, which communicate via rotational induction motors so that the wheel and rings can be positioned as desired. In addition, the wheel and rings act as swivels so that rotation of inner wheel 1008 causes rotation of the intermediate ring or wheel 1006, thereby removing any net torque from being placed on the vehicle, as desired.

The inner walls and framework 1010, mounted within the wheel 1008, support four impulse generators 1002, three 1002a, 1002b and 1002c of which are arranged to generate thrust in a direction lying in the plane of the drawing. The fourth impulse generator 1002d is arranged to generate thrust in a direction normal to the plane of the drawings. The three impulse generators 1002a to 1002c, are respectively mounted to the inner wheel 1008 via systems of gimbals, as described in FIG. 17 of the previous embodiment, and are positioned so that the geometric centers of the three generators 1002a to 1002c define the corners of an equilateral triangle. The geometric center of the equilateral triangle locates the center of mass of the vehicle, which defines and locates the center of mass, and geometric center of the fourth impulse generator 1002d.

In operation, each impulse generator 1002 is operable to provide thrust to the vehicle in the manner previously described. However, two of the impulse generators, 1002a and 1002b, operate to provide thrust in the same direction while the third impulse generator, 1002c, acts a rudder and applies impulses to the vehicle to steer it. The impulse generator 1002d, provided in the center, functions to provide impulses to the vehicle in a direction normal to the impulses provided by impulse generators 1002a and 1002b.

With the vehicles 700, 700', illustrated respectively in FIGS. 13 and 22, there are numerous other combinations of the thrust vectors which can be generated by the individual, impulse generators 1002, to provide the instantaneous, net thrust vectors producing the "linear" or curvilinear, directional capabilities of the vehicle 1000. To rotate the chassis or hull of the vehicle 1000, the rotational induction motor system of the chassis or hull, defined by the inner, circumferential surface of the outer ring-wheel system 1004, and the corresponding, adjacent, rotational induction motor system, along the outer circumference of the ring-wheel system 1006, can be respectively electronically activated via computer programmed and assisted, steering and control systems, and electrically energized. This causes the ring-wheel systems 1004, 1006 respectively, to accelerate rotationally by repelling, electromagnetic fields, one ring-wheel system in the opposite direction to the other ring-wheel system, to equal yet oppositely directed extents of rotational motion or angular momenta, and then, in similar modes, to decelerate rotationally an orient the chassis as desired.

Similar modes of operation can be caused to occur for the simultaneous change of location or position of the chassis, along with directional change of the vehicle 1000, in which all, three, ring-wheel and wheel systems, 1004, 1006, and 1008, respectively, mutually interact. Accordantly, with reference to FIGS. 13 and 22, and to the vehicle 700, 700', the respective, adjacent, rotational induction motor systems of the chassis or vehicle hull 704, 704', the intermediate frame 738, 738', and the support frame 720, 720' mutually interact, as described above, to facilitate both the repositioning of the flight-deck, and directional change. The impulse generators 730, 730', (which may also be configured accordantly so that their geometric and mass centers define an equilateral rectangle), and/or other internal, auxiliary, impulse generator systems (not shown), are employed for desired and chosen, rotational adjustments within the numerous, other planes intersecting the geometric and mass centers of the vehicles 700, 700', to accomplish the numerous motions of the infinite motion capabilities of each, individual vehicle 700, 700', in its operation.

Figure 24:
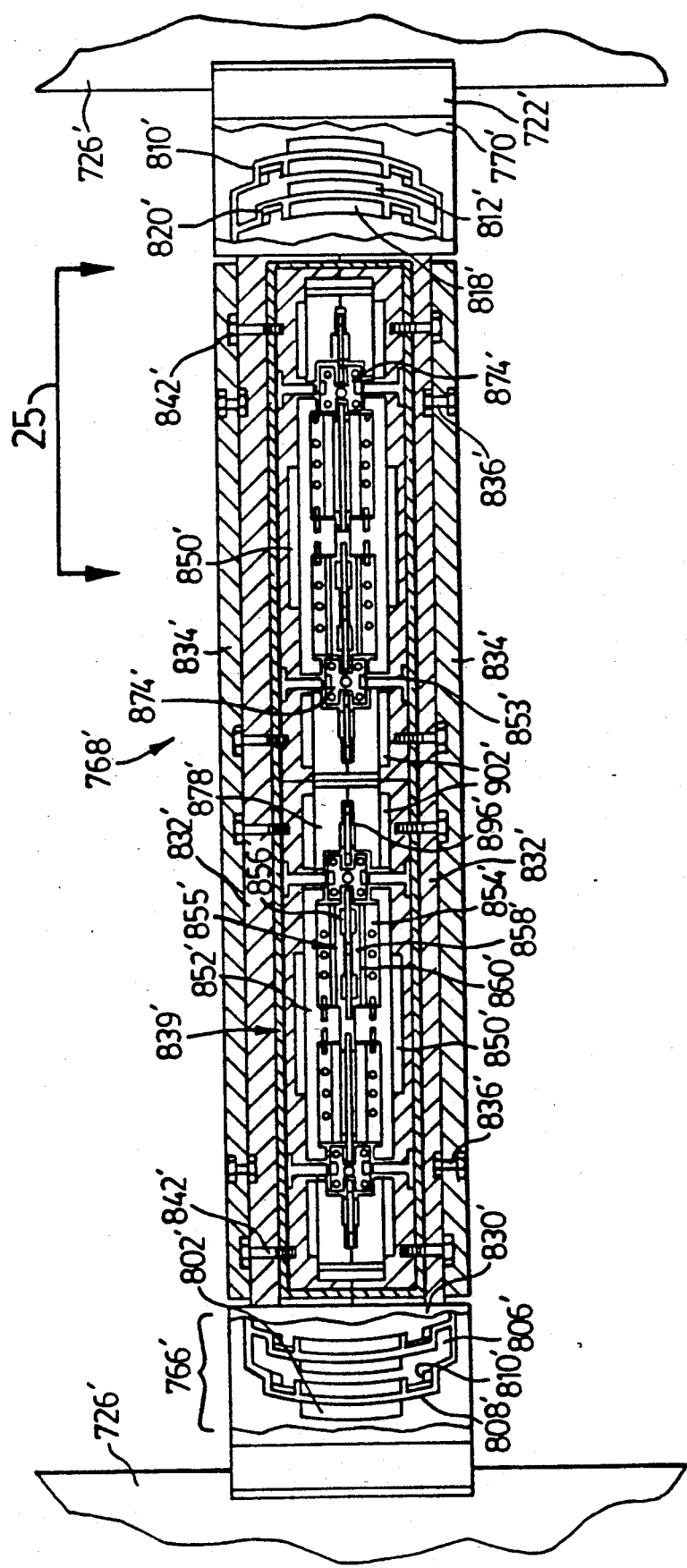
FIG. 24 is a section of another embodiment of an impulse drive similar to that shown in FIG. 18.
Figure 25:
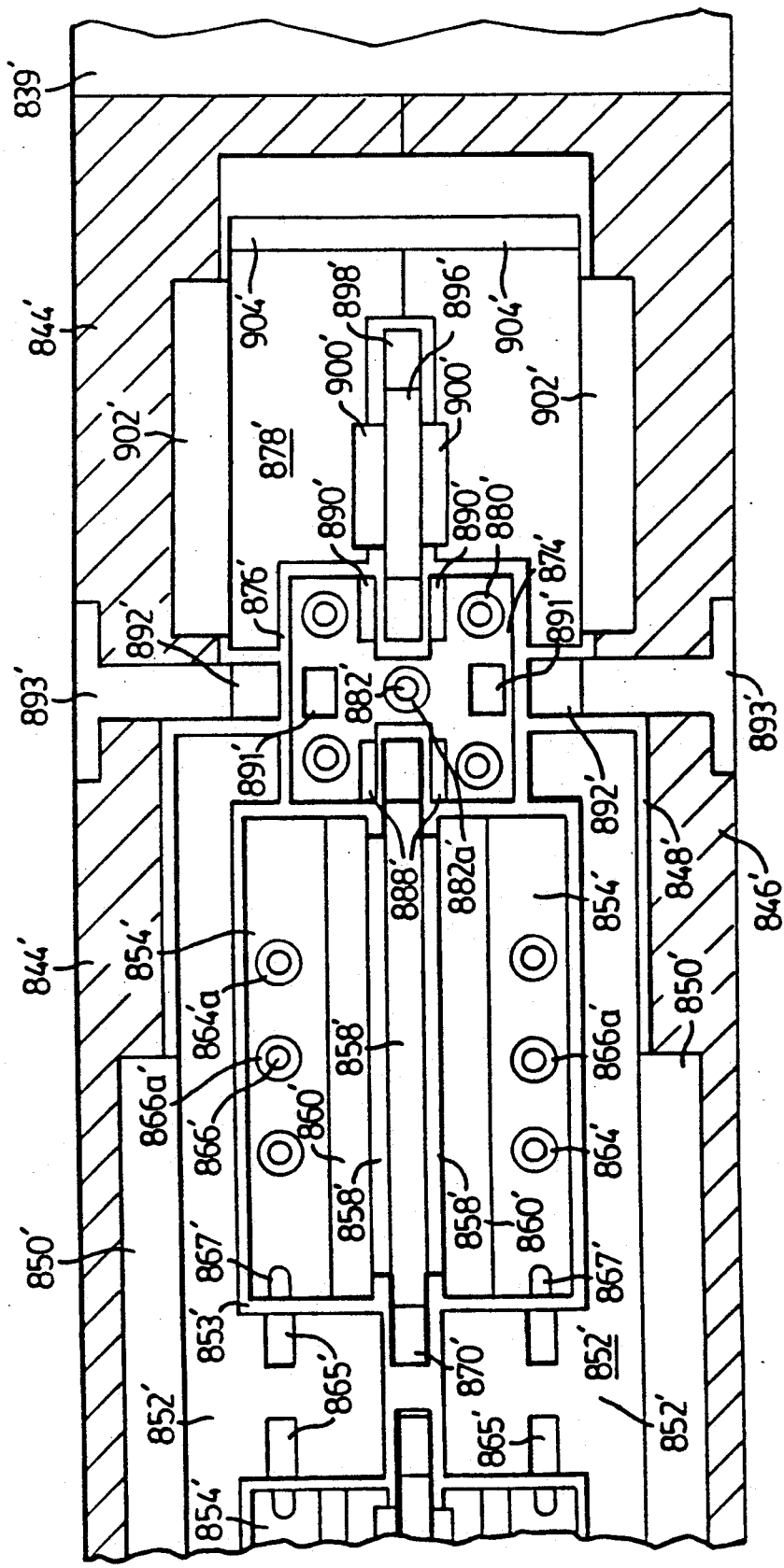
FIG. 25 is an enlarged section of a portion of the impulse drive shown in FIGS. 24 and 26 taken along line 25—25.

Referring now to FIGS. 24 to 26, still yet another embodiment of an impulse generator is shown. This embodiment is similar to the embodiment illustrated in FIGS. 13 to 19, and thus in this embodiment, like reference numerals will be used to indicate like components with a "'" added for clarity. In this embodiment, the impulse generator 768' is virtually identical to the impulse generator 768 illustrated in FIG. 18, with two exceptions. Rather than providing a pair of flywheel systems 855' on both masses 854' (which are of equal, total mass to one another) as in the previous embodiment, only one of the masses 854' includes this particular wheel system, 855', 858'. The other mass 854' supports a single flywheel system 858'. This permits the amount of center-of-mass, angular momentum of the bodies 874' respectively, absorbed and transmuted into a change in the absolute quantity of angular momentum or spin of the flywheel systems 855', 858', or 858' respectively, to be varied accordingly. That is, the wheel systems 855', 858' with the multiple wheel absorption systems are designed to provide the greater extent of absorption and transmutation of center of mass, angular momentum (e.g., approximately 20%), as compared with the wheel systems 858' with the single wheel absorption system (e.g., approximately 10%).

It should be appreciated that the impulse generator 768' operates in a manner similarly identical to the impulse generator 768, to apply repetitively, net impulses (which are continuously derived from achieving a differential in rotational inertias between the flywheel systems, and therefore, a difference or delta in the quantity of momenta respectively absorbed by the wheel systems 855', 858', and 858', of the two mass systems 854', in conjunction with the according deltas in the resultant, center-of-mass, angular momenta of the mass systems 854', respectively, repetitively achieved) in a desired direction to the vehicle. It should be apparent, as well, that there occurs continuously, within the system 768', as configured and illustrated, one combined interaction per revolution of the pairs of wheel systems 878', 852' (or one "i.p.r.", impulse, or impulses per revolution), between each pair of mass systems 874' with their respective, corresponding mass systems 854', and that at the very high r.p.m. of the wheel systems 878', 852', the time rate of impulses per minute (i.p.m.) is very high.

The impulse generator 768', as with the impulse drive system 768 illustrated in FIG. 19, can be conditioned to latch the mass systems 854' integrally to the respective wheel systems 852', with the solenoid latches 865' and 867', during the operation of the system 768' or when it is not in use. Also, the wheel system 768', as with the wheel system 768 illustrated in FIG. 19, can also be conditioned to engage the respective wheel and mass systems 854', in an opposite order and mode of operation, or interchanging. That is, with respect to every revolution of the wheel systems 852', 874', first the masses 854' are respectively, angularly accelerated on the wheel systems 852' to unequal extents and to unequal, intermediate angular momenta, thereby yielding a net impulse to the combined center of mass and vehicle chassis through this process.

The masses 854' are then respectively "braked" and angularly decelerated by the respective mass systems 874' on the wheel systems 878', thereby accomplishing the two, different modes of the respective interactions such that the resultant angular velocities of the masses 854', 874' respectively, are equal and consistent with the angular velocity or velocities of the wheel systems 852', 878'. In designs, and in the computer programmes electronically assisting the operation of the wheel systems described herein, any required synchronization of the angular velocities of the wheel systems 852', 878', e.g., during the time intervals between the respective sets of the two, distinctly different interactions, is also taken into account. To one of skill in the art, it should also be apparent that any number of corresponding pairs of wheel and mass systems 854', 874' can be symmetrically mounted and repetitively function within the pairs of wheel systems 874', 852', respectively.

Referring now to FIGS. 27a and 27b, two different interactions between a pair of cart bodies 1024 and 1022 are shown. In FIG. 27a, each cart body 1024, 1022 is movable along a separate circular track, 1028, 1026 respectively, the two tracks of which are concentric. The cart body 1022 supports a rotatable flywheel system 1023 and includes two pairs of counterpoised, diametrically positioned magnets 1030 and 1032 thereon, which statically and dynamically balance the cart body 1022, and the flywheel system 1023. The magnets 1032 extend from the flywheel system 1023 so that they may overlie the inner track 1028. In this manner, the magnets 1032 are permitted to interact, in either direction, with magnets 1034 located on opposite ends of the cart body 1024, through mutually repelling, magnetic fields. The other pair of magnets 1023 are positioned so that they extend from the cart body 1022 over the outer track 1026.

In FIG. 27b, both cart bodies 1024, 1022 are movable along the track 1026. The magnet 1034 on the cart body 1024, in this case, interacts with one of the magnets 1030 on the cart body 1022. It should be apparent that the interaction between the magnet 1034 and the magnet 1032 in the embodiment shown in FIG. 27a, as the cart body 1024 moves along the track 1028 and approaches cart body 1022, causes the cart body 1022 to begin center-of-mass, angular movement along the track 1026 while also imparting rotation of the flywheel system 1023. In contrast, with reference to FIG. 27b, the interaction between the magnet 1034 and the magnet 1030, as the cart body 1024 moves along the track 1026 and approaches cart body 1022, causes the cart body 1022 to begin center-of-mass, angular movement along the track 1026 without imparting rotation of the flywheel system 1023. Accordingly, during the interaction illustrated in FIG. 27a, a portion of the initial, center of mass, angular momentum of the first cart body 1024 (with respect to its axis of rotation, i.e., the geometric center of the concentric tracks 1026, 1028), is transmuted into a change or a delta in the "absolute" quantity of the spin and the angular momentum of the flywheel system 1023, i.e., regardless of in which direction the interaction takes place, and regardless of in which direction is the resulting spin and angular momentum of the flywheel system 1023. The remaining portion of the initial, center-of-mass, angular momentum of the first cart body 1024, is converted to the resultant, center of mass, angular momentum of the second cart body 1022.

This is in contrast with the interaction illustrated in FIG. 27b, wherein the complete portion of the initial, center of mass, angular momentum of the first cart body 1024, is converted to the resultant, center of mass, angular momentum of the second cart body 1022. During and as a result of each particular interaction, the first cart body 1024 is "braked" and decelerated to a state of complete rest, i.e., it is without resulting, center of mass, angular motion, or it is braked and decelerated by equal extents in the interactions respectively illustrated in FIGS. 27a,27b, and 28a,28b. Concordantly, the resulting, center-of-mass, angular momentum of the second cart bodies 1022,1022a respectively, is greater when derived from the direct interactions, than for the interactions involving rotational absorption and transmutation of a portion of the initial, center-of-mass, angular momentum of the first cart bodies 1024,1024a respectively.

Referring now to FIGS. 28a and 28b, another embodiment of the interactions illustrated in FIG. 27 is shown. In this embodiment like reference numerals will be used to indicate like components with an "a" added for clarity. As can be seen, this embodiment is very similar to that shown in FIG. 27 except that the cart body 1024a is mounted on one end of an arm 1038. The other end of the arm is rotatable about an axis positioned at the center 0 of the tracks. During the interactions between the cart body 1024a and cart body 1022a, it should be apparent that in the embodiment shown in FIG. 28a, the interaction between the magnet 1034a and the magnet 1032a causes movement of the body 1022a along the track 1026a, and imparts rotation of the flywheel system 1023a. In contrast, in the embodiment shown in FIG. 28b, the interaction between the bodies 1024a and 1022a cause the body to move along the track 1026a, without imparting rotation of the flywheel system 1023a. In addition to the above, during the interactions between the cart bodies 1024a and 1022a, the first cart bodies 1024a decelerate by equal quantities respectively, through equal, total impulse applications. This occurs due to the inertial resistance to rotation of the flywheel system 1023a and the inertial resistance of the mass of the second cart body 1022a, in the interaction illustrated in FIG. 28a, and completely due to the inertial resistance of the mass of the second cart body 1022a, in the interaction illustrated in FIG. 28b. The respective, equal decelerations of the first cart bodies 1024a create two, equal, resultant impulses in reaction, $J_R$ respectively, applied at and along each axis 0 during the above-described interactions, as illustrated in FIGS. 28.

Figure 29A:
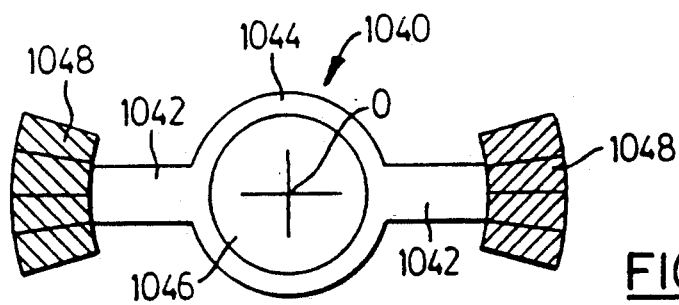
FIGS. 29a to 29c show plan views of additional embodiments of components of impulse drives in the forms of wheels or rings, based on the systems shown in FIGS. 28a and 28b.

Referring now to FIG. 29a, a wheel system 1040 for use in an impulse generator is shown. This wheel system design is based on the interactions shown in FIGS. 28a, 28b and functions as a pair of first cart bodies similar to the cart bodies 1024 shown in FIGS. 27 and 28. In this illustration, the wheel system 1040 includes a pair of arms 1042, which extend radially outwards in opposite directions from a circular body 1044. A disc motor 1046 is mounted to each face of the circular body 1044, and although only one motor is shown, two are operable to rotate the body 1044 and arms 1042 about an axis of rotation 0. A magnetic system 1048, comprised of permanent magnets or a rotational induction motor system, is located at the end of each arm 1042 and defines a moving mass system which is capable of interacting with another mass system to permit impulses to be generated at the axis 0.

As occurs during the interactions illustrated in FIGS. 28, a reaction impulse is applied at the axis 0 in a direction opposite to the direction of the impulse applied by the rim section 1048 to another body. Also, both sides or rim section 1048 can be simultaneously used as wheel systems or first bodies 1040, for interactions which occur at equal radii r and concurrently, through equal intervals of time. The equal reaction impulses in this case, applied simultaneously in opposite directions, will sum to zero, and cause no net effect on or change in motion of the axis itself. Yet, as will be described with reference to FIGS. 33, if one of the sections 1048 applies impulses greater in magnitude to another body than does the other section 1048, the net portion of the two, oppositely directed, reaction impulses, applied at the axis of the wheel system 1040, will cause a change in the state of center of mass motion of the wheel system itself at the axis 0. That is, this resultant differential or net impulse will cause an acceleration of the center of mass of the system 1040.

Figure 29B:
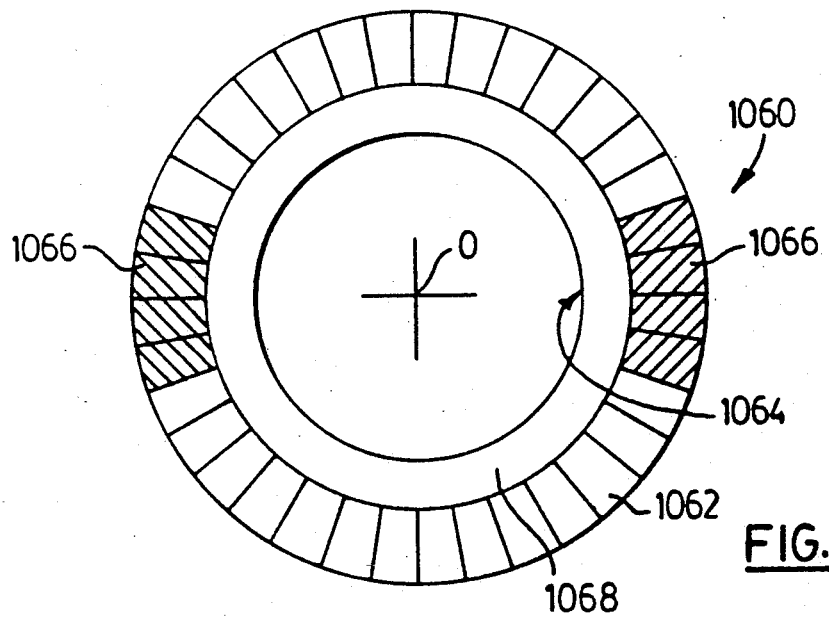

FIG. 29b shows another wheel system 1060, forming a component of an impulse generator, which includes a rotational induction motor system in the form of a ring 1062, and illustrates two, electromagnetically energized, rim sections 1066 on this ring. An inner wheel 1064 is also provided which supports the ring. Ring electric motor-generator systems 1068, configured in the forms of rings, are mounted on opposite faces of the wheel 1064 (although only one is shown), to permit the wheel to rotated about the axis 0. By energizing diametrically positioned sections of the induction motor ring 1062, these sections can be used to interact with other bodies in a manner similar to those shown in FIGS. 27 and 28.

Figure 29C:
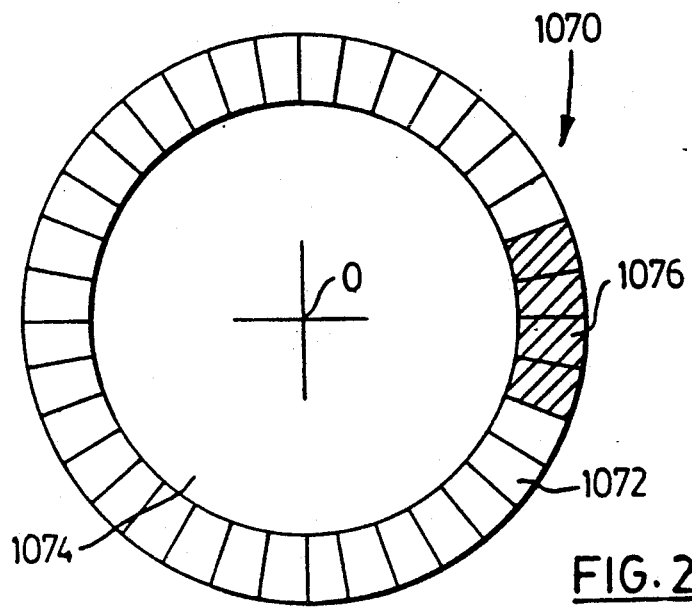

FIG. 29c shows still yet another wheel system 1070, forming a component of an impulse generator, wherein an induction motor system in the form of a ring 1072 is mounted on the upper and lower disc, electric motor-generators 1074 (only one of which is shown). The wheel system, 1070, functions in a similar mode to the wheel system 1040 in that the wheel system, 1070, can be electronically activated and electrically energized on any desired and chosen rim section, 1076. The wheel of the ring system 1070 is designed and created to act and function as an alternative to the "linear" interactions between the two or more bodies or mass systems, that are illustrated, for example, in FIGS. 3 to 8, and in FIG. 12. The wheel system 1070 functions as the first body or mass system in interactions of two or more bodies or mass systems; these interactions are very similar to the interaction illustrated in FIG. 8n, and will be further described in FIGS. 33.

Figure 30:
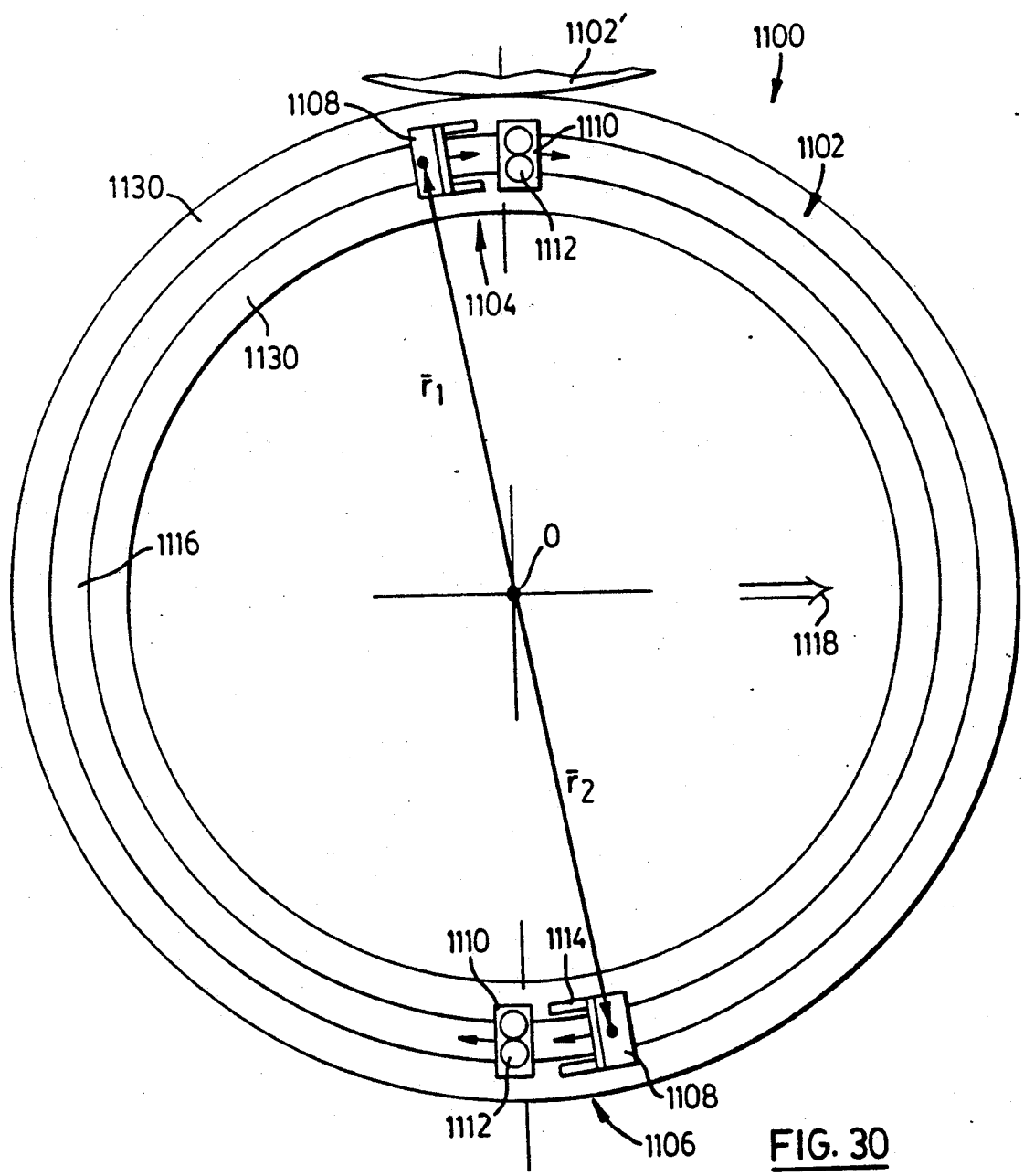
FIG. 30 is a top plan view of still yet another embodiment of an impulse drive.
Figure 31:
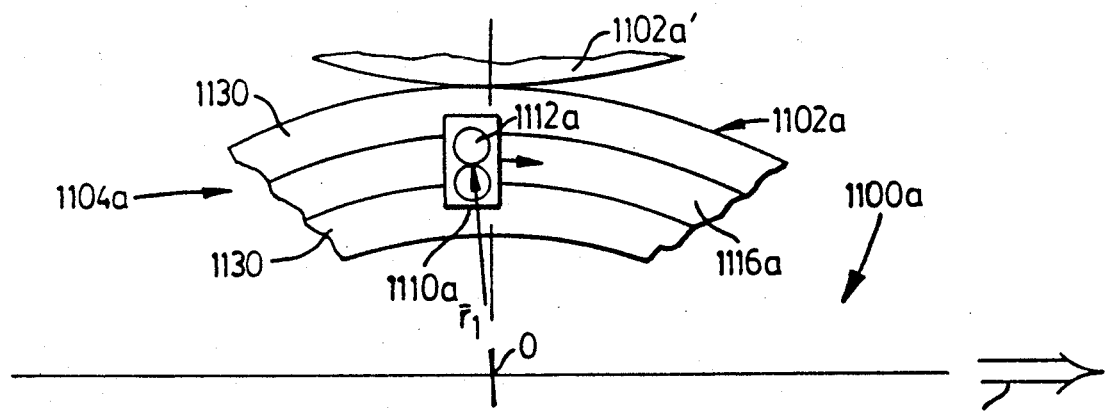
FIGS. 31 and 32 are top plan views of variations of a portion of the impulse drive shown in FIG. 30, similar to those variations illustrated in FIGS. 8a to 8k, and 8n.
Figure 32:
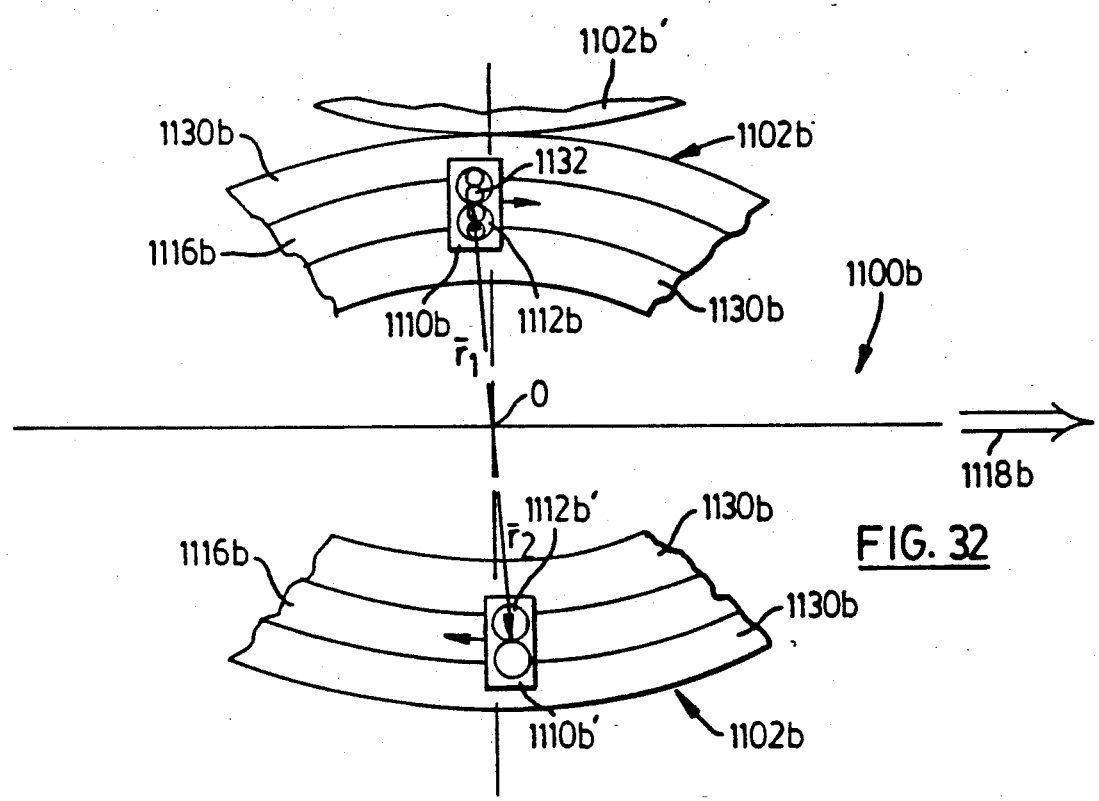

FIGS. 30 to 32 illustrate examples of impulse generators that are based on the interactions described and illustrated in FIGS. 8. These interactions and their various combinations, and the individual variations or modifications thereof, can be applied within any design or configuration of frame. In the system illustrated in FIG. 30, an impulse generator 1100 is shown. This generator 1100 includes a pair of annular wheels 1102 and 1102' only one, 1102, of which is fully shown. It should be realized that both wheels are identical so that the system 1100 is symmetrical about the intersection of the two wheels. Each wheel 1102 supports a pair of cart systems 1104, 1106 diametrically positioned at the periphery of the wheel. Each cart system includes a pair of carts 1108, and 1110. Similar to the embodiments illustrated in FIGS. 8, the carts 1108 include a pair of arms 1114. An induction motor system 1116 in the form of an annular ring is provided on the wheel 1102 and is operable to accelerate the cart bodies 1108, 1110 so that they move around the wheels about the axis 0. The wheels 1102, supporting the cart systems 1104 and 1106, are mounted on the frame of a vehicle (not shown) and can either rotate about their respective axes 0, or can be completely integral to the frame, so as not to be allowed to rotate.

The cart system 1104 represents the basic linear interaction between cart bodies 1108 and 1110, and the cart system 1106 represents the interaction of cart body 1108 at radii r on the rims of the wheels, 1112, of cart body 1110. In operation, cart bodies 1110 can be either moving, that is, rotating about the axis, 0, of each respective wheel system 1102, or can be initially at rest. Cart bodies 1108 are caused to rotate at a greater angular velocity about their respective axis, 0, than Cart bodies 1110. The interaction between the cart bodies 1108 and 1110 of system 1106 within the wheel is similar to the interaction described within the rectangular frame in FIG. 8f.

During operation, the rotational induction motor system, 1116, angularly accelerates the cart bodies 1108 and 1110 within the annular frame, 1102, to their respective positions as illustrated in FIG. 30. Cart bodies 1108 are accelerated angularly, respectively, to greater angular velocities about the axis, 0, than the cart bodies 1110, prior to their respective interactions at the positions indicated in the figure. During the interaction between the cart bodies of system 1106, a portion of the angular momentum (or of the linear momentum, with respect to the position vector $r_2$) of the cart body 1108, is converted and transmuted into spin of the wheels, 1112, on the cart body 1110. While this occurs, the cart bodies in system 1104 also interact. However, this particular interaction is such that no exchange of center-of-mass, angular momentum and kinetic energy between the bodies is directed to the flywheels 1112 and thus, the flywheels remain stationary. This of course results in cart body 1110 of system 1104 angularly accelerating along the frame at a greater, center-of-mass, angular velocity and angular momentum (with respect to the axis, 0) than the cart body 1110 of system 1106. During these interactions, the first cart bodies 1108 are braked or angularly decelerated to equal extents, so that the resultant, center of mass, angular momentum (with respect to the axis, 0) of the one cart body 1108 is equal to that of the other cart body 1108.

By now having the rotational induction motor system, 1116, "brake" a portion of this differential in angular momenta into the frame, that is, by braking or decelerating the cart body 1110, at the top in the illustration, an impulse is applied through the wheel system 1100 or through the axis, 0, to the center of mass of the system, in the direction of the arrow 1118. During the interactions, a portion of the differential, of the greater quantity of angular momentum of the cart body 1110 braked into the frame, serves to adjust the angular velocities of the cart bodies 1108, 1110 respectively, in order to maintain equal, angular accelerations, angular velocities, and angular momenta of each cart body 1110 with respect to its counterpart, and of each cart body 1108 with respect to its counterpart, during the time interval that the combined, net impulse is applied to the center of mass of the system and vehicle, through the individual, respective, wheel systems 1102,1102' of the wheel system 1100. This is to ensure that no centrifugal imbalances occur at any time in the operation of this system. Each combined, net impulse further accelerates the center of mass of this system in the direction of the arrow 1118, and comprises the sum or total of all the individual, net impulses derived from each wheel system 1102,1102', respectively. The net impulses applied through the system 1100 in turn are applied to the vehicle in which the system is mounted.

To one of skill in the art, it can be seen that the rotational induction motor systems 1116 and 1130 can be mounted on wheel systems which can be caused to revolve, either individually or both simultaneously, and either in the same or in opposite directions, and also that similar interactions as described above can be repetitively caused to occur, with each set of interactions resulting in a net impulse being repetitively applied to the center of mass, and causing the combined system to accelerate continuously. In addition, it should be understood and noted, with reference to FIGS. 8f, 8h, and 8b respectively, that whether the body 1108 is initially moving relative to the body 1110 which is initially at rest as in FIG. 8f, whether the body 1110 is initially moving relative to the body 1108 which is initially at rest as in FIG. 8h, or whether both bodies 1108, 1110 are moving, each one with respect to the other, as in FIG. 8b, the extent and the appearance of the motion of any one wheel system is relative to the extent of the apparent motion of any other one or more wheel systems.

To one of skill in the art, it can be seen that by adjusting the motion or the spin of the flywheels 1112, in either direction of spin, whether the flywheels 1112 are initially stationary or revolving, and depending as well upon the particular, relative, mutual, approach velocities of the bodies 1108, 1110 and considering the total time interval desired and chosen for the respective interaction, an equivalent quantity of the motion of the body 1108 can be converted to a change in the absolute spin of the flywheels 1112 of the body 1110. That is, accordingly, at the higher r.p.m. of the operation of the wheel system 1100, still only a portion of the initial motion and momentum of the center of mass of the body 1108 is converted, respectively, to a change in the center-of-mass motion and momentum of the body 1110, and therefore, the resultant, combined, center-of-mass motion and momentum of the bodies 1108, 1110 is always less after this particular mode of interaction. This understanding applies similarly, for all of the wheel systems described within the specification.

There are many design variations which respectively apply the fundamentals, of the two modes of the interactions described herein, to working systems, and a number of methods of operation of each design variation. In FIG. 31, like reference numerals will be used to indicate like components shown in FIG. 30 with an "a" added for clarity. As can be seen from this figure, the impulse generator 1100a similarly includes a pair of wheel systems 1102a and 1102a'. Each wheel system and induction motor section 1116a is rotatable about its center 0, and includes a pair of induction motor systems 1130, concentrically arranged, and integral to the frame 1102a, so as to be unable to rotate in this particular design variation. (In another design variation, the pair of induction motor systems 1130 are configured integrally to the wheel systems 1102a, which revolve in the opposite direction to the wheel and induction motor systems 1116a, yet serve to perform a similar function, in a similar mode operation, to the wheel system 1100a herein described.) The induction motor system 1116a is positioned respectively, between induction motor systems 1130. Diametrically located cart bodies 1110a, 1110a', of equal, total mass, are positioned on the wheel system 1102a and communicate with the rotational induction motor systems 1116a and 1130, as will be described. In operation, both bodies 1110a,1110a', are respectively accelerated by lower and upper (not shown) rotational induction motor systems 1116a (which can be either stationary or revolving within the frame or wheel system 1100a) to equal angular momenta (or to equal linear momenta at equal position vectors $r_1$ and $r_2$). Upon reaching their respective positions as illustrated in FIG. 31, body 1110a, within the wheel section 1104a, is braked or angularly decelerated by the upper (not shown) and lower pairs of rotational induction motor systems 1130 which are integral to the frame or wheel system 1102a. The braking of body 1110a, by the pair of induction motor systems 1130, is done in a similar manner to the method illustrated in FIG. 8g, by applying impulses to the rotational induction motor (not shown) on the rims of the wheels 1112a.

Simultaneously, body 1110a', within the wheel section 1106a is braked or angularly decelerated by upper (not shown) and lower pairs of rotational induction motors 1130, which apply impulses to induction motors (not shown) on the body or the framework of 1110a', wherein the wheels 1112a' are not caused to rotate. For equal, center-of-mass, angular decelerations of the bodies 1110a', 1110a respectively, as greater impulses are applied by the rotational induction motors 1130 to the rims of the wheels 1112a of body 1110a, which are caused to accelerate rotationally, than are applied to the body 1110a', with each body 1110a, 1110a', respectively interacting with and within the frame or the wheel system 1102a, a net impulse is applied to the combined center of mass causing the wheel system 1102a to accelerate in the direction of the arrow 1118a. This is so because, with equal impulses applied respectively to each of the bodies 1110a, 1110a', the body 1110a, within section 1104a, will decelerate at a shower rate than the body 1110a', within section 1106a, as part of the relative momentum of the frame 1102a, in relation to the relative, center-of-mass, angular momentum of the body 1110a (moving within the frame 1102a, and its motion is mutually relative to the "moving" frame 1102a), is converted to a change or delta in the "absolute spin" of the wheels of the wheel system 1112a on the body 1110a, within section 1104a. Thereby, less momentum is converted to a change in the center-of-mass, angular momentum (or the center-of-mass linear momentum at position vector $r_1$) of the body 1110a.

By therefore increasing the impulse applied by the frame or the wheel system 1102a via the rotational induction motor systems 1130, to the rims of the flywheels 1112a of the body 1110a, within the section 1104a, and accordingly, causing a greater quantity of the relative momentum of the frame or wheel system 1102a to be converted to a greater change in the "absolute spin" or in the total quantity of rotational motion and angular momentum of the 1112a (without regard to the vector directions of the respective spins considered), a greater quantity of the relative momentum of the frame or wheel system 1102a then causes a greater angular deceleration, and is converted to a greater change in the center-of-mass, angular momentum of the body 1110a. It is thereby that a net impulse is caused to be applied to the center-of-mass of the system. By appropriately regulating the respective braking impulses applied to the bodies 1110a, 1110a', equal, center-of-mass, angular velocities of the bodies 1110a, 1110a', relative to the axis or center 0, can be maintained at all instants during this braking process, as the axis itself accelerates due to the net impulse resultant upon the center of mass of this system.

FIG. 32 shows an impulse generator 1100b similar to those shown in FIGS. 30 and 31. In this embodiment like reference numerals will be used to indicate like components shown in FIG. 30 with a "b" added for clarity. In this embodiment, the braking methods of the bodies 1110b and 1110b', of equal, total mass, are similar to the systems illustrated and described in FIGS. 8g and 8h, although several of the methods described and illustrated in FIGS. 8 can be applied or adapted to achieve equal net results. As can be seen in this embodiment, body 1110b comprises a pair of flywheels 1112b rotatably mounted thereon. However, unlike the previous embodiments, each flywheel on the body 1110b supports an additional pair of flywheels 1132. Each set of flywheels 1132, 1112b is similar in configuration and function to the wheel systems 855, 858 illustrated in FIGS. 18 to 21. Body 1110b' is similar to the previous embodiments, is similar in configuration and function to the wheel system 858 illustrated in FIGS. 25, 26, and includes two individual single flywheel systems 1112b'. Accordingly, more of the initial motion and momentum of an interacting body or mass system can be converted or transmuted into absolute spin of the flywheel systems 1132 and 1112b of the body 1110b than can be converted or transmuted into absolute spin of the flywheel system 1112b' of the body 1110b', as the FIGS. 2h to 2q graphically illustrate. Also, body 1110b requires a greater initial quantity of motion and momentum of one other interacting body or mass system than does the body 1110b', to achieve equal, center-of-mass, angular accelerations and equal, resultant, angular momenta with respect to their mutual axis of rotation or the center of the wheel system, 0.

In operation of this impulse generator 1100b, each of the bodies 1110b, 1110b' illustrated, are caused to interact with, and be simultaneously angularly accelerated to equal extents by the upper (not shown) and lower rotational induction motor systems 1116b, which can be either stationary, i.e., integral to the frame of a vehicle, or revolving. At their respective positions, as illustrated, similarly to the method as described with reference to FIG. 31, upper (not shown) and lower rotational induction motor systems 1130b are electrically energized and interact with the respective, adjacent, rotational induction motor systems (not shown) on the flywheels 1132 and 1112b', on the bodies or mass systems 1110b and 1110b', respectively. Impulses are applied to the rims of the respective flywheel systems 1132', 1112b', and 1112b, and the relative momentum of the body or wheel systems 1102b, in relation to the bodies 1110b, 1110b', is partially converted or transmuted into a change in the absolute spin or absolute quantity of rotational motion and angular momentum of the respective flywheel systems 1132, 1112b, and 1112b', of the bodies 1110b, 1110b'.

If the body 1102b is in the form and mode of a revolving wheel, respective quantities of its angular momentum about its axis are converted, at the respective points of the interactions with the flywheel systems on the bodies 1110b, 1110b', from this body and mass or wheel system 1102b, to a change in the absolute spin of the respective flywheel systems 1132b, 1112b, and 1112b'. For equal, center-of-mass, angular decelerations or accelerations of the bodies 1110b, 1110b', a greater portion of the angular momentum of the body or revolving wheel 1102b is converted and transmuted into a change in the center-of-mass motion or angular momentum of the body 1110b about the axis or center 0, and accordingly converted and transmuted into a change in the absolute spin of the flywheel system 1132, 1112b on the body 1110b, than that quantity correspondingly for the flywheel system 1112b' and for the body 1110b'. Therefore, a greater reaction impulse is applied through the axis of the wheel system 1102b, in the direction opposite to the direction of the concurrent motion of the body 1110b, and combining the two simultaneous interactions, a resultant, net impulse is caused to occur which accelerates the center of mass of the wheel system 1100b in the direction of the arrow 1118b.

If the body and wheel system 1102b is integral to the frame and vehicle 1100b, so as not to be able to revolve, the vehicle as well functions as the body 1102b, and therefore, the vehicle and the rotational LIM systems 1130b are mutually integrated to form structurally one mass system 1102b, 1100b. Accordingly, a greater portion of the relative motion and momentum of the body or mass system 1102b, 1100b is applied as an impulse through an electromagnetic interaction with the flywheel systems 1132, 1112b of the body 1110b, than is correspondingly applied as an impulse through an electromagnetic interaction with the flywheel system 1112b' of the body 1110b', for equal, center-of-mass, angular accelerations or decelerations of the bodies 1110b, 1110b', relative to their mutual axis or center, 0, about which their respective, center-of-mass rotation occurs. This causes a resultant, net impulse to be applied through the center-of-mass of the combined system, which causes the combined center of mass and vehicle 1100b to accelerate in the direction of the arrow 1118b.

By designing the wheel system of the one body, 1110b, as a double or multiple absorption system (e.g. the wheel system 1132, 1112b, above-described), and the wheel system of the other body, 1110b', as a single absorption system (e.g. the wheel system 1112b', above-described) in order that a delta or differential in the rotational inertias between the two wheel systems (e.g. 1132, 1112b, and 1112b', respectively) is accomplished, two different, center-of-mass, angular accelerations of the bodies 1110b, 1110b', relative to their mutual axis 0, can be accomplished. These different, center-of-mass accelerations are derived from equal, initial quantities of motion and momentum input from the body or bodies 1102b, and as herein described. This method, therefore, is achieved by creating a delta or differential in the rotational inertias and momentum absorption, conversion, and transmutation characteristics of the respective flywheel systems 1132, 1112b, and 1112b', of the bodies 1110b and 1110b', which are themselves of equal total mass.

Although only one, complete, annular frame and wheel system is particularly described and illustrated in the FIGS. 30 to 32, it should be realized that all three systems illustrated in these Figures comprise two, individual, annular frames and wheel systems, e.g., 1102, 1102' respectively. The second annular frame or wheel system in each illustration is only partially shown and functions in operation as a mirror image of the wheel system that is illustrated. This is in order to achieve an application of the resultant sum of the individual, net impulses, derived from both of the wheels of the respective wheel systems, directly through the center-of-mass of a complete system and/or vehicle. This serves, as well, to nullify undesired torques which would otherwise result in an undesired rotation of the wheel system or vehicle.

To one of skill in the art, it should be recognized that the resultant, net impulse, respectively applied to the center of mass of the wheel systems illustrated in FIGS. 30, 31, and 32 respectively, can be directed oppositely to the particular arrow 1800 by reversing the positions of the interactions as illustrated and can be directed in any one direction radially, with respect to the axis of each, individual wheel system, thereby providing the 360 degree, directional change capabilities of each wheel of these particular impulse drive propulsion systems. Furthermore, it should be apparent that although two adjacent wheel systems are generally illustrated and described, it is preferable to employ the individual wheel systems in groups of four similar to the embodiments shown in FIGS. 13 to 22.

Figure 33A:
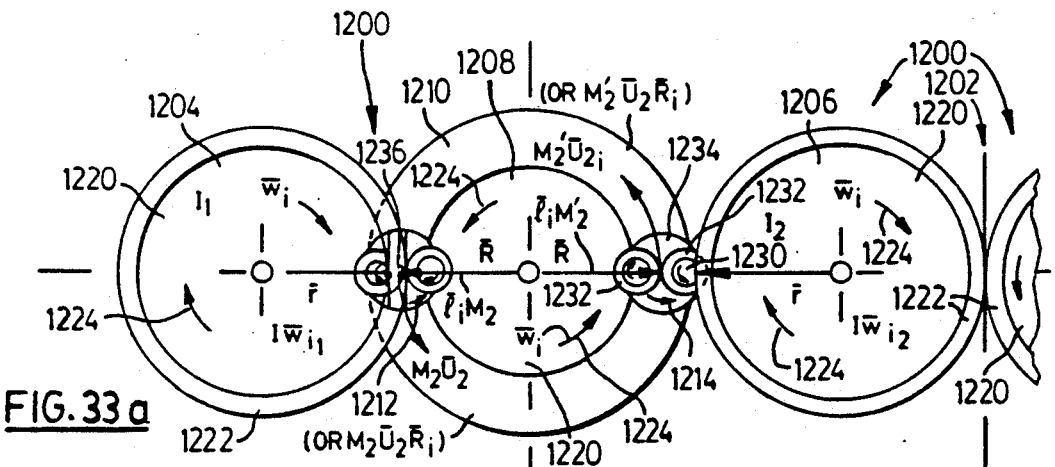
FIGS. 33a to 33c show top plan views of still yet another wheel system for use in an impulse drive.
Figure 33B:
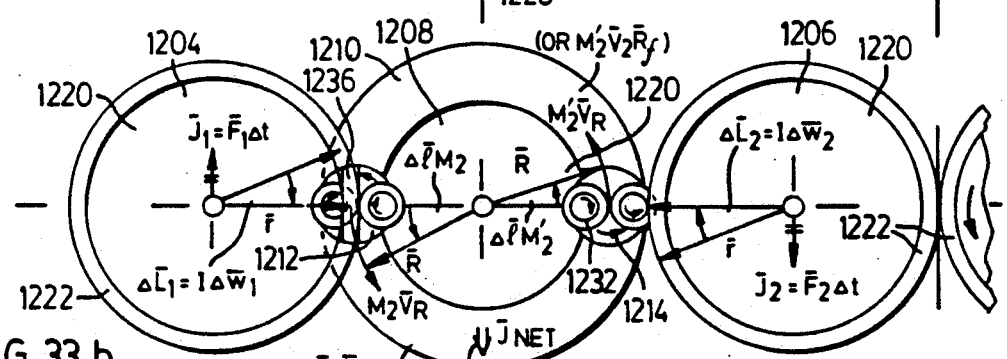
Figure 33C:
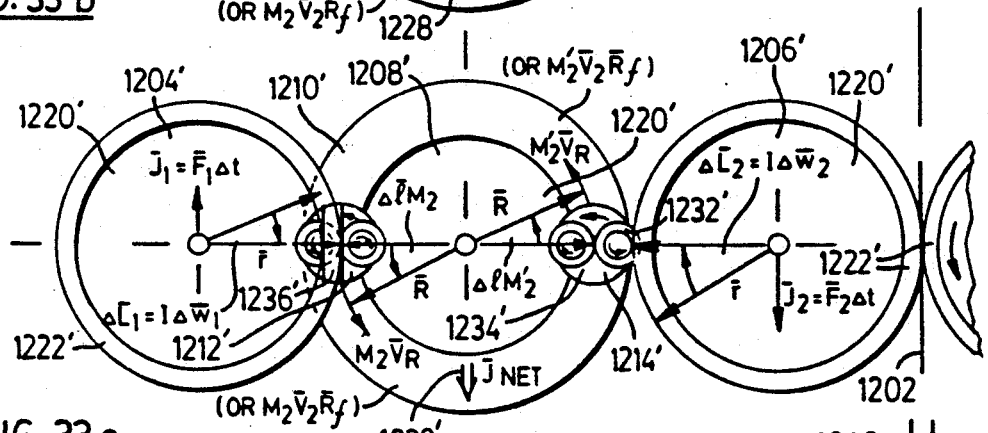

FIGS. 33(a) to 33(c) show two, adjacent, synchronized wheel systems 1200, located on either side of a center-of-mass line 1202, one of which is only partially shown, yet which functions in operation as a mirror image of the one more completely illustrated. Similarly, these wheels systems are operable to apply an impulse along the center-of-mass line. Each wheel system fundamentally comprises three wheels or wheel systems 1204, 1206, and 1208, respectively. The wheel systems 1204, 1206, are of equal rotational inertias and diameters, although two wheel systems of unequal rotational inertias and of unequal diameters may be employed, and will function similarly. Each wheel system 1204, 1206 includes a rotational induction motor system 1222 provided circumferentially along the rim sections thereof. Situated between the two wheel systems 1204, 1206 respectively, is a third wheel system 1208, also including a rotational induction motor system 1210, upon which are enclosed (by thrust-radial bearings, not shown) two, identical bodies, 1212 and 1214. Each of the bodies 1212, 1214 supports a flywheel system 1234, which in turn support an additional pair of synchronized flywheel systems 1230 respectively. The flywheel systems 1230 include rotational induction motor systems 1232 circumferentially along their rim sections.

Each wheel system herein is similar in configuration and in function to the wheel systems 855, 858 illustrated in FIGS. 18 to 21, with the exception that each mass and wheel system 1212, 1214 also includes an induction motor system 1236 respectively, extending the length of each body 1212, 1214. One of such induction motor system 1236 is illustrated on the body and wheel system 1212 in FIGS. 33. Each of the wheel systems 1204, 1206, and 1208, is mounted on a disc, electric motor-generator system 1220. The wheel system 1204 is oriented so that its rim and rotational induction motor system 1222 passes over or surrounds the induction motor system 1236 on wheel system 1212. The wheel system 1206 is oriented so that its rim and rotational induction motor system 1222 respectively passes over or surrounds the rotational induction motor system 1232, on the flywheel systems 1230 on wheel system 1214. Within a vehicle, the wheel systems 1200, illustrated in FIGS. 33, can be structurally mounted within a frame which is integral to the vehicle, or further, which is within a swivel or system of gimbals similar to those previously described so as to achieve directional change capabilities of 360 degrees, radially, or to accomplish directional change capabilities of 360 degrees, radially and spherically.

In operation of the system shown in FIG. 33(a), all three wheel systems 1204, 1206, and 1208, are accelerated by their respective disc, electric motor-generator systems 1220, and therefore move with their respective, individual angular momentum, revolving in the direction of the arrows 1224 respectively, as illustrated. The wheel systems 1204, 1206 are rotationally accelerated to equal extents of angular momentum, and the rotational induction motor system 1210 of the center wheel 1208 angularly accelerates the bodies 1212, 1214 to equal angular momenta (or to equal linear momenta at equal, position vectors r, considered from the center of the wheel systems 1208 to the centers of mass of the bodies 1212, 1214, respectively) about their mutual axis. FIG. 33(a) shows the initial conditions prior to the respective interactions of the wheels 1204 and 1206 with the bodies and wheel systems 1212 and 1214. FIGS. 33(b) and 33(c) show two different methods or variations of accomplishing these two, simultaneous interactions to generate an impulse along the center-of-mass line 1240, and each of these is described separately hereinafter.

In FIG. 33(b), the wheel systems 1204 and 1206, are electronically activated and electrically energized, and then interact respectively with the bodies 1212, 1214, which are temporarily freely floating with respect to the rotational induction motor system 1210 on the center wheel 1208. During these interactions, occurring over equal intervals of time, delta t, equal impulses are applied to the rims of the wheel systems 1204 and 1206, at the respective position vectors r. The wheel systems 1204 and 1206, of equal rotational inertias I, are accelerated angularly to equal extents, and accordingly increase or decrease their respective quantity of angular motion or momentum by equal amounts during their particular, individual interactions. During this process, two impulses, $J_1$ and $J_2$, of equal magnitude yet oppositely directed, are applied at the axes of the wheel systems 1204, 1206 respectively, and sum to zero, causing no net effect on this system. The adjacent wheel system 1200, which functions concurrently in operation as a mirror image of this system, is considered as well, along with the above description.

Accordingly, as the one wheel system 1204, interacts with the induction motor system 1236 on the body 1212, (essentially along a line through its center of mass which is perpendicular to the position vectors R, r, respectively), while the other wheel system 1206, interacts at the respective rim sections with the flywheel systems 1230, 1234 on the body 1214, the bodies 1212, 1214 respectively, are accelerated to two, different, resultant, center-of-mass angular momenta about their mutual axis of rotation. By then braking the body 1212 by the approximate differential in the resultant angular momenta of the two, second bodies 1212, 1214, a resultant net impulse, $J_{NET}$ is applied through the axis of the center wheel 1208 to the frame upon and within which the wheel systems are mounted, in the direction of the arrows 1228 as shown.

A variation of accomplishing the method, which is beneficial as it causes no centrifugal imbalances within this system due to any unequal, center-of-mass, angular accelerations of the bodies 1212, 1214 by the wheels 1204, 1206 respectively, is to brake the body 1212, temporarily freely floating within the center wheel 1208, by the exact amount of the resultant net impulse, $J_{NET}$, during the time period of the two interactions. Accordingly, the body 1212, interacting with the rotational induction motor system 1210 of the center wheel 1208, applies an impulse to the center wheel 1208 on the rim section, at its particular, center-of-mass, position vector r with respect to the axis, which is mutually and equally applied in return, to the center of mass of the body 1212. Also, during this process, a reverse torque is applied to the center wheel 1208 by the electric motor-generator system 1220, upon which the center wheel 1208 is mounted, such that the braking action applied to the body 1212 by the center wheel 1208 results in a net impulse, $J_{NET}$, being applied during the interaction, through the axis of the center wheel 1208 to the frame and hence to the vehicle, causing the center of mass of the combined system to accelerate in the direction of the arrow 1240. More simply explained, instead of braking the resultant differential in angular momenta after the respective interactions, this particular quantity is debraked during the time interval of the interactions, and channelled concurrently through the wheel 1208 as a net impulse to the framework and vehicle.

These braking actions, as described above, are done in such a fashion as to maintain equal, concurrent, angular accelerations of the second bodies 1212 and 1214, with respect to their mutual axis of rotation within the center wheel 1208, during their respective interactions with the wheel systems 1204 and 1206. This occurs concurrently as the axis of the center wheel 1208 is being accelerated in the direction of the arrows 1228, due to the concurrent application of the resultant net impulse(s), $J_{NET}$, during this process. The increased, center-of-mass, angular momenta of the bodies 1212 and 1214 is converted into angular momentum of the center wheel 1208 by the respective braking actions applied by the rotational induction motor system 1210 of the center wheel to the bodies 1212 and 1214, immediately after the respective, two interactions. These braking actions are applied to the precise extents, respectively, that the particular angular velocities of the bodies 1212 and 1214 become synchronized and equal with the angular velocity of the respective, adjacent, rim section of the center wheel 1208. At this precise instant, respectively, the bodies 1212 and 1214 are electromagnetically or electromechanically latched to the center wheel 1208, and immediately thereafter, the angular velocities of all wheel systems are appropriately adjusted by their particular, electric motor-generator systems 1220, including the wheel systems of the body 1214, to those angular velocities, respectively, of the particular wheel systems prior to the above-described interactions.

The body 1212 now assumes the function of the body 1214, i.e., the bodies reverse position and function due to the rotation of the center wheel 1208. The above-described interactions are repeated in their exact mode and sequence, thereby causing another resultant, net impulse, $J_{NET}$, to be applied through the axis of the center wheel 1208, which causes the center of mass of the combined system and vehicle to accelerate further in the direction of the arrow 1240, to a second resultant velocity, $v_2$, which is greater than the first resultant velocity, $v_1$. During each, respective interaction and momentum conversion process as above-described, mechanical or kinetic energy is reconverted by the respective induction motor and/or electric motor-generator systems, to electrical stored energy within the batteries energizing the components in the system. This is done in order to maximize the energy efficiency of each individual wheel system.

It should also be realized that the pair of bodies, 1212 and 1214 respectively, on the center wheels 1208, can also be designed and configured similarly to the bodies 1110b, 1110b respectively, as described and illustrated in FIG. 32, to accomplish a delta or differential in the rotational inertias and hence, in the momentum absorption, conversion, and transmutation characteristics of the respective wheel systems on the bodies 1212, 1214. This permits continuous quantities of net thrust to be generated in the direction of the arrows 1228, 1240, or in any desired and chosen direction, radially from the axis of the center wheel or, more accurately, radially from the center of mass 1202 of the combined system, 1200, of the interacting bodies or wheel systems, and in the plane of the wheels.

FIG. 33(c) illustrates yet another method of accomplishing the respective interactions of the wheel system 1200 illustrated, which is similar to the method described and illustrated above, with reference to FIG. 33(b). For clarity, like reference numerals will be used to indicate like components shown in FIG. 33(b) with a "'" added. In this method, the second bodies 1212' and 1214' are individually, angularly accelerated on the center wheel 1208' by impulses applied by, and momentum converted from the wheel systems 1204' and 1206' respectively, through magnetic interactions between the respective, adjacent induction motor systems 1222', 1236', and 1222', 1232'. It should be noted that one interacting, magnetic system, of each pair of the respective interacting, magnetic systems, can be formed and configured with permanent magnets, while the other magnetic system of each corresponding pair may consist of a series of electromagnetic coils, which can be programmed as to the timing of their individual, electrical activations, and as to their desired, individual, electromagnetic field strengths.

In operation of this embodiment, the bodies 1212' and 1214' respectively, are angularly accelerated to equal extents of center-of-mass, angular momentum with respect to and about their mutual axis (axes) of rotation, which is the respective axis of the center wheel 1208'. In order to accomplish this, a greater portion of the initial angular momentum of the wheel system 1206' is converted to the corresponding center-of-mass, angular acceleration of the body 1214', and accordingly transmuted into a change in the absolute spin of the wheel system 1230', 1234' of the body 1214', than that total portion correspondingly, from the wheel system 1204' to the body 1212'. Accordingly, in this process, the body 1214' applies a greater impulse to the wheel system 1206' and, through its axis, to the frame of the system 1200, than the body 1212' correspondingly applies to and through the wheel system 1204'. A net impulse is therefore created by these processes, which is applied at and through the center of mass 1202, of this system 1200, which causes the center of mass of the combined system to accelerate in the direction of the arrows 1228', 1240, as illustrated. That is, $J_2 - J_1 = J_{NET,CM}$.

It is preferred that the above-described interactions between the respective wheel systems 1204' and 1206', and their respective, corresponding, second bodies, 1212' and 1214', occur over equal intervals of time, delta t. Also, it is preferable to maintain equal time rates of center-of-mass, angular accelerations, of the bodies 1212′, and 1214′, with respect to and about their mutual axis of rotation, the axis of the center wheel 1208′, concurrently, during the interactions, and as the net impulse is being applied at and to the center of mass of the combined system 1200. That is, these respective, center-of-mass, angular accelerations occur as the axle of the center wheel 1208′, the mutual axis of rotation of the bodies 1212′ and 1214′, is accelerated due to the application of each particular net impulse, $J_{NET}$. This is to ensure that no centripetal or centrifugal imbalances, within the system 1200, occur at any time during the operation of this system, and this can be accomplished by appropriately and correspondingly, timing and regulating the extents of the respective, interactive processes as described above.

Another similar method of operation of the system 1200 shown in FIG. 33(c) to generate a net impulse, yet a variation serving as an alternative to the center wheel system 1208′, is to place the bodies, 1212′ and 1214′, each within their own, respective, linear or magnetic bearing systems within particular linear guide frames, and then to apply the above-described modes of operation of the respective interactions, to the bodies 1212′ and 1214′. By braking the bodies, 1212′ and 1214′, immediately after these interactions (which are between the wheel systems 1204′, 1206′ and the bodies 1212′ and 1214′, the wheel and mass systems 1212′ and 1214′, respectively) via their respective induction motor systems, the resultant, net delta or differential applies a net impulse to the center of mass of the combined system, thereby accelerating the center of mass 1202 of the combined system 1200, and vehicle, in the direction of the arrow 1240. Using cams (not shown) driven by a pair of counter-revolving disc motors, or by means of their respective induction motor systems, the bodies, 1212′ and 1214′, are repositioned to their initial, starting positions. After the appropriate and particular r.p.m. adjustments of all wheels and wheel systems in this wheel system 1200 have been completed, by then repeating this procedure, continuous acceleration can be achieved in the direction of the arrow 1240.

Figure 34:
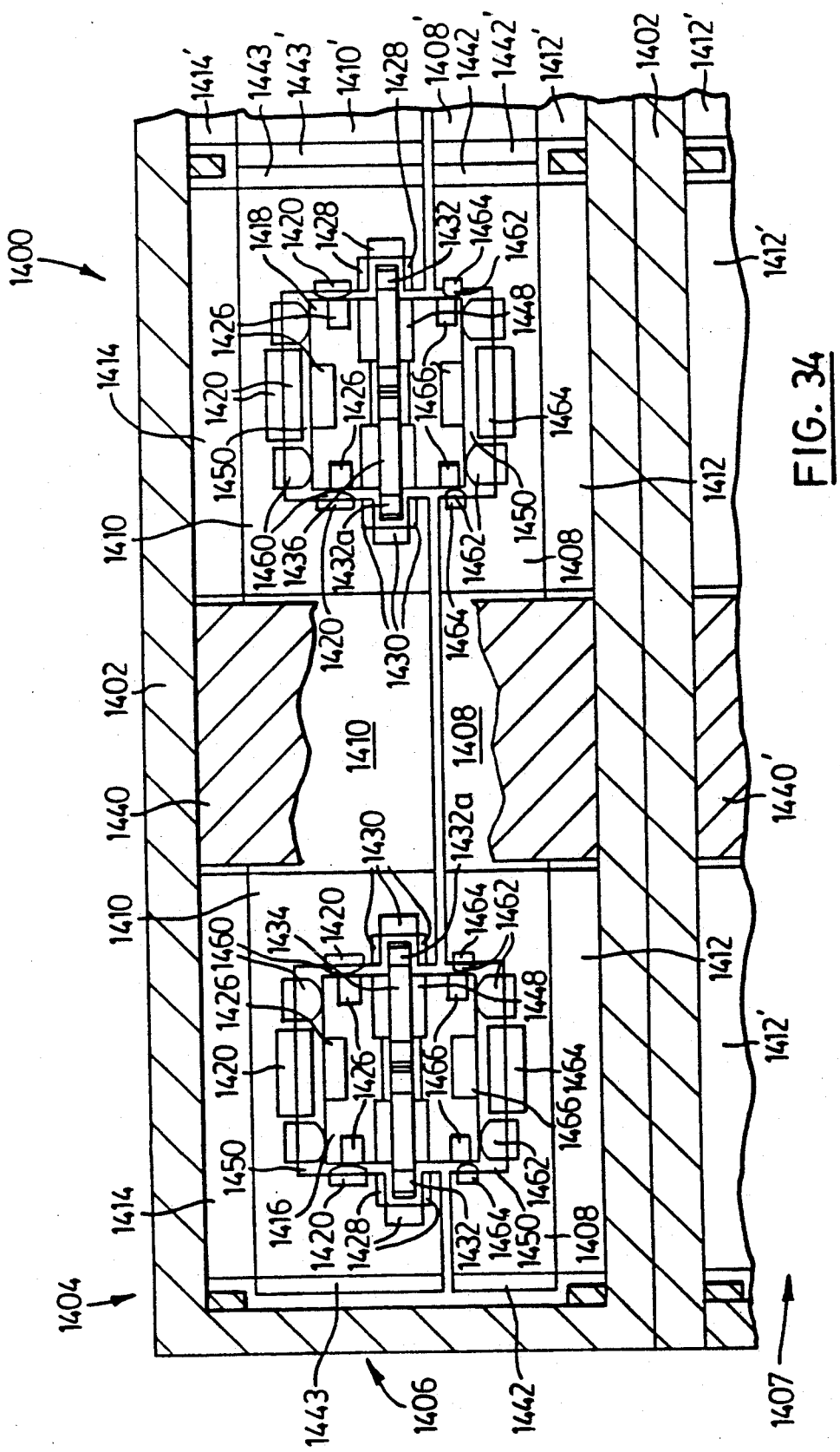
FIG. 34 is a sectional view of another wheel system similar to those shown in FIGS. 30 to 32 and 33a to 33c for use in an impulse drive.

FIG. 34 is a sectional view of a portion of yet another embodiment of an impulse generator 1400. This embodiment is similar to those illustrated in FIGS. 31 and 32, and thus, operates in a manner similar to these systems. As well, in this system the wheel systems 1204 and 1206, described and illustrated in FIGS. 33(a) to 33(c), have been combined within a single wheel system, 1410. FIG. 34, in conjunction with the other systems referenced above, illustrates one of numerous design variations that apply the fundamentals revealed within this specification, and shows that there are numerous design variations that are all, individually consistent with the nature of this specification.

FIG. 34 illustrates the upper portion of a wheel system that is balanced vertically, with respect to the drawing, by a lower portion which is only partially illustrated, and which functions in operation as the mirror image of the upper portion illustrated, and which will be hereinafter described. These upper and lower portions are also balanced horizontally, with respect to this drawing, by two adjacent wheel systems which are also configured and function during operation in mirror image to the other two portions, one of which is illustrated in FIG. 34.

A frame 1402, is configured within and attached to a swivel and/or a system of gimbals (not shown) of a vehicle (not shown) in a manner similar to those shown in FIGS. 13 to 22. Within the frame 1402 are two adjacent pairs of the wheel systems 1404. Each individual wheel system 1404, contains an upper portion 1406, as illustrated in FIG. 34, and a lower portion 1407 (not fully illustrated), which functions during operation in mirror image to the upper portion 1406. Each upper portion 1406 comprises two wheels, 1408, 1410, driven by ring, electric motor-generator systems 1412 and 1414 respectively. The wheels 1408 and 1410 also include two bodies, 1416 and 1418, as illustrated. Induction motor systems 1420 are provided on the inner surfaces of the wheel 1410, and interact with adjacent induction motor systems 1426 on the surfaces of the bodies 1416 and 1418. Rotational induction motor systems 1428, 1430, also on the inner surfaces of wheel 1410, interact with the adjacent, rotational induction motor systems 1432 and 1432a respectively, on the rims of wheel systems 1434 and 1436 which are mounted on the bodies 1416 and 1418, respectively.

Electromagnetic and/or electromechanical latching systems (not shown) within and adjacent the bodies 1416 and 1418, within and surrounding the wheels 1408 and 1410, can cause the bodies 1416 and 1418 to be latched integrally, to any chosen, particular wheel sections, for a portion or a complete revolution of the respective wheel system. The frame 1402 is designed and configured with hollow cylinders 1440 within the wheel systems, to fill the internal spaces in order to reduce windage, vortices etc., and to maximize the energy efficiency of the system 1400, during the time periods of its operation. Spur or ring gears, 1442 and 1443, respectively connect the wheels 1408 and 1410 with their adjacent counterparts in the other portions of the frame.

The bodies 1416 and 1418 are mounted within the wheel systems 1408, 1410, and are constrained by the bearing systems 1460, 1462, as illustrated, yet the bodies 1416 and 1418 are not mounted integrally, to any portion of the bearing systems. This allows the bodies 1416 and 1418 to float freely when not latched to either of the wheel systems 1408 and 1410, respectively.

In one design and configuration of the bodies 1416 and 1418, and in one mode of operation which is to be described, the bodies are initially latched electromagnetically or electromagnetically by latches (not shown) to the wheel system 1408. The wheel systems 1408 and 1410 are then rotationally accelerated by the ring, electric motor-generator systems 1412 and 1414, respectively to any chosen r.p.m. If the chosen r.p.m. is high or very high, the wheel systems 1434 and 1436 on the bodies 1416 and 1418 are, at the same time, rotationally accelerated by the disc, electric motor-generator systems 1448, to an r.p.m. compatible with their mutual, center-of-mass, angular velocities of approach (which are also their center-of-mass, "linear" velocities, in relation with their position vectors r, which originate at and extend, from their mutual axis of center-of-mass rotation) to their respective points of interaction with the particular, revolving wheel system 1410. The r.p.m. of the wheel system 1410 is proportionately higher than the r.p.m. of the wheel system 1408, at each chosen r.p.m. of operation of the wheel system 1408. The reason for this proportionately higher r.p.m. is to be able to accomplish "braking" actions and effects, which are directed to the first body, the wheel system 1410, by the second bodies, 1416 and 1418 respectively, as will shortly be described.

At any chosen, two, diametrically opposite points and positions of the bodies 1416 and 1418, that is, at any desired and selected, resultant direction of the continuous, center-of-mass acceleration of the system, the electromagnetic or electromechanical latches intermittently attaching the bodies 1416 and 1418, to the wheel system 1408, are electrically released so that the bodies 1416 and 1418, for the time intervals of their respective interactions within the wheel systems 1408 and 1410, become temporarily, "freely floating" within the inner cavity 1450, which is defined and surrounded by the wheel systems 1408 and 1410. For ease of understanding, the chosen positions of the respective interactions of the bodies 1416 and 1418 will be described in comparison with the particular positions of the interactions of the bodies described and illustrated in FIG. 33b.

In the wheel system 1200, illustrated and described in FIG. 33(b), the wheel systems 1204, 1206 respectively, simultaneously interact with the two, second bodies, 1212, 1214. If the particular interactions of the wheel system 1400 were to occur individually in sequence, one may realize the similarities with the following description. Although the two modes of interactions occur simultaneously in the system 1400, illustrated in FIG. 34, if the following were to occur: (1) the one, first body, the revolving wheel system 1410 (herein described), individually comprises the two, first bodies, the wheel systems 1204, 1206 respectively, illustrated in the FIG. 33(b), (2) the interactions between the first body, the revolving wheel system 1410, and the second bodies, the wheel and mass systems 1416 and 1418, were to occur individually, in sequence, that is, one interaction after the other interaction, each one within its own, respective interval of time, (3) the time interval of the one interaction of the wheel system 1410 with the particular second body 1416, is equal to the time interval of the other interaction of the wheel system 1410 with the particular second body 1418, (4) immediately prior to each respective interaction, the initial, angular momentum of the wheel system 1410, serving as the first body for both interactions, is of equal quantity or extent, i.e., its angular velocity is adjusted (either increased or decreased, depending on the particular, chosen mode of operation of the wheel system 1400) during the time interval between the two, respective interactions, and (5) in each particular interaction occurring in the sequence, the second bodies, 1416 and 1418, apply equal, total impulses, respectively, to the first body, the wheel system 1410, in each interaction, the quantity of the angular motion and the angular momentum of the first body, the wheel system 1410, decreases by equal extents. That is, the wheel system 1410 converts, during each of the above-described interactions, an equal quantity or portion of its angular momentum, (a) completely to the change in the center-of-mass, angular momentum of the body 1416, and (b) partially to the change in the absolute spin of the wheel system 1436 of the body 1418, as well as a lesser portion to the change in the center-of-mass, angular motion and momentum of the body 1418 (than that portion converted to the body 1416).

During the above-described interactions, as the bodies 1416 and 1418 apply equal, total impulses to the wheel system 1410, respectively at their individual radius r from the axis of the wheel system, the two impulses also applied, at and through the axis of the wheel system 1410, to the frame and therefore to the center of mass of the system 1400, are respectively and in sequence, mutually equal in magnitude and yet oppositely directed. Therefore, these two impulses will cause a temporary but not a continuing effect on the system. However, it should be noted, that in the actual operation of the system 1400, these two impulses are simultaneously applied by and to one wheel system 1410 respectively functioning as the first body or mass for both second bodies 1416 and 1418, and accordingly, simultaneously sum to zero, causing no effect on the center of mass of the system 1400. Through an understanding of the above-described, individual events and of their resultant effects, one may more easily come to an understanding of the complete wheel system 1400 and of its modes of operation, as will now be described.

In operation, immediately and instantaneously after the bodies 1416 and 1418 have been electrically released by their respective latches and are "freely floating" within the cavity 1450 of the wheel systems 1408 and 1410, then, immediately and instantaneously prior to the respective interactions, the rotational induction motor systems 1420 and 1428, 1430 on the wheel 1410, are simultaneously, electrically energized, as are the induction motor systems 1426 on the body 1416, and the rotational induction motor systems 1432, 1432a on the wheel system 1436 of the body 1418. Also, simultaneously to the above, the rotational induction motor systems 1464, on the inner surfaces of the wheel 1408, are electrically energized as are the adjacent induction motor systems 1466 on the body 1416.

It should be noted in designs and in the operation of the propulsion systems 1400, or with regard to any of the impulse drive systems described herein, that through computer programming and with electronic sensing, position, and timing (i.e., complete motion control) systems, only the respective, immediately current sections (the individual coil systems thereof) composing the particular induction motor systems of the wheel and mass systems required to accomplish the respective interactions or any motion adjustments, are instantaneously and sequentially, electrically energized. Also, it is preferred that during the time interval of the interactions, the torque initially applied by the ring, electric motor-generator system 1414, to accelerate rotationally the wheel system 1410, is substantially lowered by the computer and electronic control system (not shown), so that the wheel system 1410 becomes a freely floating flywheel for this time interval. However, the system 1400 can still be operated, and the interactions to be described shortly can still very effectively occur, if the respective torque is only partially lowered. This also depends on the characteristics of the particular wheel system and on the particular extent of this torque. Also, during the process of the interactions, it is preferred that, in addition to disengaging the ring, electric motor-generator system 1412, by electronic controls, from continuing to accelerate the wheel system 1408, a reverse torque be applied by the ring, electric motor-generator system 1412, to the wheel system 1408 upon and within which the body 1416 is supported, such that the braking action, to be shortly described, applied by the rotational induction motor systems 1464, of the wheel system 1408, to the respective induction motor systems 1466 on the body 1416, results in a net impulse being applied during each, respective interaction, through the respective axis of each wheel system 1408 and 1410, to the frame, and to the center of mass of the vehicle. This of course causes the center of mass of the combined system to accelerate repetitively and continuously. With reference to the illustration, FIG. 34, this acceleration occurs vertically from the page. With reference to the illustrations, FIGS. 33(b) and 33(c), this acceleration occurs in the direction of the arrow, $J_{NET}$.

In the system 1400 the bodies 1416 and 1418 are caused to apply, at diametrically opposite points and positions, two, equal, yet oppositely directed impulses to the wheel system 1410, simultaneously, such that each one of the impulses respectively applied by the bodies 1416 and 1418, to the wheel system 1410, accounts for exactly fifty percent of the total sum of the change or delta in the quantity of angular motion and angular momentum of the wheel system 1410, occurring as a result of the two, respective, interactions. These two, particular impulses, of equal magnitude yet opposite in direction, sum to zero and do not cause any effect on the wheel system 1400.

The impulses respectively applied by the body 1416, and the wheel system 1436 of the body 1418 to the wheel system 1410, are computer programmed to be appropriately electronically activated, and suitably electrically energized to maintain through the same interval of time, delta t, duplicate and concurrent impulse or force through time curves at the respective, diametrically opposite points of force application on the rim sections of the wheel system 1410. The locations of the points of the respective impulse applications are also particular to the individual designs and the specific configurations, and overall, in the operation of the individual wheel systems and vehicles, according to the desired direction of travel. The impulses applied are generally in the form and manner of like polarity to like polarity, repelling, electromagnetic fields, or repelling, permanent magnetic fields and electromagnetic fields, and can as well be accomplished in a series of individual impulses which compose the whole impulse of the respective interaction. Further, the impulses respectively applied can be precisely, electronically programmed, controlled and regulated, at eadch r.p.m. of operation of this system, from the very low r.p.m. through to the very high r.p.m.

During the operation of the wheel system 1400, the electrically energized, rotational induction motor systems 1420 and 1428, 1430, on and along the respective, inner, surface sections of the wheel system 1410, electromagnetically interact for equal intervals of time, delta t, with their respective, adjacent counterparts, the induction motor systems 1426 on the body 1416, and the induction motor systems 1432, 1432a on the rims of the wheel systems 1436 of the 1418. During the time interval of the interaction with the rotational induction motor systems 1432, 1432a, on the rims of the wheel system 1436 of the particular body 1418 (which is within the chosen position within the wheel system 1400, illustrated in FIG. 34), it is preferred, in general operation, to disengage electronically the disc, electric motor-generator systems 1448 of the wheel system 1436, within the body 1418, from continuing to accelerate rotationally the wheel system 1436 of the body 1418. It is also preferred, during the time interval of this interaction, delta t, and with regard to the respective, disc, electric motor-generator system 1448, of the wheel system 1436, within the body 1418, in addition to the increased resistance to rotational acceleration of the wheels 1436 of the wheel system 1436, within the body 1418, provided by their rotational inertias and the internal magnetic resistance of the disc, electric motor-generator systems, that a moderate, reverse torque be applied by the disc, electric motor-generators to the wheels of the wheel system 1436 of the body 1418, in order to control precisely and regulate the "braking" interaction with the wheel system 1410. That is, by increasing and/or varying, in this manner, the rotational inertias of the wheels of the wheel system 1436 within the body 1418, without increasing their particular, total mass, respectively, the braking action of the wheels 1436 of the body 1418, to the wheel system 1410, as well as the extent of the concurrent, center of mass, angular acceleration of the body 1418, within the wheel systems 1408 and 1410 and about the respective axis of the wheel systems, can be regulated, controlled, varied, and instantaneously adjusted.

Accordingly, with regard to the above, if the interaction to be described subsequently, in regard to the following, did not occur, the bodies 1416 and 1418 would be angularly accelerated by their respective interactions with the wheel system 1410, to two, significantly different, resultant, center of mass, angular momenta about their mutual axis of center of mass rotation (which is also the respective axis of the wheel systems 1408 and 1410), while at the same time applying two, equal, yet oppositely directed impulses, which sum to zero, to the frame at the respective axis of the wheel system 1410, during this process. The body 1416 would have the significantly greater, center of mass, angular momentum, as a significant portion of the initial angular momentum of the wheel system 1410, transmitted to the wheel system 1436 of the body 1418, is converted and transmuted into a significant change in the absolute spin of the wheels 1436, of the wheel system 1436 of the body 1418.

However, another event is electronically programmed to occur, during the equal, time intervals of the interactions, delta t, which causes two, equal, center of mass, angular accelerations of the bodies 1416 and 1418, respectively, about their mutual axis of rotation, and concurrently during each instant of the time interval of the interactions, while at the same time causing a resultant, net impulse, $J_{NET}$, to be applied at the axis of each respective wheel system 1408. The resultant, net impulses are applied such that the sum of the respective, net impulses are transmitted to, and applied through, the center of mass of the combined system and vehicle, such that $\Sigma J_{NET} = J_{CM,NET}$, causing the center of mass of the combined system and the vehicle to accelerate continuously in any chosen direction, due to the systems' repetitive production of net impulses and of $J_{CM,NET}$. This particular method of operation of the wheel system 1400, and of the concurrent interactions between the body 1416, and the respective wheel systems 1408 and 1410, also ensures that no undesired, centripetal or centrifugal force imbalances occur at any time during the interactions, and during the operation of this system, and accordingly, that the bodies 1416 and 1418 are provided equal, center of mass, angular momenta, each one with respect to the other, and both with respect to their mutual axis of rotation, at any instant of time during the operation of the wheel system 1400.

In order to accomplish this, immediately (instantaneously) prior to, or simultaneously, with the start of the interactions to occur between the wheel and mass systems 1416, 1418 respectively, the rotational induction motor systems 1464 are electronically activated and electrically energized on the wheel system 1408, as well as their adjacent counterparts, the induction motor systems 1466 on the body 1416. Accordingly, the wheel system 1408 applies an impulse, A, to the body 1416, and the body 1416 in turn applies an equal, yet oppositely directed impulse, A', to the wheel system 1408, at its particular radius and the position vector r, which locates the body 1416 with respect to its axis of rotation. Concurrent with the above-described interaction, two, equal, yet oppositely directed impulses, B and C, are applied by the first body, the wheel system 1410, simultaneously, at relatively, diametrically opposite points, to the second bodies, the wheel and mass systems 1416, 1418 respectively. Thus, two, equal, yet oppositely directed, reaction impulses, B' and C', which sum to zero, are resultant through the axis of the wheel system 1410 and upon the frame 1402.

Yet, as a portion of the angular momentum of the wheel system 1410 is converted to and transmuted into a delta or a change in the total quantity of absolute spin of the wheel systems 1436, within the body 1418, the resultant impulse, C', applied to the center of mass of the body 1418, and accordantly, the resultant, center of mass, angular momentum of the body 1418, is therefore less. Overall, due to the partial braking action provided by the wheel system 1408 to the body 1416 (the applied impulse, A), an equal, yet oppositely directed impulse, A', is directed through the respective axes of the wheel systems 1408 in the positive direction, to the center of mass of the combined system 1400 (and hence, of the vehicle). This occurs while maintaining equal, respective, concurrent, angular accelerations and equal, angular momenta of the second bodies, the wheel and mass systems 1416, 1418 respectively, at all instants during these particular interactions. Thus, the sum of the resultant, net impulses, $J_{CM,NET}$, is applied to, and accelerates the center of mass of the system 1400, and hence, the vehicle. It should be noted that the sum of the resultant, net impulses, $J_{CM,NET}$, is relatively equal to the sum of the resultant, net impulses that would have been provided had the differential in angular momenta, the delta of the bodies 1416, 1418, been "braked" and applied to the center of mass of the system 1400, after their respective interactions, without the use of the "braking" effect of the wheel system 1408 being applied to the body 1416, during the interactions.

The following description may further illuminate the "braking" interaction, of the wheel system 1408 to the body and mass system 1416. In this interaction, if the wheel system 1410 applies an impulse of 10 Newton-seconds to the body 1416 and impulse of 10 Newton-seconds to the ring of the flywheels 1236 on body 1418, and the wheel system 1408 concurrently applies an impulse of 4 Newton-seconds to the body 1416 in the contrary direction, the body 1416 will have a resultant, center of mass, angular acceleration proportional to its total mass and the net impulse of 6 Newton-seconds applied at its center of mass. In addition, due to the rotation of the flywheels 1436, the body 1418 actually receives a net impulse of 6 Newton-seconds applied at its centre of mass. The 4 Newton-seconds difference is of course absorbed as rotational motion of the flywheels 1436.

Accordingly, in this interaction, the wheel system 1410 will receive a reaction impulse of 10 Newton-seconds, which is equal in magnitude yet opposite in direction to the reaction impulse of 10 Newton-seconds applied by the body 1418, also to the wheel system 1410. However, the body 1418 (of equal, total mass to the body 1416), will experience a resultant rate of angular acceleration proportionate to its total mass and to the net impulse of 6 Newton-seconds resultant upon its center of mass, which corresponds to the rate of center of mass, angular acceleration of the body 1416, for the mutual, equal time intervals, delta t, of their respective and concurrent interactions. This is due to the partial conversion and transmutation of the particular portion of the initial angular momentum of the wheel system 1410, into a change in the absolute spins and respectively, in the absolute quantity of rotational motion and angular momentum of the wheels of the wheel system 1436, of the body 1418.

Yet, simultaneously, during the time interval of the interaction, delta t, the body 1416 also applies a reaction impulse, in this particular example, of 4 Newton-seconds to the wheel system 1408 in the positive direction, which is the desired direction of travel. This resultant, net impulse is applied through the axis of the wheel system 1408 as $J_{NET}$, and accordingly through the framework and the center of mass of the combined system 1400 and the vehicle, as a component of $J_{CM,NET}$, causing the combined center of mass of the system 1400 and vehicle to accelerate continuously in any chosen direction, as this system repetitively produces the resultant, net impulses, $J_{CM,NET}$. The rate of acceleration of the system 1400 and vehicle is directly proportional to the number of impulses, $J_{CM,NET}$, per second.

During, and due to these internal interactions, the center of mass of the combined system 1400 and of the vehicle accelerates, the wheel system 1410 angularly decelerates, the centers of mass of the bodies 1416 and 1418 angularly accelerate at the same time, at a concurrent time rate of acceleration (as the body 1416 was partially braked by the wheel system 1408), thereby concurrently, angularly accelerating the wheel system 1408, and the wheels 1436 of the wheel system 1436 within the body 1418, have had a change or delta in their absolute spin, or respectively, in their absolute quantity of rotational motion and angular momentum. Accordingly, before the next interactions, the particular angular velocities of each of the above systems is adjusted by the respective, adjacent, rotational induction motor system interactions, and by the respective, electric motor-generator systems, in order that the respective, angular velocity of each of the above systems, immediately prior to the next interaction, is exactly the same as it was immediately prior to the particular above-described interactions.

The second bodies 1416 and 1418 are rotationally braked by the first body, which is the wheel system 1410, concurrently to the wheel system 1408 being rotationally decelerated by the ring, electric motor-generator system 1412. At the precise instant when the center of mass, angular velocities of the bodies 1416 and 1418 are synchronous with the angular velocity of the adjacent wheel system 1408, that is, the angular velocities of these particular systems are all now at their pre-interaction angular velocities, the bodies 1416, 1418, are, once again, temporarily latched to the wheel system 1408, by the electromagnetic or electromechanical latches (not shown), or by the respective, adjacent, rotational induction motor systems on the wheel system 1408. During the time interval of the above-described adjustments, the particular r.p.m. of the wheels 1436, of the wheel system 1436 of the body 1418, are lowered by the actions of their respective, disc, electric motor-generator systems 1448, to their pre-interaction r.p.m.

Immediately and instantaneously after the above-described adjustments, and prior to the next interaction, the angular velocity of the wheel system 1410 is further lowered by the actions of the ring, electric motor-generator system 1414, to its particular, pre-interaction angular velocity. All of the above-described adjustments of angular velocity are respectively accomplished by pairs of couples and accordingly, the adjustments have no effect on the center of mass of the combined system 1400 or vehicle. Also, a significant portion of the mechanical or kinetic energy is recovered during the interactions and adjustments by the electric generators of the corresponding induction motor systems, or by the respective, electric motor-generator systems, and this is reconverted to electrical stored energy in batteries.

The next series of interactions now occur, exactly in their overall modes as described in the preceding section, with the wheel system 1434 within the body 1416, now revolving through the former position and in the function of the wheel and mass system 1436, 1418, and the wheel and mass system 1436, 1418, now revolving through the former position and in the function of the wheel and mass system 1434, 1416, i.e., the two, inner, first bodies 1416, 1418 respectively, due to the revolving of the particular wheel systems 1408, continuously and repetitively interchange and alternate their positions and modes of operation within the wheel system 1400. During this next interaction, the combined center of mass of the wheel system 1400, and of the vehicle, is further accelerated in the positive and desired direction of travel, by the second, resultant, net impulse, $J_{CM,NET,2}$, to a second, resultant, center of mass velocity, $V_{CM,2}$, which is proportionately greater than the first, resultant, center of mass velocity, $V_{CM,1}$, which was achieved from the first, resultant, net impulse, $J_{CM,NET,1}$, as described herein.

With reference to the system 1400, and to all of the impulse drive systems described within this specification, it should also be noted, that for the relatively equal quantities of momentum of the first body or masses, which are converted and transmuted into a delta, or a change in the total quantity of absolute spin of the second body or wheel and mass systems, at all particular r.p.m. of operation of any of these wheel systems, relatively equal, resultant, net quantities of angular momentum, and relatively equal, resultant, net impulses are continuously and repetitively provided. In the operation of the wheel system 1400 and the impulse drive systems described herein, the "braking" actions, as earlier described, providing continuous acceleration of the center of mass of the wheel system 1400 and continuously increasing velocities of the vehicles, occur in less and less intervals of time. The respective, time intervals, then, of the interactions, continue to approach zero seconds of interaction, as the r.p.m. increases. Further, the magnitudes of the force components increase, and approach or essentially result in a continuous (constant), smooth, internally derived force in one, chosen, vector direction through the center of mass of the vehicle.

To optimize the performance and thrust capacities of the wheel systems 1400, it is preferable to make use of the multiple, absorption systems, or sets of the multiple, absorption systems, as illustrated in and described with reference to FIGS. 19 to 21, within each individual body or wheel and mass system, 1416, 1418, respectively. To one of skill in the art, it can be understood that as many of the corresponding pairs of the wheel and mass systems 1416, 1418 may be included in design and within the operational wheel systems 1400, as are desired and accordingly efficient. This enables the corresponding pairs of the wheel and mass systems 1416, 1418 to be virtually always within, closely approaching, or adjacent to the particular positions of their respective interactions with and within the wheel systems 1408, 1410. This increases the rapidity with which the respective interactions are performed and accordingly, the acceleration and the thrust capacity and capabilities of any particular wheel system 1400 and vehicle.

Figure 35A:
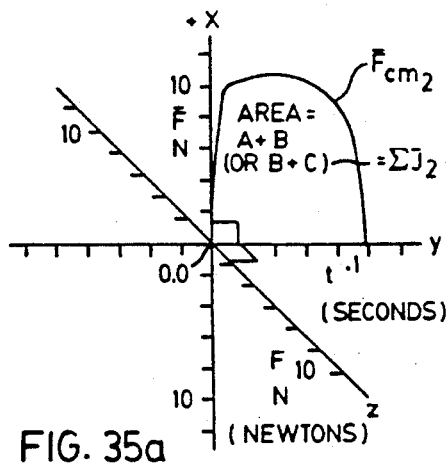
FIGS. 35a, 35b, 36a, and 36b show graphs illustrating the respective force through time curves of the two basic interactions between two bodies.
Figure 35B:
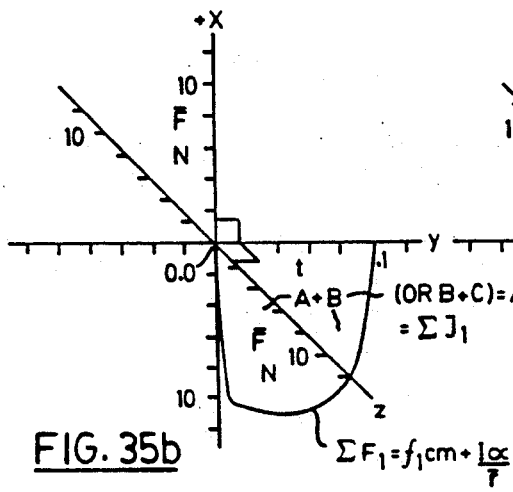

The graphs illustrated in FIG. 35 and 36 are approximations of the force through time curves between the two bodies 1024a, 1038 and 1022a, (1023a) for the two, basic interactions (I and II) illustrated in FIG. 28, and earlier in the specification, which are electronically programmed to occur over or through the same intervals of time, delta t. The graphs, 35a and 35b, represent and illustrate the basic, center of mass, and apparently linear interaction (I) between the two bodies 1024a, 1038 and 1022a, which are illustrated in the FIG. 28b. The graph 35a, illustrates the force through time curve, or the angular (apparently linear) impulse, $\Sigma J_2$, applied by the first body 1024a, 1038 to the second body, 1022a. FIG. 35b graphically illustrates the equal, yet oppositely directed, concurrent, force through time curve, or the angular (apparently linear) reaction impulse, $\Sigma J_1$, respectively applied by the second body, 1022a, to the first body 1024a, 1038 along the line of action of the force temporarily joining the two bodies.

Figure 36A:
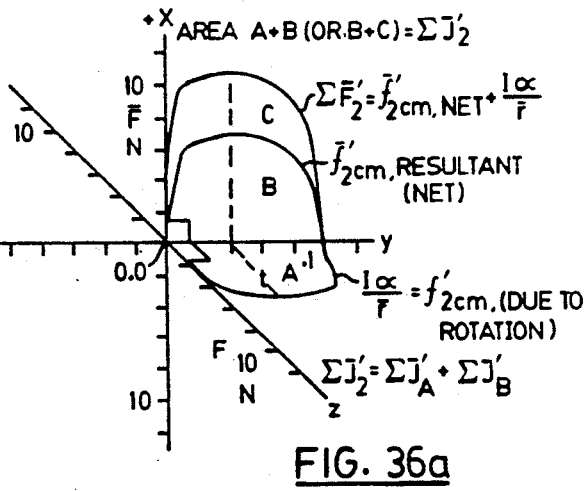
Figure 36B:
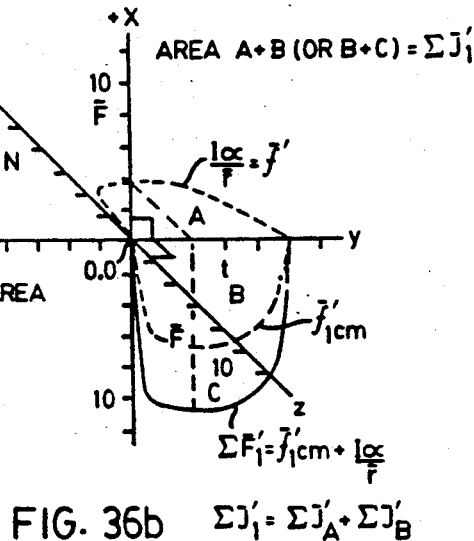

The graphs illustrated in FIG. 36a and 36b, represent the basic, non-linear, and angular, and center of mass, angular, or apparently linear interaction (II). The graph 36a, with reference to the FIG. 28a, illustrates the net events or force through time curves resultant upon the wheel of the wheel system 1023a of the second body 1022a, and resultant upon the center of mass of the second body 1022a. This curve is an approximation and does not designate the exact portion related to the angular acceleration of the wheel of the wheel system 1023a, of the second body 1022a, as related to the extent of the reverse torque applied by the particular disc, electric motor-generator to the particular wheel of the wheel system 1023a, during the time interval of this interaction. However, the extent of this reverse torque required in these particular modes of interaction, can be modified, additionally, by configuring the mass of the respective wheel system 1023a more as a ring, as compared with a disc.

Accordingly, with reference to the FIGS. 36a and 28a, the sum of the non-linear and angular (apparently linear) impulses, $\Sigma J_2'$, $(=\Sigma J_2)$, applied by the first body, the wheel system 1024a, 1038, to the wheel system 1023a, and through to the center of mass of the body 1022a, resolves, immediately as rotation occurs, into two, net impulses or components: $\Sigma J_A'$, which is that particular impulse which causes a change in the absolute spin of the wheel of the wheel system 1023a of the body 1022a, and overcomes that particular portion of resistance provided by the reverse torque application, and, $\Sigma J_B'$, which is that particular impulse which causes the center of mass, angular acceleration of the body 1022a, about its respective axis, and such that, $\Sigma J_2'$ (the impulse applied) is greater than $\Sigma J_B'$ (the resultant impulse applied at the center of mass).

FIG. 36b, with reference to the FIG. 28b, graphically illustrates the equal, yet oppositely directed sum, of the angular non-linear and angular, and the center of mass, angular (apparently linear) impulses, applied to the first body, the wheel system 1024a, 1038, along the line of action of the forces, a portion of which, $\Sigma J_A'$, is provided by the braking resistance applied by the wheel of the wheel system 1023a, of the body 1022a, and a portion of which, $\Sigma J_B'$, is provided by the braking resistance of the body 1022a, to center of mass, angular acceleration about its respective axis of rotation, such that, $\Sigma J_A' + \Sigma J_B' = \Sigma J_1'$.

In addition, considering the results of the experiments described earlier in the specification, and then choosing to set the time interval of the two, respective, basic interactions, delta t, so that delta $t_I$=delta $t_{II}$, we can notice that, since the first cart body 1024a, 1038 comes to rest as a result of both particular interactions I and II, $dp_I/dt = dp_{II}/dt$, with respect to the position vectors, $r_1$ and $r_2$ respectively, or, $dl_I/dt = dl_{II}/dt$, with respect to the first body, 1024a, 1038. That is, the product of the average force and the time interval of the interaction, for the basic interaction illustrated in FIG. 28b, is equal to the product of the average force and the time interval of the interaction, for the basic interaction illustrated in FIGS. 28a, $\overline{F}$ delta $t_1 = \overline{F}$ delta $t_{II}$, or, the impulse, $\Sigma J_1'$, applied to the axis O of the first body 1024a, 1038, is equal to the sum of the impulse, $\Sigma J_1'$, applied to the axis O of the first body 1024a, 1038, illustrated in the FIGS. 28b, and 28a, respectively.

Accordingly, at the respective points of mutual, concurrent force or impulse applications, along their respective lines of application, between and joining the two bodies, in both particular interactions, with reference to FIGS. 28b and 28a, force or an impulse of equal magnitude, yet oppositely directed, is applied by the first body 1024a, 1038, respectively to the second body 1022a, (1023a), for the same, equal, time intervals of interaction, delta t, so that, accordingly, the total sums, of the particular impulses respectively applied in return to the first body 1024a, 1038 during each particular interaction, are equal, i.e. $J_{R,I} = J_{R,II}$. However, as can be seen by the results of the experiments described herein earlier, the particular, resulting, center of mass, angular momentum and velocity of the second body is greater for the interaction of FIG. 28b than for the interaction of FIG. 28a. Accordingly, the rate of center of mass, angular acceleration of the second body is greater in the interaction of FIG. 28a, than in the interaction of FIG. 28a, and, $dp_{CM,I}/dt$ is greater than $dp_{CM,II}/dt$, or, $dl_{CM,I}/dt$ is greater than $dl_{CM,II}dt$.

Therefore, for equal intervals of time, delta t, the average force, $\overline{F}_{CM}$, resultant at the center of mass of the second body 1022a, (1023a), is greater in the interaction (I) of FIG. 28b, than in the interaction (II) of FIG. 28a, or, $\overline{F}_{CM,RES,I}$ is greater than $\overline{F}_{CM,RES,II}$. In the interaction II, the average force, $\overline{F}$, resultant at the center of mass of the second body 1022a, (1023a), is equal to the average force, $\overline{F}$, applied at the particular point of application of the force (the rim of the wheel system 1023a), minus the component of the average force resolved due to rotation and the accordant transmutation into absolute spin. That is, $\overline{F}_{CM,RES,(NET)} = \overline{F}_{(APPLIED)} - \overline{f}_2'_{,CM,(DUE\ TO\ ROTATION)}$, with reference to the FIGS. 8m, 35, and 36. If the rotation is zero, that is, if no transmutation into absolute spin occurs, then $\overline{F}_{CM,RES,(NET)} = \overline{F}_{(APPLIED)}$. These are the net, resultant effects for the respective, basic, Case I and Case II interactions, as illustrated, respectively, in FIGS. 28b, and 28a. For the interaction of FIG. 28b, two factors of the second body 1022a, (1023a) contribute simultaneously and concurrently to the change or delta in the quantity of angular motion and momentum of the first body 1024a: the braking action provided by the inertial resistance to the non-linear, rotational acceleration of the wheel or wheel system 1023a, and, the braking action provided by the inertial resistance to the apparently linear or center of mass, angular acceleration supplied by the mass of the second body. The net resultants are illustrated graphically in FIGS. 35 and 36.

Figure 37A:
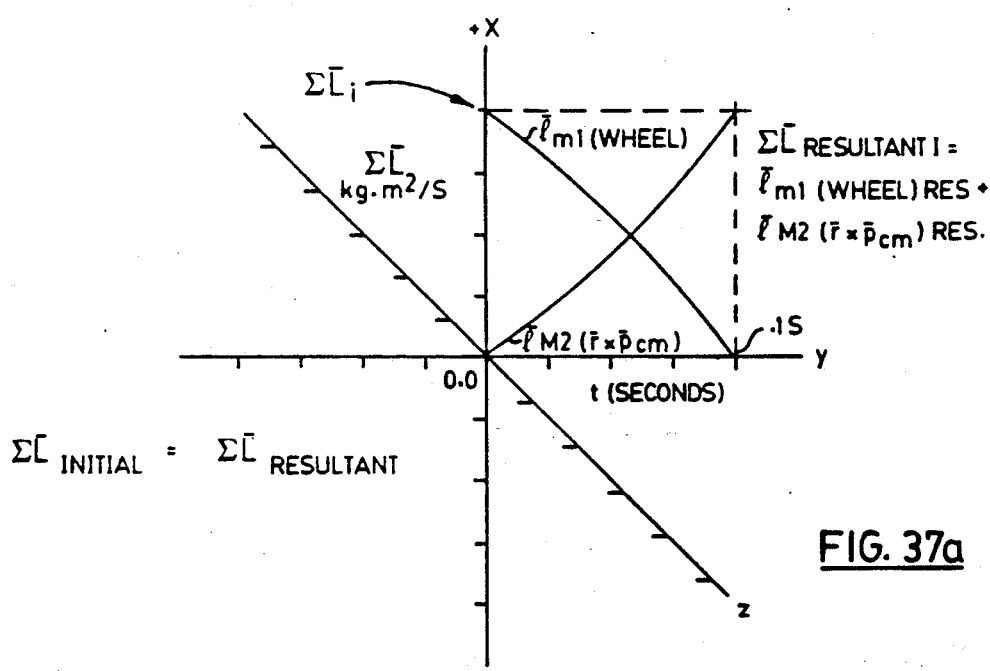
FIGS. 37a and 37b show graphs illustrating the respective non-linear or angular momentum curves for the graphs shown in FIGS. 35a, 35b and 36a, 36b, respectively.
Figure 37B:
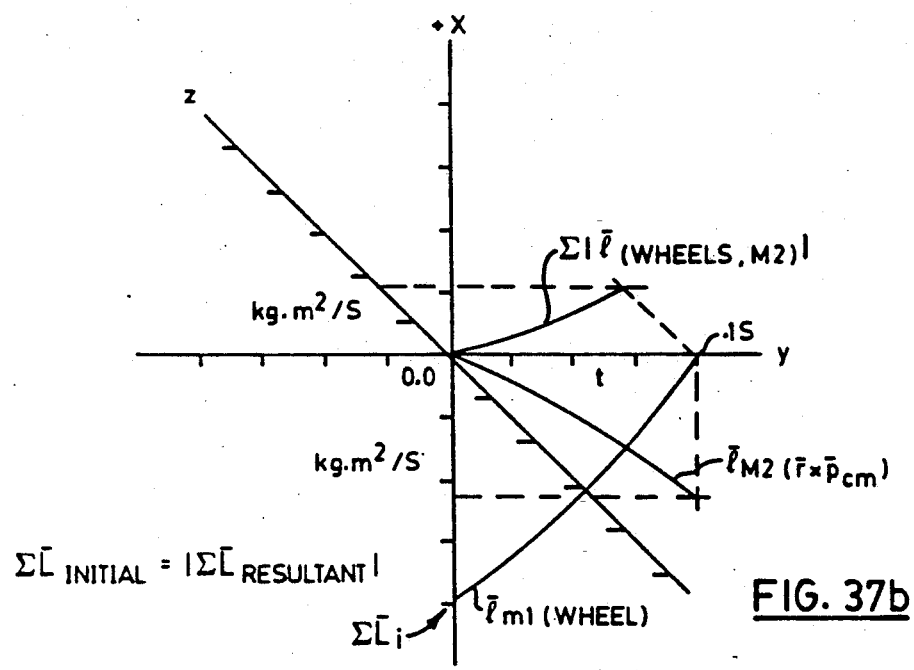

The graphs illustrated in FIGS. 37a and 37b, illustrate the corresponding, non-linear or angular momentum curves of the force through time or impulse curves, respectively illustrated in FIGS. 35 and 36, for the two, basic interactions, I and II. These interactions are electronically programmed to occur over or through the same interval of time, delta t, which is equal to the particular, equal intervals of time graphically illustrated in FIGS. 35 and 36. FIG. 37a illustrates the basic, apparently linear, yet angular interaction (I) of the interaction illustrated in FIG. 28b, and FIG. 37b illustrates the basic, non-linear and angular, and center of mass, angular, or apparently linear interaction (II) illustrated in FIG. 28a. In FIGS. 37a and 37b, for equal, initial quantities of angular momentum, $\Sigma L_1$, respectively, of the first bodies or the wheel systems 1038, 1024a, two, unequal, momentum conversions and transmutations into the two, different, resultant, center of mass, angular accelerations of the respective, second bodies, or the wheel and mass systems 1023a, 1022a, occur about their mutual axis of rotation, and accordingly, $l_{I,(rxp,CM),RES}$ is greater than $l_{II,(rsp,CM),RES}$. However, total non-linear or angular momentum is conserved so that: $\Sigma$delta $l_{WHEELS} = \Sigma$delta $l_{CM,VEHICLE}$, wherein the term, delta l designates a change or delta in the total quantity of angular motion and momentum, or in the total quantity of absolute spin of the respective bodies or wheel systems.

As mentioned previously, it should be apparent that the present system can be implemented using mechanical, hydraulic or pneumatic actuated systems to provide the necessary imbalance in the transfer of "linear" kinetic energy and apparently linear momentum to rotational kinetic energy and angular momentum.

It should also be apparent to one of skill in the art that the present system, although described for use as an electrically powered, combined, vehicle drive and braking system, which thereby helps to reduce environmental pollution, can be used in any environment wherein it is desirable to counteract oscillations or applied impulses on a system and, as well, recover energy by converting the kinetic energy of a vibrating machine or mechanism into stored or usable, electrical energy, or to provide a net impulse on a system. Examples of these type of environments are anti-vibration systems and vehicle suspension systems to counteract centrifugal forces in order to enhance the cornering of vehicles. Other examples include toy and hobby kit applications, educational devices and systems for demonstrations in schools and universities, the vibration control of machinery, partial and rotational absorption of "linear" motion and "linear" momentum in industrial processes, other types of vibration control (e.g., in aerospace applications), and sway control in structures.

In the latter application, a portion of the "linear" motion, "linear" kinetic energy and "linear" momentum of an internal member caused to move by heavy winds is transmuted into angular motion and angular momentum of wheels on a second internal member, thereby reducing the sum of the impulse and a portion of the stress applied to the structure.

I claim:

1. An impulse drive having a frame and an impulse generating means mounted thereon, said impulse generating means comprising:

drive means to cause relative motion between the frame and at least a portion of the impulse generating means;

means associated with the portion of said impulse generating means to impart rotation of at least one rotatable member carried by said impulse generating means and thereby convert a portion of the kinetic energy and momentum thereof to rotational kinetic energy and angular momentum of said at least one rotatable member; and means to transfer at least some of the kinetic energy and momentum of said portion to the frame whereby the difference in kinetic energy and momentum attributable to the rotation of the at least one rotatable member provides a net impulse to the frame in a predetermined direction.

2. An impulse drive as defined in claim 1 wherein said impulse generating means includes at least two interacting driving members, at least one of said driving members carrying said rotatable member and at least one of said driving members being movable relative to said frame whereby interaction between said driving members imparts rotation of said rotatable member.

3. An impulse drive as defined in claim 2 wherein both of said at least two driving members are movable relative to said frame.

4. An impulse drive as defined in claim 3 wherein at least one of said driving members is movable relative to said frame in a linear manner.

5. An impulse drive as defined in claim 4 including first and second driving members, said first driving member including engagement means extending forwardly thereof and said second member carrying said at least one rotatable member, said engagement means being configured to interact with said at least one rotatable member to impart rotation thereof.

6. An impulse drive as defined in claim 5 wherein said at least one rotatable member is in the form of a pair of a dynamically balanced flywheels disposed on said second driving member.

7. An impulse drive as defined in claim 6 wherein said flywheels are in the form of rotatable discs or rings.

8. An impulse drive as defined in claim 6 wherein said engagement means carries magnetic interaction means, said magnetic interaction means interacting with magnetic interaction means carried by said flywheels to impart rotation thereof.

9. An impulse drive as defined in claim 6 wherein said engagement means carries linear induction motor means, said linear induction motor means interacting with linear induction motor means on said flywheels to impart rotation thereof.

10. An impulse drive as defined in claim 5 wherein said at least one rotatable member includes an arm mounted thereon and wherein said engagement means interacts with said arm to impart rotation of said at least one rotatable member.

11. An impulse drive as defined in claim 10 wherein said at least one rotatable member is in the form of a flywheel and wherein said arm extends outwardly from the periphery of said flywheel and is engageable with the engagement means.

12. An impulse drive as defined in claim 11 wherein said arm and said engagement means further carry repelling magnetic means, said repelling magnetic means interacting to impart rotation of said flywheel.

13. An impulse drive as defined in claim 11 wherein said flywheel includes a plurality of arms circumferentially and equidistantly spaced about said flywheel and wherein said engagement means includes a rod, said rod being engageable with one of said arms upon interaction of said first and second driving members to impart rotation of said flywheel.

14. An impulse drive as defined in claim 3 including first and second driving members each of which is movable relative to said frame in a linear manner, said first driving member including engagement means and said second member carrying said at least one rotatable member, said driving members being initially positioned adjacent either side of the center of mass of said impulse drive, said drive means applying an equal and opposite impulse to each of said driving members to cause linear motion of said driving members in opposite directions away from said center of mass, said engagement means interacting with said at least one rotatable member to transmute a portion of said impulse into rotational motion of said at least one rotatable member carried thereby so that said first driving member moves relative to said frame having a greater linear kinetic energy and linear momentum than said second driving member, said transfer means being in the form of a brake and arresting motion of said first and second driving members relative to said frame when said driving members are adjacent the ends of said frame to impart said net impulse to said frame.

15. An impulse drive as defined in claim 14 further comprising re-positioning means located on opposite ends of said frame, said re-positioning means applying equal and opposite impulses to said driving members and said respective ends to cause said driving members to move towards said center of mass with equal linear kinetic energy and linear momentum, said brake arresting motion of said driving members when said driving members are re-positioned adjacent either side of said center of mass thereby to reposition said driving members without applying a net impulse to said frame.

16. An impulse drive as defined in claim 3 including first and second driving members wherein one of said first and second driving members in fixed to said frame and wherein the other of said first and second driving member is initially positioned adjacent said one driving member so that said driving members are located on opposite sides of the center of mass of said impulse drive, said drive means applying an equal and opposite impulse to each of said driving members to cause relative linear motion of said other driving member with respect to said frame, the movement of said other driving member imparting rotation of said at least one rotatable member.

17. An impulse drive as defined in claim 16 wherein said one driving member carries said at least one rotatable member.

18. An impulse drive as defined in claim 16 wherein said other driving member carries said at least one rotatable member.

19. An impulse drive as defined in claim 3 including first and second driving members wherein one of said first and second driving members is secured to said frame and the other of said first and second driving members is initially positioned at one end of said frame, said drive means being located at said one end of said frame and applying an equal and opposite impulse to said one end and the other of said first and second driving member to cause relative linear motion of the other of said first and second driving member relative to said frame, said other of said first and second driving member interacting with said one of said first and second driving member to impart rotation of said at least one rotatable member.

20. An impulse drive as defined in claim 19 wherein said one of said first and second driving member carries said at least one rotatable member.

21. An impulse drive as defined in claim 19 wherein said other of said first and second driving member carries said at least one rotatable member.

22. An impulse drive as defined in claim 4 wherein said engagement means are in the form of arms extending forwardly of said first driving member, said arms including first linear induction motor means and wherein said at least one rotatable member is in the form of a pair of flywheels, each of said flywheels carrying second linear induction motor means, said first linear induction means communicating with said second linear inducting means to impart rotation of said flywheels.

23. An impulse drive as defined in claim 1 wherein said transfer means is in the form of a linear induction motor means operable to brake said portion relative to said frame.

24. An impulse drive as defined in claim 4 wherein said impulse generating means includes at least a third driving member, said third driving member also carrying at least one rotatable member and wherein one driving member interacts with said third driving member to impart rotation of said at least one rotatable member thereon after interaction with the other driving member carrying said at least one rotatable member.

25. An impulse drive as defined in claim 1 wherein said impulse generating means includes inner and outer rotatable concentric members, said drive means rotating said inner and outer members about an axis at substantially the same angular velocity;
a pair of diametrically positioned masses on said outer member and movable relative thereto, said inner member carrying a pair of diametrically positioned members thereon, each of said members for interacting with one of said masses, at least one of said members having said at least one rotatable member thereon;
second drive means for accelerating equally both of said diametetrically positioned massesin opposite directions relative to one another to cause movement thereof relative to said outer member, one of said masses interacting with said at least one rotatable member and imparting rotation thereof upon movement thereof, the other mass interacting with said other member to transfer a portion of the kinetic energy and momentum thereof to said other member, said transfer means acting on said members to transfer the kinetic energy and momentum applied thereto by said masses to said frame whereby the difference in kinetic energy and momentum attributable to the rotation of the at least one rotatable member provides a net impulse to the frame in a predetermined direction.

26. An impulse drive as defined in claim 25 wherein said impulse generating means includes at least a pair of inner and outer members, said outer members in each pair engaging so that the inner and outer members in each pair counter-rotate.

27. An impulse drive as defined in claim 26 wherein said impulse generating means is mounted on a support rotatable about an axis to selected positions relative to said frame to permit the pfredetermined direction of said impulse applied to said frame to be varied.

28. An impulse drive as defined in claim 27 wherein said impulse generating means includes two pair of inner and outer concentric members, the outer member of each pair of members engaging with the outer member of two other pair of members.

29. An impulse drive as defined in claim 28 wherein said masses are movable along slots formed in said outer member, said second drive means accelerating said masses within said slots to cause said masses to move from one end of said slots towards the other end of said slots, said impulse generating means further comprising brake means arresting said masses adjacent said other end after engagement with said one members, said second drive means further being operable to move said masses to said one ends within a single revolution of said inner and outer wheels to reposition said masses.

30. An impulse drive as defined in claim 29 wherein said at least one rotatable members include at least one pair of dynamically balanced flywheels.

31. An impulse drive as defined in claim 29 wherein each of said one members carries at least one rotatable member, one of said rotatable members being in the form of a pair intermeshing flywheels and the other of said rotatable members being in the form of a single flywheel, one of said flywheels in said pair or single flywheel interacting with said mass.

32. An impulse drive as defined in claim 1 wherein said impulse generating means includes an impulse generator having upper and lower members, at least one of said upper and lower members being rotatable about an axis by said drive means;
a pair of diametrically positioned masses located between said upper and lower members and movable relative thereto, at least one of said masses having said at least one rotatable member thereon;
second drive means on one of said upper and lower members and operable to apply concurrent but oppositely directed impulses to each of said masses, said one mass transmuting a portion of said impulse into rotational kinetic energy and angular momentum attributable to the rotation of the rotatable member carried thereby so that one mass receives a greater impulse at the center of mass thereof, said transfer means being on the other of said upper and lower members and transferring the impulses applied to said masses to said frame whereby the difference in kinetic energy and momentum attributable to the rotation of the at least one rotatable member provides a net impulse to the frame in a predetermined direction.

33. An impulse drive as defined in claim 32 wherein said transfer means applies an impulse to the one mass in a direction opposite the impulse applied thereto by said second drive means substantially equal to the difference attributable to the rotation of the at least one rotatable member, the application of said impulse to said one mass by said transfer means causing a reaction force to be applied to said frame in a direction opposite the impulse applied to the one mass.

34. An impulse drive as defined in claim 33 wherein said impulse generating means includes an upper pair and a lower pair of interconnected impulse generators operable to provide a net impulse to said frame in the same direction with the upper and lower members of the upper pairs and the upper and lower members of the lower pairs engaging to cause counter rotation thereof, said lower pair of impulse generators being oriented in a mirror image to said upper pair of impulse generators.

35. An impulse drive having a frame and an impulse generating means mounted thereon, said impulse generating means comprising:
   first and second pairs of driving members with each pair being located on opposite sides of the center of mass of said frame;
   drive means to cause relative linear motion between the frame and the driving members so that one driving member of each pair moves within said frame in opposite directions towards the other driving member of each pair, said one and other driving members interacting to cause relative linear motion of said other driving members within said frame in opposite directions;
   means associated with one of the one driving members of a pair to impart rotation of at least one rotatable member carried by the other driving member of that pair and thereby convert a portion of the linear kinetic energy and linear momentum of the other driving members to rotational kinetic energy and angular momentum; and
   braking means to arrest motion of the other driving members of each pair relative to the frame whereby the difference in the linear kinetic energy and the linear momentum attributable to the rotation of the at least one rotatable member provides a net impulse to the frame in a predetermined direction.

36. An impulse drive as defined in claim 35 wherein said first and second pairs of driving members are located at opposite ends of said frame, said drive means causing motion of said one driving member of each pair in opposite directions towards the center of mass of said frame.

37. An impulse drive as defined in claim 36 wherein the other driving members of each pair of driving members include repelling means for repelling said other driving members at said center of mass to cause said other driving members to reverse direction within said frame without colliding and move relative to said frame towards said respective end of said frame and wherein said braking means arrests motion of said other driving members when said other driving members reach their initial starting positions adjacent the end of said frame.

38. An impulse drive as defined in claim 37 further including re-positioning means for repositioning said one driving members of each pair adjacent said ends after their interaction with said other driving members.

39. An impulse drive as defined in claim 38 wherein said re-positioning means are in the form of rotatable cams communicating with cam slots formed in said one driving members.

40. An impulse drive as defined in claim 39 wherein said drive means and said repelling means are in the form of solenoids.

41. An impulse drive as defined in claim 38 wherein each of said other driving members includes at least one rotatable member, only the rotatable member on one of said other driving members interacting with said one driving member and transmuting a portion of the kinetic energy and the linear momentum of said one driving members upon interaction thereof.

42. An impulse drive as defined in claim 41 wherein said at least one rotatable member is in the form of a pair of a dynamically balanced flywheels disposed on said other driving members.

43. An impulse drive as defined in claim 42 wherein said flywheels and said one driving member which interact to transmute linear kinetic energy and linear momentum into rotational energy and momentum include interacting linear induction motor means.

44. An impulse drive as defined in claim 43 wherein said one driving members include means to pre-spin said flywheels.

45. An impulse drive as defined in claim 44 wherein said pre-spin means maintains the speed of said flywheels on the other driving member which does not interact with the one driving member equivalent to the speed of rotation of said flywheels on said other driving member which interacts with said one driving member.

46. An impulse drive as defined in claim 45 wherein said linear induction means is operable as a generating means to supply a power supply when said linear induction means operates to reduce the speed of said flywheels.

47. An impulse drive having a frame and impulse generating means mounted thereon, said impulse generating means comprising:
   means to generate equal and opposite impulses relative to said frame;
   means to convert at least a portion of one of said impulses through rotation of a rotatable member on said impulse generating means; and
   means to apply the impulses to said frame whereby the difference in the impulses attributable to the rotation of the at least one rotatable member provides a net impulse to the frame in a predetermined direction.

48. A vehicle having a chassis with an impulse drive secured thereto, said impulse drive comprising:
   a frame mounted on said chassis;
   impulse generating means on said frame and having at least a portion thereof movable relative to said frame;
   drive means to cause relative motion between the frame and the portion of said impulse generating means;
   means associated with the portion of said impulse generating means to impart rotation of at least one rotatable member carried by said impulse generating means and thereby convert a portion of the kinetic energy and momentum thereof to rotational kinetic energy and angular momentum of said at least one rotatable member; and
   braking means to reduce motion of the portion of said impulse generating means relative to the frame whereby the difference in kinetic energy and momentum attributable to the rotation of the rotatable member provides a net impulse to the frame in a predetermined direction.

49. A vehicle as defined in claim 48 wherein said impulse generating means is in the form of at least one impulse generator positioned on said vehicle so that impulses applied thereto are resultant through the center of mass of said vehicle.

50. A vehicle as defined in claim 49 wherein said one impulse generator is rotatable with respect to said chassis to permit the direction of said impulses applied to said vehicle to be varied.

51. A vehicle as defined in claim 50 wherein said at least one impulse generator is mounted on said chassis via a swivel system so that rotation of said at least one impulse generator provides no net torque on or rotation of said vehicle, said swivel system permitting said impulse generator to apply impulses to said vehicle in any direction within a two dimensional plane.

* * * * *